(12) United States Patent
Carter

(10) Patent No.: US 8,756,147 B1
(45) Date of Patent: Jun. 17, 2014

(54) METHODS AND SYSTEMS FOR ANALYSIS, TRACKING AND MODIFICATIONS OF CALL OPTIONS ON DEBT ISSUANCES

(75) Inventor: John Carter, New York, NY (US)

(73) Assignee: Siebert Branford Shank & Company, LLC, New York, NY (US)

( * ) Notice: Subject to any disclaimer, the term of this patent is extended or adjusted under 35 U.S.C. 154(b) by 0 days.

(21) Appl. No.: 13/525,143

(22) Filed: Jun. 15, 2012

Related U.S. Application Data

(60) Provisional application No. 61/497,277, filed on Jun. 15, 2011.

(51) Int. Cl.
*G06Q 40/00* (2012.01)
(52) U.S. Cl.
USPC ............... 705/37; 705/36 R; 705/38; 705/35; 705/40; 705/1.1

(58) Field of Classification Search
USPC ............ 705/1.1, 37, 36 R, 38, 35, 40, 30, 39; 455/550.1, 408
See application file for complete search history.

(56) References Cited

U.S. PATENT DOCUMENTS

2002/0184142 A1* 12/2002 Whang ........................... 705/38
2003/0182220 A1* 9/2003 Galant ............................ 705/36

* cited by examiner

*Primary Examiner* — John H Holly
(74) *Attorney, Agent, or Firm* — Greenberg Traurig, LLP

(57) ABSTRACT

A computer-implemented method that includes receiving on a computer system, a price of a debt issuance; where the price of the debt issuance includes a cost for purchase of an embedded call option; calculating on a computer system, an actual cost of the purchase of the embedded call option; comparing on a computer system, the cost calculation of the call option to a rule based system of an alternative option type and a corresponding cost of the alternative option type; and determining on a computer system, based on the comparing step, the type of option to be embedded with the debt issuance.

8 Claims, 41 Drawing Sheets

Option Pricing Analysis

Fig. 1

Call Option Cost Analysis

| Coupon | Maturity | Call | Spread to MMD | YTC | YTM | Dollar Price |
|---|---|---|---|---|---|---|
| 5.00% | 2037 | 2017 @ 100% | 13 | 4.51 | 4.75 | 103.909 |
| 5.00% | 2037 | NC | 10 | N/A | 4.48 | 108.534 |
| Cost of Call Option | | | | | | 4.625% |

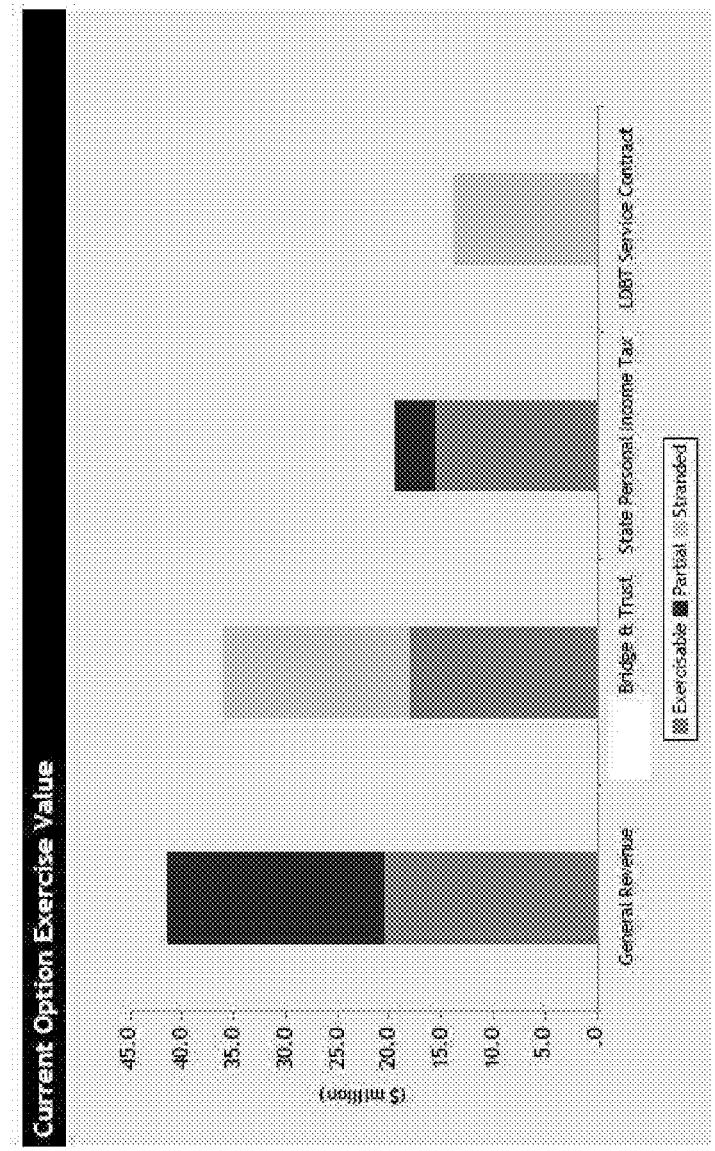

FIG. 2C

Schedule 1
Option Value Monitor

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 03/26/1998 | 04/01/2009 | Series 1998B | 5.250% | 9,310,000 | 04/01/2008 | 101.000% | NO | 0.440% | 40,964 | 0 | 0 | (40,964) | 0 |
| 03/26/1998 | 04/01/2010 | Series 1998B | 5.250% | 9,800,000 | 04/01/2008 | 101.000% | NO | 0.653% | 63,994 | 1.420% | 139,127 | 75,133 | 8.256% |
| 03/26/1998 | 04/01/2011 | Series 1998B | 5.250% | 10,310,000 | 04/01/2008 | 101.000% | NO | 1.380% | 142,278 | 2.910% | 300,058 | 157,780 | 7.928% |
| 03/26/1998 | 04/01/2012 | Series 1998B | 5.250% | 27,020,000 | 04/01/2008 | 101.000% | NO | 1.821% | 492,034 | 4.224% | 1,141,202 | 649,168 | 8.961% |
| 03/26/1998 | 04/01/2013 | Series 1998B | 5.250% | 28,435,000 | 04/01/2008 | 101.000% | NO | 1.849% | 525,763 | 5.424% | 1,542,239 | 1,016,476 | 11.533% |
| 03/26/1998 | 04/01/2014 | Series 1998B | 5.250% | 10,335,000 | 04/01/2008 | 101.000% | NO | 2.023% | 209,077 | 6.470% | 668,678 | 459,601 | 12.468% |
| 03/17/1999 | 04/01/2011 | Series 1999A | 4.500% | 1,375,000 | 04/01/2009 | 101.000% | NO | 0.274% | 3,768 | 0 | 0 | (3,768) | 0 |
| 03/17/1999 | 04/01/2012 | Series 1999A | 4.625% | 635,000 | 04/01/2009 | 101.000% | NO | 0.484% | 3,073 | 0.931% | 5,912 | 2,838 | 7.733% |
| 03/17/1999 | 04/01/2010 | Series 1999A | 5.000% | 14,420,000 | 04/01/2009 | 101.000% | NO | 0.177% | 25,523 | 0 | 0 | (25,523) | 0 |
| 03/17/1999 | 04/01/2011 | Series 1999A | 5.125% | 15,135,000 | 04/01/2009 | 101.000% | NO | 0.288% | 43,589 | 1.004% | 152,031 | 108,442 | 15.027% |
| 06/08/1999 | 04/01/2011 | Series 1999B | 4.750% | 7,645,000 | 04/01/2009 | 101.000% | YES | 0.357% | 27,293 | 0.325% | 24,836 | (2,457) | -1.120% |
| 03/22/2000 | 04/01/2011 | Series 2000A | 5.375% | 3,490,000 | 04/01/2010 | 101.000% | YES | 0.329% | 11,482 | 0 | 0 | (11,482) | 0 |
| 03/22/2000 | 04/01/2011 | Series 2000A | 6.250% | 6,320,000 | 04/01/2010 | 101.000% | YES | 0.343% | 21,678 | 0.481% | 30,407 | 8,729 | 4.497% |
| 07/26/2000 | 04/01/2011 | Series 2000B | 5.000% | 13,335,000 | 04/01/2010 | 101.000% | YES | 0.492% | 65,608 | 0 | 0 | (65,608) | 0 |
| 07/26/2000 | 04/01/2012 | Series 2000B | 5.100% | 3,330,000 | 04/01/2010 | 101.000% | YES | 0.605% | 20,147 | 0.775% | 25,793 | 5,646 | 3.430% |
| 03/14/2001 | 04/01/2012 | Series 2001A | 5.500% | 7,385,000 | 04/01/2011 | 101.000% | YES | 0.363% | 26,808 | 0 | 0 | (26,808) | 0 |
| 03/14/2001 | 04/01/2012 | Series 2001A | 4.500% | 4,935,000 | 04/01/2011 | 101.000% | YES | 0.345% | 17,026 | 0 | 0 | (17,026) | 0 |
| 03/14/2001 | 04/01/2013 | Series 2001A | 4.600% | 4,450,000 | 04/01/2011 | 101.000% | YES | 0.551% | 24,520 | 0 | 0 | (24,520) | 0 |
| 03/14/2001 | 04/01/2014 | Series 2001A | 4.700% | 2,350,000 | 04/01/2011 | 101.000% | YES | 0.692% | 16,262 | 0.714% | 16,774 | 512 | 0.468% |
| 10/25/2001 | 04/01/2012 | Series 2001B | 4.000% | 9,750,000 | 10/01/2011 | 100.000% | YES | 0.168% | 16,380 | 0 | 0 | (16,380) | 0 |
| 10/25/2001 | 04/01/2013 | Series 2001B | 4.200% | 10,140,000 | 10/01/2011 | 100.000% | YES | 0.451% | 45,731 | 0 | 0 | (45,731) | 0 |
| 10/25/2001 | 04/01/2014 | Series 2001B | 4.300% | 1,850,000 | 10/01/2011 | 100.000% | YES | 0.761% | 14,079 | 0.327% | 6,043 | (8,036) | -13.575% |
| 10/25/2001 | 04/01/2015 | Series 2001B | 4.400% | 2,340,000 | 10/01/2011 | 100.000% | YES | 1.003% | 23,470 | 0.927% | 21,699 | (1,771) | -1.300% |
| 10/25/2001 | 04/01/2016 | Series 2001B | 4.500% | 1,090,000 | 10/01/2011 | 100.000% | YES | 1.262% | 13,756 | 1.501% | 16,357 | 2,602 | 2.900% |
| 10/25/2001 | 04/01/2017 | Series 2001B | 4.625% | 590,000 | 10/01/2011 | 100.000% | YES | 1.538% | 9,074 | 2.189% | 12,915 | 3,841 | 5.953% |
| 03/19/2002 | 04/01/2013 | Series 2002A | 4.250% | 12,760,000 | 04/01/2012 | 100.000% | YES | 0.173% | 22,075 | 0.202% | 0 | (22,075) | 0 |
| 03/19/2002 | 04/01/2014 | Series 2002A | 4.400% | 4,250,000 | 04/01/2012 | 100.000% | YES | 0.461% | 19,593 | 0.202% | 8,595 | (10,997) | -14.144% |
| 03/19/2002 | 04/01/2015 | Series 2002A | 4.500% | 2,200,000 | 04/01/2012 | 100.000% | YES | 0.487% | 10,714 | 0.867% | 19,084 | 8,370 | 10.547% |
| 03/19/2002 | 04/01/2016 | Series 2002A | 4.600% | 3,635,000 | 04/01/2012 | 100.000% | YES | 1.023% | 37,186 | 1.508% | 54,812 | 17,626 | 7.028% |
| 03/19/2002 | 04/01/2017 | Series 2002A | 4.700% | 2,010,000 | 04/01/2012 | 100.000% | YES | 1.605% | 32,261 | 2.153% | 43,280 | 11,020 | 5.301% |
| 03/19/2002 | 04/01/2018 | Series 2002A | 4.800% | 690,000 | 04/01/2012 | 100.000% | YES | 1.333% | 9,196 | 2.789% | 19,242 | 10,044 | 13.583% |
| 07/10/2002 | 04/01/2013 | Series 2002B | 4.150% | 3,495,000 | 04/01/2012 | 100.000% | YES | 0.172% | 6,011 | 0 | 0 | (6,011) | 0 |
| 07/10/2002 | 04/01/2014 | Series 2002B | 4.250% | 2,890,000 | 04/01/2012 | 100.000% | YES | 0.372% | 10,751 | 0 | 0 | (10,751) | 0 |
| 07/10/2002 | 04/01/2015 | Series 2002B | 4.375% | 7,360,000 | 04/01/2012 | 100.000% | YES | 0.484% | 11,519 | 0.571% | 13,579 | 2,060 | 3.123% |
| 07/10/2002 | 04/01/2016 | Series 2002B | 4.450% | 1,600,000 | 04/01/2012 | 100.000% | YES | 0.713% | 12,834 | 1.041% | 18,742 | 5,908 | 7.262% |
| 07/10/2002 | 04/01/2017 | Series 2002B | 4.550% | 370,000 | 04/01/2012 | 100.000% | YES | 1.070% | 3,959 | 1.581% | 5,852 | 1,893 | 7.497% |
| 07/10/2002 | 04/01/2018 | Series 2002B | 4.650% | 190,000 | 04/01/2012 | 100.000% | YES | 1.332% | 2,531 | 2.116% | 4,021 | 1,490 | 8.914% |
| 07/10/2002 | 04/01/2019 | Series 2002B | 4.750% | 1,255,000 | 04/01/2012 | 100.000% | YES | 1.608% | 20,180 | 2.634% | 33,061 | 12,880 | 9.519% |
| 07/10/2002 | 04/01/2013 | Series 2002B | 5.375% | 9,310,000 | 04/01/2012 | 100.000% | YES | 0.950% | 88,445 | 0.409% | 38,047 | (50,398) | -15.776% |
| 08/08/2002 | 04/01/2014 | Series 2002C | 5.500% | 66,105,000 | 04/01/2013 | 102.000% | NO | 1.933% | 1,277,810 | 0 | 0 | (1,277,810) | 0 |
| 08/08/2002 | 04/01/2015 | Series 2002C | 5.500% | 4,825,000 | 04/01/2013 | 102.000% | NO | 2.738% | 132,109 | 0.085% | 4,107 | (128,001) | 0 |
| 08/08/2002 | 04/01/2016 | Series 2002C | 4.400% | 10,610,000 | 04/01/2013 | 102.000% | NO | 0.608% | 64,509 | 0 | 0 | (64,509) | 0 |

Note: Partial Refundings Do Not Account for % Actually Refundable.

Schedule 1
Option Value Monitor

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 08/08/2002 | 04/01/2019 | Series 2002C | 5.000% | 36,305,000 | 04/01/2013 | 102.000% | NO | 2.345% | 851,352 | 1.515% | 550,071 | (301,281) | -8.179% |
| 08/08/2002 | 04/01/2020 | Series 2002C | 5.000% | 38,120,000 | 04/01/2013 | 102.000% | NO | 2.062% | 786,034 | 1.758% | 670,145 | (115,889) | -3.026% |
| 04/03/2003 | 04/01/2014 | Series 2003A | 3.900% | 1,670,000 | 04/01/2013 | 100.000% | YES | 0.088% | 1,470 | 0 | 0 | (1,470) | 0 |
| 04/03/2003 | 04/01/2015 | Series 2003A | 4.000% | 375,000 | 04/01/2013 | 100.000% | YES | 0.189% | 709 | 0 | 0 | (709) | 0 |
| 04/03/2003 | 04/01/2016 | Series 2003A | 4.000% | 465,000 | 04/01/2013 | 100.000% | YES | 0.299% | 1,390 | 0 | 0 | (1,390) | 0 |
| 04/03/2003 | 04/01/2017 | Series 2003A | 4.125% | 3,836,000 | 04/01/2013 | 100.000% | YES | 0.419% | 16,048 | 0 | 0 | (16,048) | 0 |
| 04/03/2003 | 04/01/2018 | Series 2003A | 4.250% | 1,410,000 | 04/01/2013 | 100.000% | YES | 0.551% | 7,769 | 0.078% | 1,093 | (6,676) | 0.060% |
| 04/03/2003 | 04/01/2019 | Series 2003A | 4.300% | 300,000 | 04/01/2013 | 100.000% | YES | 0.687% | 2,061 | 0.122% | 366 | (1,695) | -22.184% |
| 04/03/2003 | 04/01/2020 | Series 2003A | 4.400% | 535,000 | 04/01/2013 | 100.000% | YES | 0.824% | 4,408 | 0.435% | 2,329 | (2,079) | -13.462% |
| 04/03/2003 | 04/01/2021 | Series 2003A | 4.500% | 300,000 | 04/01/2013 | 100.000% | YES | 0.971% | 2,913 | 0.852% | 2,557 | (356) | -2.828% |
| 04/03/2003 | 04/01/2022 | Series 2003A | 4.500% | 1,205,000 | 04/01/2013 | 100.000% | YES | 0.126% | 1,518 | 0.761% | 9,173 | 7,655 | 43,410% |
| 04/03/2003 | 04/01/2023 | Series 2003A | 4.600% | 5,325,000 | 04/01/2013 | 100.000% | YES | 1.171% | 62,356 | 1.302% | 69,338 | 6,982 | 2.332% |
| 04/03/2003 | 04/01/2014 | Series 2003A | 5.250% | 12,060,000 | 04/01/2013 | 100.000% | YES | 0.963% | 116,138 | 0.207% | 24,930 | (91,208) | -21.026% |
| 04/03/2003 | 04/01/2021 | Series 2003A | 5.000% | 19,185,000 | 04/01/2013 | 100.000% | YES | 2.692% | 516,460 | 3.565% | 683,891 | 167,430 | 6.229% |
| 07/16/2003 | 04/01/2014 | Series 2003B | 5.000% | 15,880,000 | 04/01/2013 | 100.000% | YES | 1.139% | 180,873 | 0.018% | 2,787 | (178,086) | 0 |
| 07/16/2003 | 04/01/2015 | Series 2003B | 3.500% | 8,040,000 | 04/01/2013 | 100.000% | YES | 0.188% | 15,115 | 0 | 0 | (15,115) | 0 |
| 07/16/2003 | 04/01/2018 | Series 2003B | 4.750% | 19,170,000 | 04/01/2013 | 100.000% | YES | 3.143% | 602,513 | 1.906% | 365,312 | (237,201) | -11.326% |
| 07/16/2003 | 04/01/2019 | Series 2003B | 4.000% | 5,235,000 | 04/01/2013 | 100.000% | YES | 0.927% | 48,528 | 0 | 0 | (48,528) | 0 |
| 07/16/2003 | 04/01/2020 | Series 2003B | 4.750% | 20,995,000 | 04/01/2013 | 100.000% | YES | 3.468% | 728,107 | 2.138% | 448,940 | (279,166) | -10.956% |
| 07/16/2003 | 04/01/2021 | Series 2003B | 4.750% | 21,990,000 | 04/01/2013 | 100.000% | YES | 3.479% | 765,032 | 2.208% | 485,579 | (279,453) | -10.316% |
| 07/16/2003 | 04/01/2022 | Series 2003B | 4.750% | 23,035,000 | 04/01/2013 | 100.000% | YES | 3.321% | 764,992 | 2.252% | 518,667 | (246,326) | -8.853% |
| 07/16/2003 | 04/01/2023 | Series 2003B | 4.250% | 24,130,000 | 04/01/2013 | 100.000% | YES | 1.317% | 317,792 | 0 | 0 | (317,792) | 0 |
| 07/16/2003 | 04/01/2019 | Series 2003B | 4.750% | 14,845,000 | 04/01/2013 | 100.000% | YES | 3.359% | 498,644 | 2.048% | 304,047 | (194,597) | -11.201% |
| 03/24/2004 | 04/01/2015 | Series 2004A | 3.375% | 1,370,000 | 04/01/2014 | 100.000% | YES | 0.091% | 1,247 | 0 | 0 | (1,247) | 0 |
| 03/24/2004 | 04/01/2016 | Series 2004A | 5.000% | 10,190,000 | 04/01/2014 | 100.000% | YES | 2.274% | 231,721 | 0.763% | 77,741 | (153,979) | -28.045% |
| 03/24/2004 | 04/01/2017 | Series 2004A | 3.500% | 1,070,000 | 04/01/2014 | 100.000% | YES | 0.519% | 5,553 | 0 | 0 | (5,553) | 0 |
| 03/24/2004 | 04/01/2018 | Series 2004A | 5.000% | 11,220,000 | 04/01/2014 | 100.000% | YES | 4.333% | 486,163 | 1.982% | 222,411 | (263,752) | -20.570% |
| 03/24/2004 | 04/01/2019 | Series 2004A | 5.000% | 11,780,000 | 04/01/2014 | 100.000% | YES | 5.130% | 604,314 | 2.354% | 277,290 | (327,024) | -20.495% |
| 03/24/2004 | 04/01/2021 | Series 2004A | 5.000% | 12,990,000 | 04/01/2014 | 100.000% | YES | 6.122% | 795,378 | 2.904% | 377,196 | (418,182) | -19.672% |
| 03/24/2004 | 04/01/2022 | Series 2004A | 3.875% | 3,200,000 | 04/01/2014 | 100.000% | YES | 1.413% | 45,216 | 0 | 0 | (45,216) | 0 |
| 03/24/2004 | 04/01/2023 | Series 2004A | 5.000% | 14,285,000 | 04/01/2014 | 100.000% | YES | 6.779% | 968,380 | 3.294% | 470,540 | (497,841) | -19.062% |
| 03/24/2004 | 04/01/2024 | Series 2004A | 4.000% | 15,000,000 | 04/01/2014 | 100.000% | YES | 1.611% | 241,650 | 0 | 0 | (241,650) | 0 |
| 03/24/2004 | 04/01/2015 | Series 2004A | 5.000% | 8,360,000 | 04/01/2014 | 100.000% | YES | 1.220% | 101,992 | 0 | 0 | (101,992) | 0 |
| 03/24/2004 | 04/01/2017 | Series 2004A | 5.000% | 9,630,000 | 04/01/2014 | 100.000% | YES | 3.441% | 331,368 | 1.449% | 139,521 | (191,846) | -22.624% |
| 03/24/2004 | 04/01/2022 | Series 2004A | 5.000% | 10,440,000 | 04/01/2014 | 100.000% | YES | 6.367% | 664,715 | 3.120% | 325,774 | (338,940) | -18.847% |
| 07/28/2004 | 04/01/2015 | Series 2004B | 4.000% | 3,150,000 | 04/01/2014 | 100.000% | YES | 0.081% | 2,552 | 0 | 0 | (2,552) | 0 |
| 07/28/2004 | 04/01/2016 | Series 2004B | 4.100% | 7,710,000 | 04/01/2014 | 100.000% | YES | 0.179% | 13,801 | 0 | 0 | (13,801) | 0 |
| 07/28/2004 | 04/01/2017 | Series 2004B | 4.150% | 1,105,000 | 04/01/2014 | 100.000% | YES | 0.391% | 4,321 | 0 | 0 | (4,321) | 0 |
| 07/28/2004 | 04/01/2018 | Series 2004B | 4.250% | 840,000 | 04/01/2014 | 100.000% | YES | 0.407% | 3,419 | 0 | 0 | (3,419) | 0 |
| 07/28/2004 | 04/01/2019 | Series 2004B | 4.300% | 655,000 | 04/01/2014 | 100.000% | YES | 4.540% | 29,737 | 0 | 0 | (29,737) | 0 |
| 07/28/2004 | 04/01/2020 | Series 2004B | 4.400% | 360,000 | 04/01/2014 | 100.000% | YES | 0.671% | 2,416 | 0.201% | 724 | (1,691) | -33.202% |
| 07/28/2004 | 04/01/2021 | Series 2004B | 5.000% | 15,665,000 | 04/01/2014 | 100.000% | YES | 2.868% | 449,272 | 2.904% | 454,871 | 5,599 | 0.380% |
| 07/28/2004 | 04/01/2022 | Series 2004B | 4.550% | 245,000 | 04/01/2014 | 100.000% | YES | 0.847% | 2,075 | 0.788% | 1,931 | (144) | -2.191% |
| 07/28/2004 | 04/01/2023 | Series 2004B | 4.600% | 205,000 | 04/01/2014 | 100.000% | YES | 0.872% | 1,788 | 1.023% | 2,097 | 310 | 4.967% |
| 07/28/2004 | 04/01/2024 | Series 2004B | 4.700% | 3,215,000 | 04/01/2014 | 100.000% | YES | 1.023% | 32,889 | 1.634% | 52,523 | 19,634 | 14.895% |
| 07/28/2004 | 04/01/2015 | Series 2004B | 5.000% | 6,650,000 | 04/01/2014 | 100.000% | YES | 0.753% | 65,048 | 0 | 0 | (65,048) | 0 |
| 07/28/2004 | 04/01/2016 | Series 2004B | 5.000% | 4,650,000 | 04/01/2014 | 100.000% | YES | 1.349% | 62,729 | 0.763% | 35,476 | (27,253) | -16.750% |
| 07/28/2004 | 04/01/2017 | Series 2004B | 5.000% | 11,800,000 | 04/01/2014 | 100.000% | YES | 1.966% | 231,988 | 1.449% | 170,960 | (61,028) | -9.152% |

Note: Partial Refundings Do Not Account for % Actually Refundable.

Schedule 1
Option Value Monitor

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 07/28/2004 | 04/01/2018 | Series 2004B | 5.000% | 12,705,000 | 04/01/2014 | 100.000% | YES | 2.252% | 286,117 | 1.982% | 251,847 | (34,269) | -3.877% |
| 07/28/2004 | 04/01/2019 | Series 2004B | 5.000% | 13,560,000 | 04/01/2014 | 100.000% | YES | 2.536% | 343,882 | 2.354% | 319,190 | (24,692) | -7.227% |
| 07/28/2004 | 04/01/2022 | Series 2004B | 5.000% | 16,205,000 | 04/01/2014 | 100.000% | YES | 2.766% | 448,230 | 3.120% | 505,668 | 57,438 | 3.735% |
| 07/28/2004 | 04/01/2023 | Series 2004B | 5.000% | 17,065,000 | 04/01/2014 | 100.000% | YES | 2.633% | 449,321 | 3.294% | 562,111 | 112,790 | 6.993% |
| 03/24/2005 | 04/01/2016 | Series 2005A | 3.950% | 670,000 | 04/01/2015 | 100.000% | YES | 0.000% | - | 0 | 0 | 0 | 0 |
| 03/24/2005 | 04/01/2017 | Series 2005A | 4.000% | 240,000 | 04/01/2015 | 100.000% | YES | 0.000% | - | 0 | 0 | 0 | 0 |
| 03/24/2005 | 04/01/2018 | Series 2005A | 4.100% | 2,930,000 | 04/01/2015 | 100.000% | YES | 0.101% | 2,959 | 0 | 0 | (2,959) | 0 |
| 03/24/2005 | 04/01/2019 | Series 2005A | 4.125% | 390,000 | 04/01/2015 | 100.000% | YES | 0.105% | 410 | 0 | 0 | (410) | 0 |
| 03/24/2005 | 04/01/2020 | Series 2005A | 4.200% | 800,000 | 04/01/2015 | 100.000% | YES | 0.222% | 1,776 | 0 | 0 | (1,776) | 0 |
| 03/24/2005 | 04/01/2021 | Series 2005A | 4.250% | 100,000 | 04/01/2015 | 100.000% | YES | 0.462% | 462 | 0 | 0 | (462) | 0 |
| 03/24/2005 | 04/01/2022 | Series 2005A | 4.300% | 680,000 | 04/01/2015 | 100.000% | YES | 0.721% | 4,903 | 0 | 0 | (4,903) | 0 |
| 03/24/2005 | 04/01/2023 | Series 2005A | 4.350% | 215,000 | 04/01/2015 | 100.000% | YES | 0.997% | 2,144 | 0 | 0 | (2,144) | 0 |
| 03/24/2005 | 04/01/2024 | Series 2005A | 4.375% | 305,000 | 04/01/2015 | 100.000% | YES | 1.289% | 3,931 | 0 | 0 | (3,931) | 0 |
| 03/24/2005 | 04/01/2025 | Series 2005A | 4.400% | 2,045,000 | 04/01/2015 | 100.000% | YES | 1.597% | 32,659 | 0 | 0 | (32,659) | 0 |
| 03/24/2005 | 04/01/2016 | Series 2005A | 5.250% | 4,995,000 | 04/01/2015 | 100.000% | YES | 0.831% | 41,508 | 0 | 0 | (41,508) | 0 |
| 03/24/2005 | 04/01/2017 | Series 2005A | 5.000% | 5,715,000 | 04/01/2015 | 100.000% | YES | 1.210% | 69,152 | 0.570% | 32,569 | (36,582) | -26.933% |
| 03/24/2005 | 04/01/2018 | Series 2005A | 5.000% | 3,320,000 | 04/01/2015 | 100.000% | YES | 1.760% | 58,432 | 1.172% | 38,904 | (19,528) | -15.033% |
| 03/24/2005 | 04/01/2019 | Series 2005A | 5.000% | 6,145,000 | 04/01/2015 | 100.000% | YES | 2.114% | 129,905 | 1.614% | 99,208 | (30,697) | -10.094% |
| 03/24/2005 | 04/01/2020 | Series 2005A | 5.000% | 6,060,000 | 04/01/2015 | 100.000% | YES | 2.525% | 153,015 | 1.967% | 119,184 | (33,831) | -9.373% |
| 03/24/2005 | 04/01/2021 | Series 2005A | 5.000% | 7,095,000 | 04/01/2015 | 100.000% | YES | 3.031% | 215,049 | 2.266% | 160,808 | (54,242) | -10.361% |
| 03/24/2005 | 04/01/2022 | Series 2005A | 5.000% | 6,875,000 | 04/01/2015 | 100.000% | YES | 3.454% | 237,463 | 2.521% | 173,315 | (64,147) | -11.740% |
| 03/24/2005 | 04/01/2023 | Series 2005A | 5.000% | 7,715,000 | 04/01/2015 | 100.000% | YES | 3.875% | 299,188 | 2.727% | 210,363 | (88,825) | -13.085% |
| 03/24/2005 | 04/01/2024 | Series 2005A | 5.000% | 8,020,000 | 04/01/2015 | 100.000% | YES | 4.265% | 342,053 | 2.944% | 236,083 | (105,970) | -13.750% |
| 03/24/2005 | 04/01/2025 | Series 2005A | 5.000% | 6,695,000 | 04/01/2015 | 100.000% | YES | 4.679% | 313,259 | 3.083% | 206,379 | (106,880) | -15.408% |
| 09/08/2005 | 04/01/2016 | Series 2005B | 5.000% | 306,880,000 | 10/01/2015 | 100.000% | NO | 0.369% | 1,132,387 | 0 | 0 | (1,132,387) | 0 |
| 09/08/2005 | 04/01/2017 | Series 2005B | 4.000% | 18,305,000 | 10/01/2015 | 100.000% | NO | 0.458% | 83,837 | 0 | 0 | (83,837) | 0 |
| 09/08/2005 | 04/01/2018 | Series 2005B | 4.000% | 50,080,000 | 10/01/2015 | 100.000% | NO | 0.927% | 463,500 | 0 | 0 | (463,500) | 0 |
| 09/08/2005 | 04/01/2019 | Series 2005B | 4.125% | 50,080,000 | 10/01/2015 | 100.000% | NO | 1.242% | 621,000 | 0 | 0 | (621,000) | 0 |
| 09/08/2005 | 04/01/2021 | Series 2005B | 5.000% | 241,440,000 | 10/01/2015 | 100.000% | NO | 3.767% | 9,095,045 | 1.957% | 4,723,858 | (4,371,187) | -28.299% |
| 09/08/2005 | 04/01/2022 | Series 2005B | 5.000% | 25,460,000 | 10/01/2015 | 100.000% | NO | 4.315% | 1,098,599 | 2.229% | 567,623 | (530,976) | -28.505% |
| 09/08/2005 | 04/01/2023 | Series 2005B | 5.000% | 26,735,000 | 10/01/2015 | 100.000% | NO | 4.984% | 1,332,472 | 2.451% | 655,325 | (677,147) | -30.464% |
| 09/08/2005 | 04/01/2024 | Series 2005B | 5.000% | 28,070,000 | 10/01/2015 | 100.000% | NO | 2.001% | 561,681 | 2.680% | 752,199 | 190,518 | 14.075% |
| 09/08/2005 | 04/01/2025 | Series 2005B | 4.125% | 5,210,000 | 10/01/2015 | 100.000% | NO | 1.022% | 53,246 | 0 | 0 | (53,246) | 0 |
| 09/08/2005 | 04/01/2017 | Series 2005B | 5.000% | 295,505,000 | 10/01/2015 | 100.000% | NO | 1.027% | 3,020,061 | 0.141% | 417,768 | (2,602,293) | -67.170% |
| 09/08/2005 | 04/01/2018 | Series 2005B | 5.000% | 259,950,000 | 10/01/2015 | 100.000% | NO | 1.600% | 4,159,200 | 0.777% | 2,018,715 | (2,140,485) | -30.984% |
| 09/08/2005 | 04/01/2019 | Series 2005B | 5.000% | 229,500,000 | 10/01/2015 | 100.000% | NO | 2.099% | 4,817,205 | 1.254% | 2,878,126 | (1,939,079) | -22.604% |
| 09/08/2005 | 04/01/2025 | Series 2005B | 5.000% | 24,265,000 | 10/01/2015 | 100.000% | NO | 5.646% | 1,370,002 | 2.832% | 687,210 | (682,792) | -20.683% |
| 07/27/2006 | 04/01/2017 | Series 2006A | 4.250% | 4,655,000 | 04/01/2016 | 100.000% | YES | 0.000% | - | 0 | 0 | 0 | 0 |
| 07/27/2006 | 04/01/2018 | Series 2006A | 4.250% | 9,845,000 | 04/01/2016 | 100.000% | YES | 0.000% | - | 0 | 0 | 0 | 0 |
| 07/27/2006 | 04/01/2019 | Series 2006A | 5.000% | 18,465,000 | 04/01/2016 | 100.000% | YES | 1.194% | 220,472 | 0.900% | 166,158 | (54,314) | -21.316% |
| 07/27/2006 | 04/01/2020 | Series 2006A | 5.000% | 19,385,000 | 04/01/2016 | 100.000% | YES | 1.561% | 302,600 | 1.308% | 253,650 | (48,950) | -13.514% |
| 07/27/2006 | 04/01/2021 | Series 2006A | 5.000% | 20,355,000 | 04/01/2016 | 100.000% | YES | 1.766% | 359,876 | 1.652% | 336,311 | (23,565) | -5.799% |
| 07/27/2006 | 04/01/2022 | Series 2006A | 5.000% | 21,375,000 | 04/01/2016 | 100.000% | YES | 1.954% | 417,668 | 1.943% | 415,398 | (2,270) | -0.452% |
| 07/27/2006 | 04/01/2023 | Series 2006A | 5.000% | 22,440,000 | 04/01/2016 | 100.000% | YES | 2.095% | 470,118 | 2.181% | 489,416 | 19,298 | 3.215% |
| 07/27/2006 | 04/01/2024 | Series 2006A | 5.000% | 23,565,000 | 04/01/2016 | 100.000% | YES | 2.197% | 517,723 | 2.421% | 570,470 | 52,747 | 7.843% |
| 07/27/2006 | 04/01/2025 | Series 2006A | 5.000% | 24,745,000 | 04/01/2016 | 100.000% | YES | 2.311% | 571,857 | 2.586% | 640,019 | 68,162 | 9.132% |
| 07/27/2006 | 04/01/2026 | Series 2006A | 4.500% | 1,700,000 | 04/01/2016 | 100.000% | YES | 0.129% | 2,193 | 0 | 0 | (2,193) | 0 |
| 07/27/2006 | 04/01/2017 | Series 2006A | 5.000% | 12,190,000 | 04/01/2016 | 100.000% | YES | 0.477% | 58,146 | 0 | 0 | (58,146) | 0 |
| 07/27/2006 | 04/01/2018 | Series 2006A | 5.000% | 7,810,000 | 04/01/2016 | 100.000% | YES | 0.866% | 67,635 | 0.388% | 30,297 | (37,337) | -54.537% |

Note: Partial Refundings Do Not Account for % Actually Refundable.

Schedule 1
Option Value Monitor

FIG. 2F

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 07/27/2006 | 04/01/2026 | Series 2006A | 5.000% | 24,280,000 | 04/01/2016 | 100.000% | YES | 2.453% | 595,588 | 2.729% | 662,516 | 66,927 | 8.625% |
| 03/28/2007 | 04/01/2018 | Series 2007A | 3.875% | 2,760,000 | 04/01/2017 | 100.000% | YES | 0.000% | - | 0 | 0 | 0 | 0 |
| 03/28/2007 | 04/01/2019 | Series 2007A | 5.000% | 18,260,000 | 04/01/2017 | 100.000% | YES | 1.410% | 257,466 | 0.209% | 38,245 | (219,221) | -120.662% |
| 03/28/2007 | 04/01/2020 | Series 2007A | 5.000% | 19,175,000 | 04/01/2017 | 100.000% | YES | 2.011% | 385,609 | 0.673% | 129,117 | (256,492) | -105.517% |
| 03/28/2007 | 04/01/2021 | Series 2007A | 5.000% | 20,135,000 | 04/01/2017 | 100.000% | YES | 2.575% | 518,476 | 1.060% | 213,473 | (305,003) | -97.406% |
| 03/28/2007 | 04/01/2022 | Series 2007A | 5.000% | 21,140,000 | 04/01/2017 | 100.000% | YES | 3.056% | 646,038 | 1.387% | 293,224 | (352,814) | -93.139% |
| 03/28/2007 | 04/01/2023 | Series 2007A | 5.000% | 22,200,000 | 04/01/2017 | 100.000% | YES | 3.477% | 771,894 | 1.656% | 367,655 | (404,239) | -89.951% |
| 03/28/2007 | 04/01/2024 | Series 2007A | 5.000% | 23,310,000 | 04/01/2017 | 100.000% | YES | 3.889% | 906,526 | 1.918% | 447,065 | (459,461) | -90.638% |
| 03/28/2007 | 04/01/2025 | Series 2007A | 5.000% | 24,475,000 | 04/01/2017 | 100.000% | YES | 4.309% | 1,054,628 | 2.109% | 516,263 | (538,364) | -91.768% |
| 03/28/2007 | 04/01/2026 | Series 2007A | 5.000% | 25,695,000 | 04/01/2017 | 100.000% | YES | 4.700% | 1,207,665 | 2.273% | 583,956 | (623,709) | 0 |
| 03/28/2007 | 04/01/2027 | Series 2007A | 4.050% | 155,000 | 04/01/2017 | 100.000% | YES | 0.000% | - | 0 | 0 | 0 | 0 |
| 03/28/2007 | 04/01/2018 | Series 2007A | 5.000% | 14,660,000 | 04/01/2017 | 100.000% | YES | 0.741% | 108,631 | 0 | 0 | (108,631) | -91.078% |
| 03/28/2007 | 04/01/2027 | Series 2007A | 5.000% | 26,825,000 | 04/01/2017 | 100.000% | YES | 5.063% | 1,358,150 | 2.467% | 661,679 | (696,471) |  |
| 06/20/2007 | 04/01/2018 | Series 2007B | 4.125% | 5,920,000 | 10/01/2017 | 100.000% | YES | 0.000% | - | 0 | 0 | 0 | 0 |
| 06/20/2007 | 04/01/2019 | Series 2007B | 4.250% | 2,330,000 | 10/01/2017 | 100.000% | YES | 0.009% | 210 | 0 | 0 | (210) | 0 |
| 06/20/2007 | 04/01/2020 | Series 2007B | 4.250% | 515,000 | 10/01/2017 | 100.000% | YES | 0.000% | - | 0 | 0 | 0 | 0 |
| 06/20/2007 | 04/01/2021 | Series 2007B | 4.250% | 1,200,000 | 10/01/2017 | 100.000% | YES | 0.000% | - | 0 | 0 | 0 | 0 |
| 06/20/2007 | 04/01/2022 | Series 2007B | 4.250% | 930,000 | 10/01/2017 | 100.000% | YES | 0.644% | 5,989 | 0 | 0 | (5,989) | 0 |
| 06/20/2007 | 04/01/2023 | Series 2007B | 4.250% | 5,460,000 | 10/01/2017 | 100.000% | YES | 1.228% | 67,294 | 0 | 0 | (67,294) | 0 |
| 06/20/2007 | 04/01/2024 | Series 2007B | 4.500% | 3,045,000 | 10/01/2017 | 100.000% | YES | 1.371% | 41,747 | 0 | 0 | (41,747) | 0 |
| 06/20/2007 | 04/01/2027 | Series 2007B | 4.500% | 5,200,000 | 10/01/2017 | 100.000% | YES | 1.305% | 67,860 | 0 | 0 | (67,860) | 0 |
| 06/20/2007 | 04/01/2018 | Series 2007B | 5.000% | 11,850,000 | 10/01/2017 | 100.000% | YES | 0.255% | 30,218 | 0 | 0 | (30,218) | 0 |
| 06/20/2007 | 04/01/2019 | Series 2007B | 5.000% | 16,280,000 | 10/01/2017 | 100.000% | YES | 0.710% | 115,588 | 0 | 0 | (115,588) | 0 |
| 06/20/2007 | 04/01/2020 | Series 2007B | 5.000% | 19,005,000 | 10/01/2017 | 100.000% | YES | 1.093% | 207,725 | 0.364% | 69,226 | (138,499) | 0 |
| 06/20/2007 | 04/01/2021 | Series 2007B | 5.000% | 19,295,000 | 10/01/2017 | 100.000% | YES | 1.432% | 276,304 | 0.772% | 149,019 | (127,285) | -114.378% |
| 06/20/2007 | 04/01/2022 | Series 2007B | 5.000% | 20,580,000 | 10/01/2017 | 100.000% | YES | 1.746% | 359,327 | 1.117% | 229,807 | (129,520) | -91.784% |
| 06/20/2007 | 04/01/2023 | Series 2007B | 5.000% | 17,100,000 | 10/01/2017 | 100.000% | YES | 2.023% | 345,933 | 1.401% | 239,606 | (106,327) | -79.253% |
| 06/20/2007 | 04/01/2024 | Series 2007B | 5.000% | 20,620,000 | 10/01/2017 | 100.000% | YES | 2.264% | 466,837 | 1.674% | 345,117 | (121,719) | -67.944% |
| 06/20/2007 | 04/01/2025 | Series 2007B | 5.000% | 24,835,000 | 10/01/2017 | 100.000% | YES | 2.952% | 733,129 | 1.878% | 466,338 | (266,792) | -92.587% |
| 06/20/2007 | 04/01/2026 | Series 2007B | 5.000% | 26,075,000 | 10/01/2017 | 100.000% | YES | 2.952% | 769,734 | 2.051% | 534,921 | (234,813) | -78.700% |
| 06/20/2007 | 04/01/2027 | Series 2007B | 5.000% | 22,180,000 | 10/01/2017 | 100.000% | YES | 2.952% | 654,754 | 2.252% | 499,411 | (155,343) | -62.147% |

Schedule 1
Option Value Monitor

FIG. 2G

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 05/15/1997 | 01/01/2008 | Series D | 5.200% | 8,300,000 | 01/01/2007 | 102.000% | YES | 0.180% | 14,940 | 0 | 0 | (14,940) | 0 |
| 05/15/1997 | 01/01/2009 | Series D | 5.300% | 8,730,000 | 01/01/2007 | 102.000% | YES | 0.684% | 59,713 | 0 | 0 | (59,713) | 0 |
| 06/18/1998 | 01/01/2009 | Series E | 5.250% | 21,015,000 | 01/01/2008 | 101.000% | NO | 0.428% | 89,944 | 0 | 0 | (89,944) | 0 |
| 03/30/2005 | 01/01/2016 | Series F | 3.900% | 55,000 | 01/01/2015 | 100.000% | PART | 0.000% | - | 0 | 0 | 0 | 0 |
| 03/30/2005 | 01/01/2017 | Series F | 4.000% | 2,940,000 | 01/01/2015 | 100.000% | PART | 0.000% | - | 0 | 0 | 0 | 0 |
| 03/30/2005 | 01/01/2018 | Series F | 4.000% | 3,730,000 | 01/01/2015 | 100.000% | PART | 0.000% | - | 0 | 0 | 0 | 0 |
| 03/30/2005 | 01/01/2019 | Series F | 4.125% | 815,000 | 01/01/2015 | 100.000% | PART | 0.000% | - | 0 | 0 | 0 | 0 |
| 03/30/2005 | 01/01/2020 | Series F | 4.125% | 345,000 | 01/01/2015 | 100.000% | PART | 0.000% | - | 0 | 0 | 0 | 0 |
| 03/30/2005 | 01/01/2021 | Series F | 4.200% | 25,000 | 01/01/2015 | 100.000% | PART | 0.114% | 29 | 0 | 0 | (29) | 0 |
| 03/30/2005 | 01/01/2022 | Series F | 4.250% | 120,000 | 01/01/2015 | 100.000% | PART | 0.237% | 284 | 0 | 0 | (284) | 0 |
| 03/30/2005 | 01/01/2023 | Series F | 4.300% | 50,000 | 01/01/2015 | 100.000% | PART | 0.491% | 246 | 0 | 0 | (246) | 0 |
| 03/30/2005 | 01/01/2024 | Series F | 4.300% | 100,000 | 01/01/2015 | 100.000% | PART | 0.632% | 632 | 0 | 0 | (632) | 0 |
| 03/30/2005 | 01/01/2025 | Series F | 4.375% | 275,000 | 01/01/2015 | 100.000% | PART | 0.918% | 2,525 | 0 | 0 | (2,525) | 0 |
| 03/30/2005 | 01/01/2026 | Series F | 5.000% | 30,305,000 | 01/01/2015 | 100.000% | PART | 4.225% | 1,280,386 | 3.293% | 997,826 | (282,560) | -9.413% |
| 03/30/2005 | 01/01/2027 | Series F | 4.500% | 725,000 | 01/01/2015 | 100.000% | PART | 1.193% | 8,649 | 0.045% | 329 | (8,321) | -84.494% |
| 03/30/2005 | 01/01/2028 | Series F | 4.500% | 725,000 | 01/01/2015 | 100.000% | PART | 1.193% | 8,649 | 0 | 0 | (8,649) | 0 |
| 03/30/2005 | 01/01/2029 | Series F | 4.500% | 725,000 | 01/01/2015 | 100.000% | PART | 1.193% | 8,649 | 0 | 0 | (8,649) | 0 |
| 03/30/2005 | 01/01/2030 | Series F | 4.500% | 740,000 | 01/01/2015 | 100.000% | PART | 1.193% | 8,826 | 0 | 0 | (8,826) | 0 |
| 03/30/2005 | 01/01/2016 | Series F | 5.000% | 31,010,000 | 01/01/2015 | 100.000% | PART | 0.667% | 206,837 | 0 | 0 | (206,837) | -24.363% |
| 03/30/2005 | 01/01/2017 | Series F | 5.000% | 29,680,000 | 01/01/2015 | 100.000% | PART | 1.208% | 358,534 | 0.617% | 183,121 | (175,413) | -10.782% |
| 03/30/2005 | 01/01/2018 | Series F | 5.000% | 26,105,000 | 01/01/2015 | 100.000% | PART | 1.653% | 431,516 | 1.241% | 322,980 | (107,536) | -6.660% |
| 03/30/2005 | 01/01/2019 | Series F | 5.000% | 30,465,000 | 01/01/2015 | 100.000% | PART | 2.026% | 617,221 | 1.700% | 518,049 | (99,172) | -5.096% |
| 03/30/2005 | 01/01/2020 | Series F | 4.500% | 32,500,000 | 01/01/2015 | 100.000% | PART | 2.350% | 763,750 | 2.056% | 668,300 | (95,450) | -5.643% |
| 03/30/2005 | 01/01/2021 | Series F | 5.000% | 34,525,000 | 01/01/2015 | 100.000% | PART | 2.732% | 943,223 | 2.356% | 813,442 | (129,781) | -5.513% |
| 03/30/2005 | 01/01/2022 | Series F | 5.000% | 36,140,000 | 01/01/2015 | 100.000% | PART | 3.019% | 1,091,067 | 2.613% | 944,208 | (146,859) | -6.920% |
| 03/30/2005 | 01/01/2023 | Series F | 5.000% | 38,030,000 | 01/01/2015 | 100.000% | PART | 3.379% | 1,285,034 | 2.816% | 1,071,062 | (213,972) | -6.660% |
| 03/30/2005 | 01/01/2024 | Series F | 5.000% | 39,885,000 | 01/01/2015 | 100.000% | PART | 3.612% | 1,440,646 | 3.031% | 1,209,069 | (231,577) | -8.693% |
| 03/30/2005 | 01/01/2025 | Series F | 5.000% | 28,600,000 | 01/01/2015 | 100.000% | PART | 4.001% | 1,144,286 | 3.179% | 909,314 | (234,972) | -12.09% |
| 03/30/2005 | 01/01/2027 | Series F | 5.000% | 31,105,000 | 01/01/2015 | 100.000% | PART | 4.760% | 1,480,598 | 3.455% | 1,074,829 | (405,769) | -12.445% |
| 03/30/2005 | 01/01/2028 | Series F | 5.000% | 10,325,000 | 01/01/2015 | 100.000% | PART | 4.760% | 491,470 | 3.414% | 352,525 | (138,945) | -13.614% |
| 03/30/2005 | 01/01/2029 | Series F | 5.000% | 10,875,000 | 01/01/2015 | 100.000% | PART | 4.760% | 517,650 | 3.306% | 359,480 | (158,170) | -14.800% |
| 03/30/2005 | 01/01/2030 | Series F | 5.000% | 11,435,000 | 01/01/2015 | 100.000% | PART | 4.760% | 544,306 | 3.198% | 365,722 | (178,584) | 0 |
| 09/29/2005 | 01/01/2016 | Series G | 3.750% | 580,000 | 07/01/2015 | 100.000% | YES | 0.000% | - | 0 | 0 | 0 | 0 |
| 09/29/2005 | 01/01/2017 | Series G | 3.750% | 605,000 | 07/01/2015 | 100.000% | YES | 0.000% | - | 0 | 0 | 0 | 0 |
| 09/29/2005 | 01/01/2018 | Series G | 4.000% | 620,000 | 07/01/2015 | 100.000% | YES | 0.000% | - | 0 | 0 | 0 | 0 |
| 09/29/2005 | 01/01/2019 | Series G | 4.000% | 655,000 | 07/01/2015 | 100.000% | YES | 0.000% | - | 0 | 0 | 0 | 0 |
| 09/29/2005 | 01/01/2020 | Series G | 4.000% | 675,000 | 07/01/2015 | 100.000% | YES | 0.106% | 716 | 0 | 0 | (716) | 0 |
| 09/29/2005 | 01/01/2021 | Series G | 4.000% | 630,000 | 07/01/2015 | 100.000% | YES | 0.223% | 1,405 | 0 | 0 | (1,405) | 0 |
| 09/29/2005 | 01/01/2022 | Series G | 4.125% | 680,000 | 07/01/2015 | 100.000% | YES | 0.350% | 2,380 | 0 | 0 | (2,380) | 0 |
| 09/29/2005 | 01/01/2023 | Series G | 4.250% | 695,000 | 07/01/2015 | 100.000% | YES | 0.481% | 3,343 | 0 | 0 | (3,343) | 0 |
| 09/29/2005 | 01/01/2024 | Series G | 5.000% | 25,130,000 | 07/01/2015 | 100.000% | YES | 4.554% | 1,146,933 | 2.761% | 693,941 | (452,992) | -22.664% |
| 09/29/2005 | 01/01/2025 | Series G | 5.000% | 39,500,000 | 07/01/2015 | 100.000% | YES | 4.869% | 1,973,255 | 2.923% | 1,154,746 | (768,509) | -22.995% |
| 09/29/2005 | 01/01/2026 | Series G | 5.000% | 63,315,000 | 07/01/2015 | 100.000% | YES | 5.256% | 3,327,836 | 3.048% | 1,930,096 | (1,397,740) | -24.450% |
| 09/29/2005 | 01/01/2027 | Series G | 5.125% | 10,000,000 | 07/01/2015 | 100.000% | YES | 5.247% | 524,700 | 4.024% | 402,374 | (122,326) | -17.313% |
| 09/29/2005 | 01/01/2028 | Series G | 5.000% | 25,000,000 | 07/01/2015 | 100.000% | YES | 5.412% | 1,353,000 | 3.315% | 828,733 | (524,267) | -22.142% |
| 09/29/2005 | 01/01/2029 | Series G | 4.750% | 96,855,000 | 07/01/2015 | 100.000% | YES | 5.648% | 5,470,370 | 1.485% | 1,438,069 | (4,032,302) | -54.619% |
| 09/29/2005 | 01/01/2031 | Series G | 5.000% | 119,185,000 | 07/01/2015 | 100.000% | YES | 7.195% | 8,575,361 | 3.093% | 3,683,499 | (4,891,862) | -36.625% |
| 09/29/2005 | 01/01/2032 | Series G | 5.000% | 125,145,000 | 07/01/2015 | 100.000% | YES | 7.195% | 9,004,183 | 2.996% | 3,752,234 | (5,251,948) | -37.806% |

Note: Partial Refundings Do Not Account for % Actually Refundable.

Schedule 1
Option Value Monitor

FIG. 2H

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 09/29/2005 | 01/01/2027 | Series G | 5.250% | 56,470,000 | 07/01/2015 | 100.000% | YES | 5.417% | 3,056,156 | 4.830% | 2,727,396 | (328,761) | -5.375% |
| 09/29/2005 | 01/01/2028 | Series G | 4.750% | 30,000,000 | 07/01/2015 | 100.000% | YES | 6.440% | 1,932,000 | 1.592% | 477,464 | (1,454,536) | -56.640% |
| 09/29/2005 | 01/01/2030 | Series G | 4.750% | 50,000,000 | 07/01/2015 | 100.000% | YES | 6.440% | 3,220,000 | 1.290% | 645,022 | (2,574,978) | -62.673% |
| 09/29/2005 | 01/01/2028 | Series G | 5.000% | 37,315,000 | 07/01/2015 | 100.000% | YES | 6.650% | 2,481,448 | 3.315% | 1,236,967 | (1,244,481) | -30.699% |
| 09/29/2005 | 01/01/2030 | Series G | 5.000% | 51,455,000 | 07/01/2015 | 100.000% | YES | 6.650% | 3,421,758 | 3.192% | 1,642,556 | (1,779,201) | -32.221% |
| 10/11/2007 | 01/01/2019 | Series H | 5.000% | 48,990,000 | 01/01/2018 | 100.000% | PART | 0.699% | 342,440 | 0 | 0 | (342,440) | 0 |
| 10/11/2007 | 01/01/2020 | Series H | 5.000% | 51,440,000 | 01/01/2018 | 100.000% | PART | 1.217% | 626,025 | 0.095% | 48,938 | (577,087) | > -120.0% |
| 10/11/2007 | 01/01/2021 | Series H | 5.000% | 54,015,000 | 01/01/2018 | 100.000% | PART | 1.753% | 946,883 | 0.533% | 287,656 | (659,227) | > -120.0% |
| 10/11/2007 | 01/01/2022 | Series H | 5.000% | 56,710,000 | 01/01/2018 | 100.000% | PART | 2.131% | 1,208,490 | 0.901% | 510,933 | (697,557) | > -120.0% |
| 10/11/2007 | 01/01/2023 | Series H | 5.000% | 59,550,000 | 01/01/2018 | 100.000% | PART | 2.412% | 1,436,346 | 1.206% | 717,971 | (718,375) | > -120.0% |
| 10/11/2007 | 01/01/2024 | Series H | 5.000% | 38,120,000 | 01/01/2018 | 100.000% | PART | 2.731% | 1,041,057 | 1.488% | 567,270 | (473,787) | > -120.0% |
| 10/11/2007 | 01/01/2025 | Series H | 5.000% | 40,020,000 | 01/01/2018 | 100.000% | PART | 2.969% | 1,188,194 | 1.715% | 686,532 | (501,662) | > -120.0% |
| 10/11/2007 | 01/01/2026 | Series H | 5.000% | 20,195,000 | 01/01/2018 | 100.000% | PART | 3.162% | 638,566 | 1.898% | 383,251 | (255,315) | > -120.0% |
| 10/11/2007 | 01/01/2027 | Series H | 4.250% | 4,125,000 | 01/01/2018 | 100.000% | PART | 0.257% | 10,601 | 0 | 0 | (10,601) | 0 |
| 10/11/2007 | 01/01/2028 | Series H | 5.000% | 22,235,000 | 01/01/2018 | 100.000% | PART | 3.480% | 773,778 | 2.246% | 499,365 | (274,413) | > -120.0% |
| 10/11/2007 | 01/01/2029 | Series H | 5.000% | 23,345,000 | 01/01/2018 | 100.000% | PART | 3.821% | 892,012 | 2.349% | 548,326 | (343,686) | > -120.0% |
| 10/11/2007 | 01/01/2030 | Series H | 5.000% | 24,515,000 | 01/01/2018 | 100.000% | PART | 4.930% | 1,208,590 | 2.434% | 596,754 | (611,836) | > -120.0% |
| 10/11/2007 | 01/01/2031 | Series H | 5.000% | 25,740,000 | 01/01/2018 | 100.000% | PART | 4.239% | 1,091,119 | 2.506% | 645,163 | (445,956) | > -120.0% |
| 10/11/2007 | 01/01/2032 | Series H | 5.000% | 27,025,000 | 01/01/2018 | 100.000% | PART | 4.239% | 1,145,590 | 2.569% | 694,402 | (451,188) | > -120.0% |
| 10/11/2007 | 01/01/2033 | Series H | 5.000% | 28,360,000 | 01/01/2018 | 100.000% | PART | 4.806% | 1,363,943 | 2.627% | 745,584 | (618,359) | > -120.0% |
| 10/11/2007 | 01/01/2034 | Series H | 5.000% | 29,800,000 | 01/01/2018 | 100.000% | PART | 4.806% | 1,432,188 | 2.683% | 799,528 | (632,660) | > -120.0% |
| 10/11/2007 | 01/01/2035 | Series H | 5.000% | 31,290,000 | 01/01/2018 | 100.000% | PART | 4.806% | 1,503,797 | 2.740% | 857,411 | (646,386) | > -120.0% |
| 10/11/2007 | 01/01/2036 | Series H | 5.000% | 32,850,000 | 01/01/2018 | 100.000% | PART | 4.806% | 1,578,771 | 2.802% | 920,384 | (658,357) | > -120.0% |
| 10/11/2007 | 01/01/2037 | Series H | 5.000% | 34,495,000 | 01/01/2018 | 100.000% | PART | 4.806% | 1,657,830 | 2.870% | 990,140 | (667,690) | > -120.0% |
| 10/11/2007 | 01/01/2027 | Series H | 5.000% | 17,080,000 | 01/01/2018 | 100.000% | PART | 3.311% | 565,519 | 2.098% | 358,295 | (207,223) | > -120.0% |

Schedule 1
Option Value Monitor

FIG. 21

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 09/14/1995 | 01/01/2008 | Series 1995A | 5.300% | 10,815,000 | 01/01/2005 | 102.000% | YES | 0.000% | - | 0 | 0 | 0 | 0 |
| 09/11/1997 | 04/01/2008 | Series 1997 | 5.100% | 30,865,000 | 04/01/2007 | 102.000% | NO | 0.161% | 49,693 | 0 | 0 | (49,693) | 0 |
| 09/11/1997 | 04/01/2009 | Series 1997 | 5.200% | 32,440,000 | 04/01/2007 | 102.000% | NO | 0.601% | 194,964 | 0 | 0 | (194,964) | 0 |
| 09/02/1998 | 04/01/2009 | Series 1998A | 4.500% | 3,000,000 | 04/01/2008 | 101.000% | NO | 0.165% | 4,950 | 0 | 0 | (4,950) | 0 |
| 09/02/1998 | 04/01/2009 | Series 1998A | 5.375% | 38,910,000 | 04/01/2008 | 101.000% | NO | 0.172% | 66,925 | 0 | 0 | (66,925) | 0 |
| 09/02/1998 | 04/01/2010 | Series 1998A | 5.375% | 10,700,000 | 04/01/2008 | 101.000% | NO | 0.636% | 68,052 | 1.655% | 177,130 | 109,078 | 10.716% |
| 09/02/1998 | 04/01/2011 | Series 1998A | 5.250% | 4,345,000 | 04/01/2008 | 101.000% | NO | 1.411% | 61,308 | 2.910% | 126,455 | 65,147 | 8.058% |
| 09/02/1998 | 04/01/2012 | Series 1998A | 5.250% | 4,570,000 | 04/01/2008 | 101.000% | NO | 1.757% | 80,295 | 4.224% | 193,016 | 112,721 | 9.804% |
| 09/02/1998 | 04/01/2013 | Series 1998A | 5.250% | 4,810,000 | 04/01/2008 | 101.000% | NO | 1.794% | 86,291 | 5.424% | 260,882 | 174,590 | 12.445% |
| 09/02/1998 | 04/01/2014 | Series 1998A | 5.250% | 5,065,000 | 04/01/2008 | 101.000% | NO | 2.007% | 101,655 | 6.470% | 327,707 | 226,053 | 13.190% |
| 09/02/1998 | 04/01/2015 | Series 1998A | 5.250% | 10,025,000 | 04/01/2008 | 101.000% | NO | 2.057% | 206,214 | 7.289% | 730,685 | 524,471 | 14.293% |
| 09/02/1998 | 04/01/2016 | Series 1998A | 5.000% | 5,360,000 | 04/01/2008 | 101.000% | NO | 2.492% | 133,464 | 6.166% | 330,510 | 197,046 | 10.144% |
| 09/16/1998 | 04/01/2009 | Series 1998B | 4.375% | 400,000 | 04/01/2008 | 101.000% | NO | 0.167% | 668 | 0 | 0 | (668) | 0 |
| 09/16/1998 | 04/01/2010 | Series 1998B | 4.400% | 415,000 | 04/01/2008 | 101.000% | NO | 0.445% | 1,847 | 0 | 0 | (1,847) | 0 |
| 09/16/1998 | 04/01/2011 | Series 1998B | 5.375% | 29,055,000 | 04/01/2008 | 101.000% | NO | 1.440% | 418,392 | 3.258% | 946,630 | 528,238 | 9.151% |
| 09/16/1998 | 04/01/2012 | Series 1998B | 5.375% | 30,600,000 | 04/01/2008 | 101.000% | NO | 1.912% | 585,454 | 4.679% | 1,432,672 | 847,217 | 10.052% |
| 09/16/1998 | 04/01/2013 | Series 1998B | 5.375% | 32,770,000 | 04/01/2008 | 101.000% | NO | 2.149% | 693,482 | 5.983% | 1,930,583 | 1,237,100 | 11.541% |
| 09/16/1998 | 04/01/2014 | Series 1998B | 5.375% | 34,000,000 | 04/01/2008 | 101.000% | NO | 2.561% | 870,740 | 7.128% | 2,423,591 | 1,552,851 | 11.539% |
| 09/07/2000 | 04/01/2011 | Series 2000 | 4.875% | 3,815,000 | 04/01/2010 | 101.000% | YES | 0.245% | 9,347 | 0 | 0 | (9,347) | 0 |
| 09/07/2000 | 04/01/2012 | Series 2000 | 4.900% | 9,210,000 | 04/01/2010 | 101.000% | YES | 0.252% | 23,209 | 0.427% | 39,305 | 16,096 | 7.505% |
| 09/07/2000 | 04/01/2011 | Series 2000 | 5.500% | 14,045,000 | 04/01/2010 | 101.000% | YES | 0.434% | 60,955 | 0 | 0 | (60,955) | 0 |
| 11/29/2001 | 04/01/2012 | Series 2001 | 4.000% | 2,670,000 | 04/01/2011 | 100.000% | YES | 0.167% | 4,459 | 0 | 0 | (4,459) | 0 |
| 11/29/2001 | 04/01/2013 | Series 2001 | 4.125% | 820,000 | 04/01/2011 | 100.000% | YES | 0.971% | 7,962 | 0 | 0 | (7,962) | 0 |
| 11/29/2001 | 04/01/2014 | Series 2001 | 4.250% | 780,000 | 04/01/2011 | 100.000% | YES | 0.448% | 3,494 | 0.492% | 3,839 | 345 | 1.596% |
| 11/29/2001 | 04/01/2015 | Series 2001 | 4.375% | 775,000 | 04/01/2011 | 100.000% | YES | 0.858% | 6,650 | 1.148% | 8,901 | 2,251 | 4.985% |
| 11/29/2001 | 04/01/2012 | Series 2001 | 5.250% | 7,270,000 | 04/01/2011 | 100.000% | YES | 1.308% | 95,092 | 0.415% | 30,193 | (64,899) | 15.334% |
| 08/07/2002 | 04/01/2013 | Series 2002 | 5.500% | 92,310,000 | 04/01/2012 | 100.000% | NO | 1.132% | 1,044,949 | 0.508% | 468,931 | (576,019) | 14.739% |
| 08/07/2002 | 04/01/2014 | Series 2002 | 5.500% | 74,555,000 | 04/01/2012 | 100.000% | NO | 1.908% | 1,422,509 | 1.961% | 1,462,198 | 39,689 | 0 |
| 08/07/2002 | 04/01/2015 | Series 2002 | 5.500% | 59,150,000 | 04/01/2012 | 100.000% | NO | 2.825% | 1,670,988 | 3.243% | 1,917,983 | 246,995 | 2.652% |
| 08/07/2002 | 04/01/2016 | Series 2002 | 5.500% | 20,910,000 | 04/01/2012 | 100.000% | NO | 3.419% | 714,913 | 4.309% | 900,974 | 186,061 | 4.469% |
| 08/07/2002 | 04/01/2017 | Series 2002 | 5.500% | 270,000 | 04/01/2012 | 100.000% | NO | 4.185% | 11,300 | 5.204% | 14,050 | 2,750 | 4.207% |

Note: Partial Refundings Do Not Account for % Actually Refundable.

FIG. 2J

Schedule 1
Option Value Monitor

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 08/07/2002 | 03/15/2013 | Series 2002A | 4.000% | 4,410,000 | 03/15/2012 | 100.000% | YES | 0.170% | 7,497 | 0 | 0 | (7,497) | 0 |
| 08/07/2002 | 03/15/2014 | Series 2002A | 4.175% | 2,245,000 | 03/15/2012 | 100.000% | YES | 0.183% | 4,108 | 0 | 0 | (4,108) | 0 |
| 08/07/2002 | 03/15/2018 | Series 2002A | 4.500% | 1,395,000 | 03/15/2012 | 100.000% | YES | 1.230% | 17,159 | 1.466% | 20,451 | 3,293 | 3.383% |
| 08/07/2002 | 03/15/2019 | Series 2002A | 4.600% | 700,000 | 03/15/2012 | 100.000% | YES | 1.393% | 9,751 | 1.892% | 13,244 | 3,493 | 5.928% |
| 08/07/2002 | 03/15/2020 | Series 2002A | 4.700% | 2,110,000 | 03/15/2012 | 100.000% | YES | 1.556% | 32,832 | 2.404% | 50,733 | 17,901 | 8.491% |
| 08/07/2002 | 03/15/2021 | Series 2002A | 4.850% | 400,000 | 03/15/2012 | 100.000% | YES | 1.593% | 6,372 | 3.337% | 13,347 | 6,975 | 14.639% |
| 08/07/2002 | 03/15/2022 | Series 2002A | 4.900% | 5,030,000 | 03/15/2012 | 100.000% | YES | 1.633% | 81,977 | 3.577% | 179,541 | 97,565 | 15.556% |
| 08/07/2002 | 03/15/2021 | Series 2002A | 5.125% | 18,120,000 | 03/15/2012 | 100.000% | YES | 2.887% | 523,124 | 5.056% | 916,171 | 393,046 | 11.000% |
| 08/07/2002 | 03/15/2022 | Series 2002A | 5.000% | 14,440,000 | 03/15/2012 | 100.000% | YES | 1.940% | 280,136 | 4.256% | 614,573 | 334,437 | 15.590% |
| 07/23/2003 | 03/15/2014 | Series 2003A | 3.625% | 2,660,000 | 03/15/2013 | 100.000% | YES | 0.079% | 2,117 | 0 | 0 | (2,117) | 0 |
| 07/23/2003 | 03/15/2015 | Series 2003A | 3.750% | 1,100,000 | 03/15/2013 | 100.000% | YES | 0.171% | 1,881 | 0 | 0 | (1,881) | 0 |
| 07/23/2003 | 03/15/2016 | Series 2003A | 3.875% | 795,000 | 03/15/2013 | 100.000% | YES | 0.366% | 2,910 | 0 | 0 | (2,910) | 0 |
| 07/23/2003 | 03/15/2017 | Series 2003A | 3.900% | 4,475,000 | 03/15/2013 | 100.000% | YES | 0.486% | 21,749 | 0 | 0 | (21,749) | 0 |
| 07/23/2003 | 03/15/2018 | Series 2003A | 4.000% | 2,495,000 | 03/15/2013 | 100.000% | YES | 0.617% | 15,394 | 0 | 0 | (15,394) | 0 |
| 07/23/2003 | 03/15/2019 | Series 2003A | 4.100% | 1,065,000 | 03/15/2013 | 100.000% | YES | 0.758% | 8,073 | 0 | 0 | (8,073) | 0 |
| 07/23/2003 | 03/15/2020 | Series 2003A | 4.200% | 1,910,000 | 03/15/2013 | 100.000% | YES | 0.903% | 17,247 | 0 | 0 | (17,247) | 0 |
| 07/23/2003 | 03/15/2021 | Series 2003A | 4.250% | 2,560,000 | 03/15/2013 | 100.000% | YES | 1.059% | 27,110 | 0 | 0 | (27,110) | 0 |
| 07/23/2003 | 03/15/2022 | Series 2003A | 4.300% | 1,485,000 | 03/15/2013 | 100.000% | YES | 1.219% | 18,102 | 0 | 0 | (18,102) | 0 |
| 07/23/2003 | 03/15/2023 | Series 2003A | 4.400% | 17,200,000 | 03/15/2013 | 100.000% | YES | 1.260% | 216,720 | 0.023% | 3,950 | (212,770) | -97.947% |
| 07/23/2003 | 03/15/2019 | Series 2003A | 5.000% | 20,455,000 | 03/15/2013 | 100.000% | YES | 4.092% | 837,019 | 3.142% | 642,672 | (194,346) | -6.090% |
| 07/23/2003 | 03/15/2020 | Series 2003A | 5.000% | 20,675,000 | 03/15/2013 | 100.000% | YES | 4.346% | 898,536 | 3.378% | 698,338 | (200,197) | -5.814% |
| 07/23/2003 | 03/15/2021 | Series 2003A | 5.000% | 21,140,000 | 03/15/2013 | 100.000% | YES | 4.501% | 951,511 | 3.586% | 758,098 | (193,414) | -5.249% |
| 07/23/2003 | 03/15/2022 | Series 2003A | 5.000% | 23,380,000 | 03/15/2013 | 100.000% | YES | 4.681% | 1,094,418 | 3.764% | 880,075 | (214,343) | -5.053% |
| 07/23/2003 | 03/15/2023 | Series 2003A | 5.000% | 8,895,000 | 03/15/2013 | 100.000% | YES | 4.661% | 414,596 | 3.903% | 347,165 | (67,431) | -4.112% |
| 10/14/2004 | 03/15/2016 | Series 2004A | 3.625% | 2,135,000 | 09/15/2014 | 100.000% | YES | 0.092% | 1,964 | 0 | 0 | (1,964) | 0 |
| 10/14/2004 | 03/15/2017 | Series 2004A | 3.750% | 470,000 | 09/15/2014 | 100.000% | YES | 0.098% | 461 | 0 | 0 | (461) | 0 |
| 10/14/2004 | 03/15/2018 | Series 2004A | 3.875% | 120,000 | 09/15/2014 | 100.000% | YES | 0.207% | 248 | 0 | 0 | (248) | 0 |
| 10/14/2004 | 03/15/2019 | Series 2004A | 4.000% | 1,375,000 | 09/15/2014 | 100.000% | YES | 0.325% | 4,469 | 0 | 0 | (4,469) | 0 |
| 10/14/2004 | 03/15/2020 | Series 2004A | 4.100% | 180,000 | 09/15/2014 | 100.000% | YES | 0.454% | 817 | 0 | 0 | (817) | 0 |
| 10/14/2004 | 03/15/2021 | Series 2004A | 4.100% | 2,095,000 | 09/15/2014 | 100.000% | YES | 0.592% | 12,402 | 0 | 0 | (12,402) | 0 |
| 10/14/2004 | 03/15/2022 | Series 2004A | 4.125% | 3,450,000 | 09/15/2014 | 100.000% | YES | 0.856% | 29,532 | 0 | 0 | (29,532) | 0 |
| 10/14/2004 | 03/15/2023 | Series 2004A | 4.250% | 2,360,000 | 09/15/2014 | 100.000% | YES | 1.141% | 26,928 | 0 | 0 | (26,928) | 0 |
| 10/14/2004 | 03/15/2024 | Series 2004A | 4.300% | 4,500,000 | 09/15/2014 | 100.000% | YES | 1.301% | 58,545 | 0 | 0 | (58,545) | 0 |
| 10/14/2004 | 03/15/2019 | Series 2004A | 5.000% | 19,685,000 | 09/15/2014 | 100.000% | YES | 3.104% | 611,022 | 1.996% | 393,297 | (217,726) | -13.908% |
| 10/14/2004 | 03/15/2020 | Series 2004A | 5.000% | 21,920,000 | 09/15/2014 | 100.000% | YES | 3.532% | 774,214 | 2.327% | 508,968 | (265,246) | -13.292% |
| 10/14/2004 | 03/15/2021 | Series 2004A | 5.000% | 21,105,000 | 09/15/2014 | 100.000% | YES | 3.867% | 816,130 | 2.599% | 548,572 | (267,558) | -12.621% |
| 10/14/2004 | 03/15/2022 | Series 2004A | 5.000% | 20,895,000 | 09/15/2014 | 100.000% | YES | 4.198% | 877,172 | 2.835% | 592,470 | (284,702) | -12.472% |
| 10/14/2004 | 03/15/2023 | Series 2004A | 5.000% | 23,170,000 | 09/15/2014 | 100.000% | YES | 4.450% | 1,031,065 | 3.024% | 700,627 | (330,438) | -12.266% |
| 10/14/2004 | 03/15/2024 | Series 2004A | 5.000% | 22,290,000 | 09/15/2014 | 100.000% | YES | 4.486% | 999,929 | 3.230% | 719,925 | (280,004) | -10.456% |
| 07/14/2005 | 03/15/2016 | Series 2005A | 3.500% | 220,000 | 03/15/2015 | 100.000% | PART | 0.000% | - | 0 | 0 | 0 | 0 |
| 07/14/2005 | 03/15/2017 | Series 2005A | 5.000% | 12,275,000 | 03/15/2015 | 100.000% | PART | 1.727% | 211,959 | 0.578% | 70,972 | (141,017) | 47.374% |
| 07/14/2005 | 03/15/2018 | Series 2005A | 3.700% | 135,000 | 03/15/2015 | 100.000% | PART | 0.000% | - | 0 | 0 | 0 | 0 |
| 07/14/2005 | 03/15/2019 | Series 2005A | 3.750% | 50,000 | 03/15/2015 | 100.000% | PART | 0.105% | 53 | 0 | 0 | (53) | 0 |
| 07/14/2005 | 03/15/2020 | Series 2005A | 3.850% | 130,000 | 03/15/2015 | 100.000% | PART | 0.333% | 433 | 0 | 0 | (433) | 0 |
| 07/14/2005 | 03/15/2021 | Series 2005A | 5.000% | 14,805,000 | 03/15/2015 | 100.000% | PART | 4.646% | 687,840 | 2.282% | 337,871 | (349,969) | -28.670% |
| 07/14/2005 | 03/15/2022 | Series 2005A | 5.000% | 15,545,000 | 03/15/2015 | 100.000% | PART | 5.199% | 808,185 | 2.537% | 394,404 | (413,781) | -28.914% |
| 07/14/2005 | 03/15/2023 | Series 2005A | 3.900% | 25,000 | 03/15/2015 | 100.000% | PART | 1.010% | 253 | 0 | 0 | (253) | 0 |
| 07/14/2005 | 03/15/2024 | Series 2005A | 3.900% | 100,000 | 03/15/2015 | 100.000% | PART | 1.311% | 1,311 | 0 | 0 | (1,311) | 0 |

Note: Partial Refundings Do Not Account for % Actually Refundable.

FIG. 2K

Schedule 1
Option Value Monitor

Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 07/14/2005 | 03/15/2015 | Series 2005A | 4.000% | 1,205,000 | 03/15/2015 | 100.000% | PART | 1.497% | 18,039 | 0 | 0 | (18,039) | 0 |
| 07/14/2005 | 03/15/2016 | Series 2005A | 5.000% | 13,640,000 | 03/15/2015 | 100.000% | PART | 0.927% | 126,443 | 0 | 0 | (126,443) | 0 |
| 07/14/2005 | 03/15/2018 | Series 2005A | 5.000% | 27,275,000 | 03/15/2015 | 100.000% | PART | 2.388% | 651,327 | 1.184% | 322,996 | (328,331) | 28.315% |
| 07/14/2005 | 03/15/2019 | Series 2005A | 5.000% | 29,490,000 | 03/15/2015 | 100.000% | PART | 3.123% | 920,973 | 1.629% | 480,508 | (440,465) | 26.407% |
| 07/14/2005 | 03/15/2020 | Series 2005A | 5.000% | 29,505,000 | 03/15/2015 | 100.000% | PART | 3.911% | 1,153,941 | 1.982% | 584,869 | (569,072) | 27.498% |
| 07/14/2005 | 03/15/2023 | Series 2005A | 5.000% | 16,330,000 | 03/15/2015 | 100.000% | PART | 5.885% | 959,255 | 2.742% | 446,943 | (512,312) | 30.629% |
| 07/14/2005 | 03/15/2024 | Series 2005A | 5.000% | 17,040,000 | 03/15/2015 | 100.000% | PART | 6.537% | 1,113,905 | 2.960% | 504,317 | (609,587) | 31.684% |
| 07/14/2005 | 03/15/2025 | Series 2005A | 5.000% | 16,790,000 | 03/15/2015 | 100.000% | PART | 7.074% | 1,187,725 | 3.099% | 520,404 | (667,321) | 32.880% |
| 08/30/2006 | 03/15/2017 | Series 2006A | 4.000% | 11,530,000 | 03/15/2016 | 100.000% | YES | 0.002% | - | 0 | 0 | 0 | 0 |
| 08/30/2006 | 03/15/2018 | Series 2006A | 4.000% | 1,845,000 | 03/15/2016 | 100.000% | YES | 0.000% | - | 0 | 0 | 0 | 0 |
| 08/30/2006 | 03/15/2019 | Series 2006A | 4.000% | 2,495,000 | 03/15/2016 | 100.000% | YES | 0.000% | - | 0 | 0 | 0 | 0 |
| 08/30/2006 | 03/15/2020 | Series 2006A | 4.125% | 645,000 | 03/15/2016 | 100.000% | YES | 0.000% | - | 0 | 0 | 0 | 0 |
| 08/30/2006 | 03/15/2021 | Series 2006A | 4.125% | 1,170,000 | 03/15/2016 | 100.000% | YES | 0.165% | 1,264 | 0 | 0 | (1,264) | 0 |
| 08/30/2006 | 03/15/2022 | Series 2006A | 4.700% | 430,000 | 03/15/2016 | 100.000% | YES | 0.228% | 980 | 0 | 0 | (980) | 0 |
| 08/30/2006 | 03/15/2023 | Series 2006A | 4.200% | 675,000 | 03/15/2016 | 100.000% | YES | 0.235% | 1,586 | 0 | 0 | (1,586) | 0 |
| 08/30/2006 | 03/15/2024 | Series 2006A | 4.250% | 200,000 | 03/15/2016 | 100.000% | YES | 0.246% | 492 | 0 | 0 | (492) | 0 |
| 08/30/2006 | 03/15/2025 | Series 2006A | 4.250% | 325,000 | 03/15/2016 | 100.000% | YES | 0.257% | 835 | 0 | 0 | (835) | 0 |
| 08/30/2006 | 03/15/2026 | Series 2006A | 4.250% | 885,000 | 03/15/2016 | 100.000% | YES | 0.263% | 2,326 | 0 | 0 | (2,326) | 0 |
| 08/30/2006 | 03/15/2017 | Series 2006A | 5.000% | 5,150,000 | 03/15/2016 | 100.000% | YES | 0.665% | 34,248 | 0 | 0 | (34,248) | 0 |
| 08/30/2006 | 03/15/2018 | Series 2006A | 5.000% | 15,555,000 | 03/15/2016 | 100.000% | YES | 1.248% | 194,126 | 0.396% | 61,604 | (132,522) | 77.565% |
| 08/30/2006 | 03/15/2019 | Series 2006A | 5.000% | 15,755,000 | 03/15/2016 | 100.000% | YES | 1.708% | 269,095 | 0.911% | 143,514 | (125,582) | 47.137% |
| 08/30/2006 | 03/15/2020 | Series 2006A | 5.000% | 18,495,000 | 03/15/2016 | 100.000% | YES | 2.124% | 392,834 | 1.321% | 244,279 | (148,555) | 36.764% |
| 08/30/2006 | 03/15/2021 | Series 2006A | 5.000% | 18,920,000 | 03/15/2016 | 100.000% | YES | 2.585% | 489,062 | 1.665% | 315,039 | (174,043) | 34.286% |
| 08/30/2006 | 03/15/2022 | Series 2006A | 5.000% | 20,655,000 | 03/15/2016 | 100.000% | YES | 2.989% | 617,378 | 1.957% | 404,223 | (213,155) | 33.126% |
| 08/30/2006 | 03/15/2023 | Series 2006A | 5.000% | 21,460,000 | 03/15/2016 | 100.000% | YES | 3.306% | 709,468 | 2.194% | 470,903 | (238,564) | 32.149% |
| 08/30/2006 | 03/15/2024 | Series 2006A | 5.000% | 23,035,000 | 03/15/2016 | 100.000% | YES | 3.586% | 826,035 | 2.435% | 560,815 | (265,220) | 30.518% |
| 08/30/2006 | 03/15/2025 | Series 2006A | 5.000% | 24,075,000 | 03/15/2016 | 100.000% | YES | 3.883% | 934,832 | 2.601% | 626,282 | (308,550) | 31.480% |
| 08/30/2006 | 03/15/2026 | Series 2006A | 5.000% | 24,730,000 | 03/15/2016 | 100.000% | YES | 4.157% | 1,028,026 | 2.742% | 678,186 | (349,840) | 32.587% |
| 09/06/2007 | 03/15/2018 | Series 2007A | 4.250% | 12,295,000 | 09/15/2017 | 100.000% | YES | 0.000% | - | 0 | 0 | 0 | 0 |
| 09/06/2007 | 03/15/2019 | Series 2007A | 4.500% | 11,290,000 | 09/15/2017 | 100.000% | YES | 0.000% | - | 0 | 0 | 0 | 0 |
| 09/06/2007 | 03/15/2020 | Series 2007A | 4.500% | 7,690,000 | 09/15/2017 | 100.000% | YES | 0.475% | 36,528 | 0 | 0 | (36,528) | 0 |
| 09/06/2007 | 03/15/2021 | Series 2007A | 5.250% | 18,710,000 | 09/15/2017 | 100.000% | YES | 0.989% | 180,097 | 1.312% | 238,853 | 58,757 | 303.906% |
| 09/06/2007 | 03/15/2022 | Series 2007A | 5.000% | 19,165,000 | 09/15/2017 | 100.000% | YES | 0.860% | 164,819 | 1.128% | 215,912 | 51,093 | 283.974% |
| 09/06/2007 | 03/15/2023 | Series 2007A | 5.250% | 20,125,000 | 09/15/2017 | 100.000% | YES | 1.394% | 280,543 | 2.211% | 444,977 | 164,434 | 705.072% |
| 09/06/2007 | 03/15/2024 | Series 2007A | 5.250% | 21,180,000 | 09/15/2017 | 100.000% | YES | 1.552% | 328,714 | 2.607% | 552,119 | 223,405 | 891.684% |
| 09/06/2007 | 03/15/2025 | Series 2007A | 5.250% | 22,290,000 | 09/15/2017 | 100.000% | YES | 1.710% | 381,159 | 2.934% | 654,048 | 272,889 | 970.836% |
| 09/06/2007 | 03/15/2026 | Series 2007A | 5.250% | 23,465,000 | 09/15/2017 | 100.000% | YES | 1.966% | 461,322 | 3.217% | 754,832 | 293,510 | 802.051% |
| 09/06/2007 | 03/15/2027 | Series 2007A | 4.750% | 9,330,000 | 09/15/2017 | 100.000% | YES | 0.000% | - | 1.004% | 93,674 | 93,674 | >120.0% |
| 09/06/2007 | 03/15/2018 | Series 2007A | 5.000% | 3,585,000 | 09/15/2017 | 100.000% | YES | 0.190% | 6,812 | 0 | 0 | (6,812) | 0 |
| 09/06/2007 | 03/15/2019 | Series 2007A | 5.000% | 5,295,000 | 09/15/2017 | 100.000% | YES | 0.459% | 24,304 | 0 | 0 | (24,304) | 0 |
| 09/06/2007 | 03/15/2020 | Series 2007A | 5.250% | 9,665,000 | 09/15/2017 | 100.000% | YES | 1.124% | 108,635 | 0.757% | 73,131 | (35,503) | -145.223% |
| 09/06/2007 | 03/15/2027 | Series 2007A | 5.250% | 15,365,000 | 09/15/2017 | 100.000% | YES | 2.204% | 338,645 | 3.520% | 540,799 | 202,155 | 0 |
| 09/25/2007 | 03/15/2018 | Series 2007A REF | 5.000% | 37,510,000 | 09/15/2017 | 100.000% | NO | 0.273% | 102,402 | 0 | 0 | (102,402) | 0 |

Note: Partial Refinancings Do Not Account for % Actually Refundable.

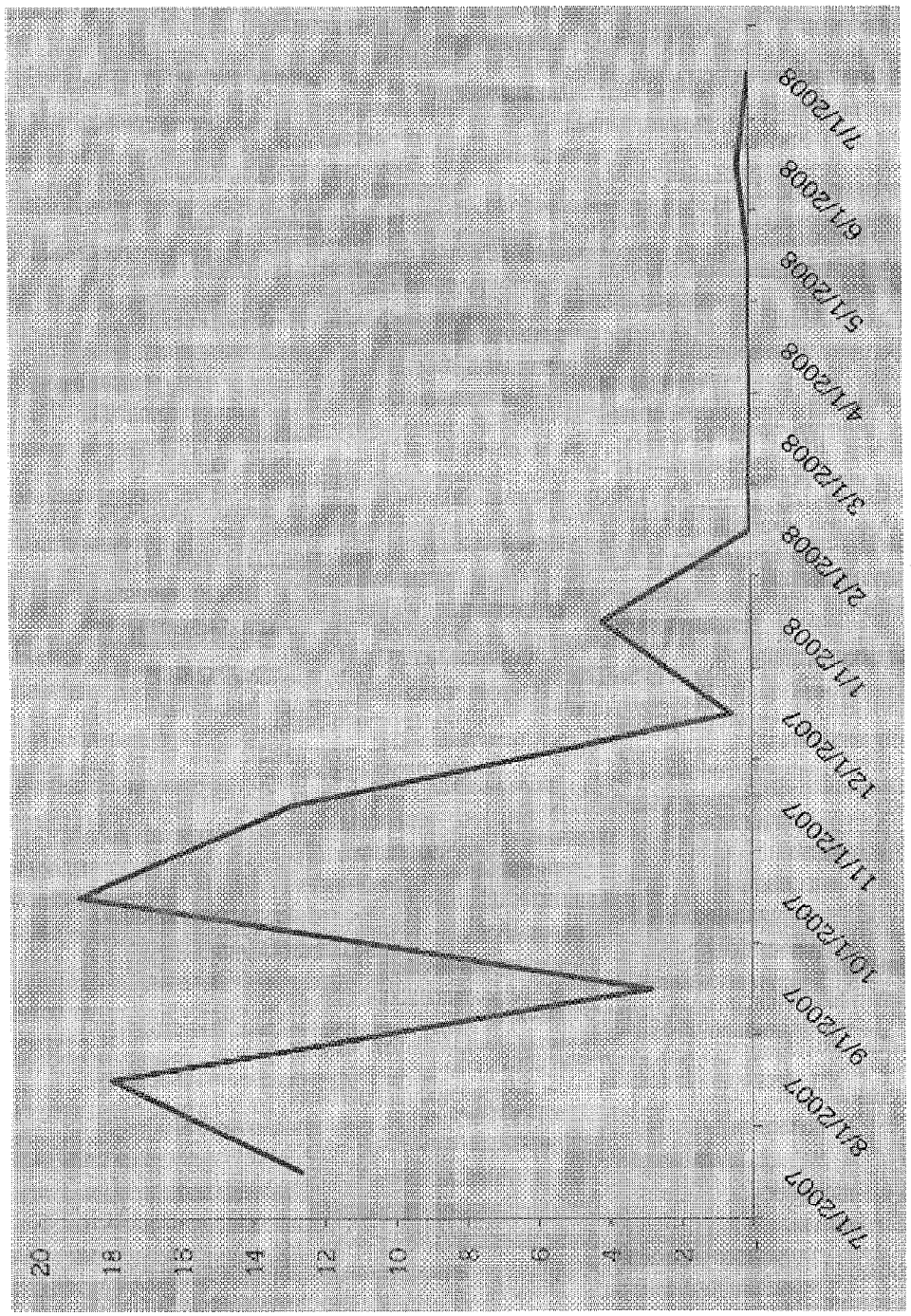

Fig. 3b

Purchase

*Refunding Analysis – IRR of Option Purchase*

General Obligation Bonds
Option Value Monitor
Option Value By Maturity

IRR of Option

[Illegible table data]

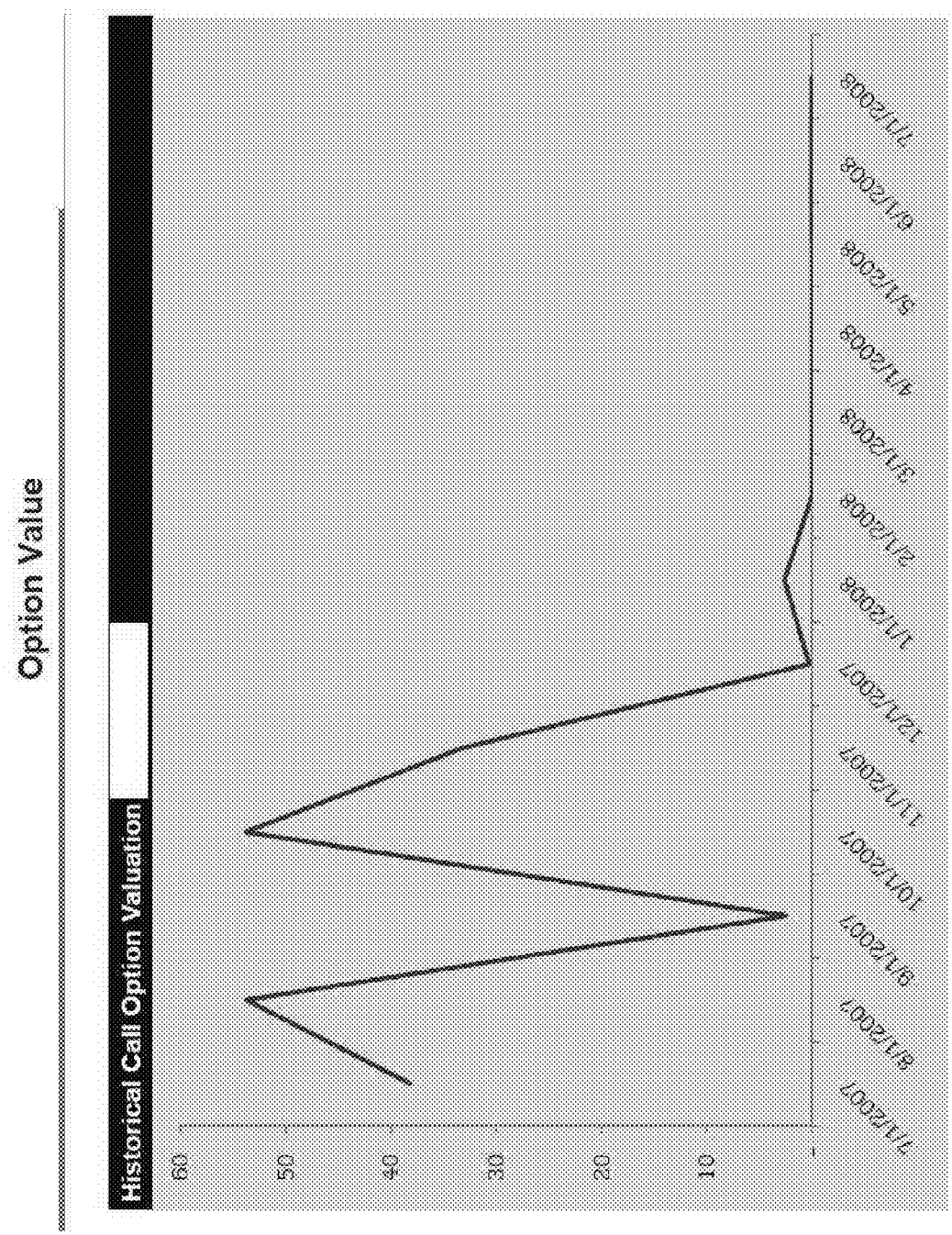

IRR of Option Purchase (Refunding Analysis, Dedicated Sales Tax Bonds)

Option Value Monitor
Option Value by

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / Loss | IRR |
|---|---|---|---|---|---|---|---|---|---|---|---|---|---|
| 08/28/2001 | 12/01/2012 | 2001C | 4.300% | $10,350,000 | 12/01/2011 | 100.000% | PART | 0.324% | $33,507 | 0 | 0 | ($33,507) | <0% |
| 08/28/2001 | 12/01/2012 | 2001C | 5.500% | $15,175,000 | 12/01/2011 | 100.000% | PART | 1.091% | $165,618 | 0 | 0 | ($165,618) | <0% |
| 03/15/2005 | 03/01/2016 | 2005A | 5.000% | $53,245,000 | 03/01/2015 | 100.000% | Yes | 0.584% | $310,767 | 0 | 0 | ($310,767) | <0% |
| 03/15/2005 | 03/01/2017 | 2005A | 5.000% | $55,905,000 | 03/01/2015 | 100.000% | Yes | 1.102% | $616,262 | 0 | 0 | ($616,262) | <0% |
| 03/15/2005 | 03/01/2018 | 2005A | 5.000% | $58,705,000 | 03/01/2015 | 100.000% | Yes | 1.499% | $879,730 | 0 | 0 | ($879,730) | <0% |
| 10/12/2005 | 09/01/2016 | 2005C | 4.000% | $9,335,000 | 09/01/2015 | 100.000% | Yes | 0.013% | $1,228 | 0 | 0 | ($1,228) | <0% |
| 10/12/2005 | 09/01/2017 | 2005C | 5.000% | $38,690,000 | 09/01/2015 | 100.000% | Yes | 1.230% | $475,956 | 0 | 0 | ($475,956) | <0% |
| 10/12/2005 | 09/01/2018 | 2005C | 5.000% | $40,675,000 | 09/01/2015 | 100.000% | Yes | 1.705% | $693,660 | 0 | 0 | ($693,660) | <0% |
| 10/12/2005 | 09/01/2019 | 2005C | 4.250% | $42,600,000 | 09/01/2015 | 100.000% | Yes | 0.000% | - | 0 | 0 | $0 | <0% |
| 10/12/2005 | 09/01/2020 | 2005C | 4.300% | $44,460,000 | 09/01/2015 | 100.000% | Yes | 0.000% | - | 0 | 0 | $0 | <0% |
| 10/12/2005 | 09/01/2016 | 2005C | 5.000% | $27,515,000 | 09/01/2015 | 100.000% | Yes | 0.671% | $184,566 | 0 | 0 | ($184,566) | <0% |
| 08/29/2006 | 08/01/2017 | 2006D | 4.000% | $8,950,000 | 08/01/2016 | 100.000% | Yes | 0.000% | - | 0 | 0 | $0 | <0% |
| 08/29/2006 | 08/01/2018 | 2006D | 4.200% | $9,025,000 | 08/01/2016 | 100.000% | Yes | 0.101% | $9,158 | 0 | 0 | ($9,158) | <0% |
| 08/29/2006 | 08/01/2019 | 2006D | 4.250% | $10,085,000 | 08/01/2016 | 100.000% | Yes | 0.167% | $16,850 | 0 | 0 | ($16,850) | <0% |
| 08/29/2006 | 08/01/2020 | 2006D | 4.250% | $6,620,000 | 08/01/2016 | 100.000% | Yes | 0.000% | - | 0 | 0 | $0 | <0% |
| 08/29/2006 | 08/01/2021 | 2006D | 4.000% | $2,910,000 | 08/01/2016 | 100.000% | Yes | 0.109% | $3,161 | 0 | 0 | ($3,161) | <0% |
| 08/29/2006 | 08/01/2026 | 2006D | 4.500% | $19,900,000 | 08/01/2016 | 100.000% | Yes | 0.159% | $31,544 | 0 | 0 | ($31,544) | <0% |
| 08/29/2006 | 08/01/2017 | 2006D | 5.000% | $14,790,000 | 08/01/2016 | 100.000% | Yes | 0.605% | $89,480 | 0 | 0 | ($89,480) | <0% |
| 08/29/2006 | 08/01/2018 | 2006D | 5.000% | $15,850,000 | 08/01/2016 | 100.000% | Yes | 1.116% | $176,922 | 0 | 0 | ($176,922) | <0% |
| 08/29/2006 | 08/01/2019 | 2006D | 5.000% | $15,990,000 | 08/01/2016 | 100.000% | Yes | 1.559% | $249,346 | 0 | 0 | ($249,346) | <0% |
| 08/16/2007 | 08/01/2018 | 2007C | 4.200% | $7,755,000 | 08/01/2017 | 100.000% | Yes | 0.000% | - | 0 | 0 | $0 | <0% |
| 08/16/2007 | 08/01/2019 | 2007C | 5.000% | $31,000,000 | 08/01/2017 | 100.000% | Yes | 0.800% | $247,856 | 0 | 0 | ($247,856) | <0% |
| 08/16/2007 | 08/01/2020 | 2007C | 5.000% | $32,000,000 | 08/01/2017 | 100.000% | Yes | 1.014% | $324,351 | 0 | 0 | ($324,351) | <0% |
| 08/16/2007 | 08/01/2021 | 2007C | 5.250% | $34,000,000 | 08/01/2017 | 100.000% | Yes | 1.835% | $623,745 | 0 | 0 | ($623,745) | <0% |
| 08/16/2007 | 08/01/2022 | 2007C | 4.375% | $3,090,000 | 08/01/2017 | 100.000% | Yes | 0.000% | - | 0 | 0 | $0 | <0% |
| 08/16/2007 | 08/01/2023 | 2007C | 5.250% | $58,000,000 | 08/01/2017 | 100.000% | Yes | 2.787% | $1,616,305 | 0 | 0 | ($1,616,305) | <0% |
| 08/16/2007 | 08/01/2024 | 2007C | 5.250% | $59,000,000 | 08/01/2017 | 100.000% | Yes | 3.060% | $1,817,041 | 0 | 0 | ($1,817,041) | <0% |
| 08/16/2007 | 08/01/2025 | 2007C | 5.250% | $61,000,000 | 08/01/2017 | 100.000% | Yes | 3.372% | $2,056,817 | 0 | 0 | ($2,056,817) | <0% |
| 08/16/2007 | 08/01/2026 | 2007C | 5.250% | $43,000,000 | 08/01/2017 | 100.000% | Yes | 2.241% | $963,820 | 0 | 0 | ($963,820) | <0% |
| 08/16/2007 | 08/01/2027 | 2007C | 4.500% | $1,945,000 | 08/01/2017 | 100.000% | Yes | 0.000% | - | 0 | 0 | $0 | <0% |
| 08/16/2007 | 08/01/2028 | 2007C | 4.625% | $1,045,000 | 08/01/2017 | 100.000% | Yes | 0.000% | - | 0 | 0 | $0 | <0% |
| 08/16/2007 | 08/01/2029 | 2007C | 4.625% | $1,045,000 | 08/01/2017 | 100.000% | Yes | 0.000% | - | 0 | 0 | $0 | <0% |
| 08/16/2007 | 08/01/2030 | 2007C | 4.625% | $1,045,000 | 08/01/2017 | 100.000% | Yes | 0.000% | - | 0 | 0 | $0 | <0% |
| 08/16/2007 | 08/01/2031 | 2007C | 4.625% | $1,045,000 | 08/01/2017 | 100.000% | Yes | 0.000% | - | 0 | 0 | $0 | <0% |
| 08/16/2007 | 08/01/2032 | 2007C | 4.625% | $1,045,000 | 08/01/2017 | 100.000% | Yes | 0.000% | - | 0 | 0 | $0 | <0% |
| 08/16/2007 | 08/01/2033 | 2007C | 5.000% | $61,000,000 | 08/01/2017 | 100.000% | Yes | 2.964% | - | 0 | 0 | $0 | <0% |
| 08/16/2007 | 08/01/2034 | 2007C | 5.000% | $64,000,000 | 08/01/2017 | 100.000% | Yes | 2.964% | $1,808,323 | 0 | 0 | ($1,808,323) | <0% |
| 08/16/2007 | 08/01/2035 | 2007C | 5.000% | $67,000,000 | 08/01/2017 | 100.000% | Yes | 2.964% | $1,897,257 | 0 | 0 | ($1,897,257) | <0% |
| 08/16/2007 | 08/01/2036 | 2007C | 5.000% | $71,000,000 | 08/01/2017 | 100.000% | Yes | 2.964% | $1,986,191 | 0 | 0 | ($1,986,191) | <0% |
| 08/16/2007 | 08/01/2037 | 2007C | 5.000% | $75,000,000 | 08/01/2017 | 100.000% | Yes | 2.964% | $2,104,769 | 0 | 0 | ($2,104,769) | <0% |
| 08/16/2007 | 08/01/2022 | 2007C | 5.250% | $53,000,000 | 08/01/2017 | 100.000% | Yes | 2.378% | $2,223,348 | 0 | 0 | ($2,223,348) | <0% |
| 08/16/2007 | 08/01/2027 | 2007C | 5.000% | $44,000,000 | 08/01/2017 | 100.000% | Yes | 2.344% | $1,260,384 | 0 | 0 | ($1,260,384) | <0% |
| 08/16/2007 | 08/01/2028 | 2007C | 4.750% | $25,000,000 | 08/01/2017 | 100.000% | Yes | 0.000% | $1,031,541 | 0 | 0 | ($1,031,541) | <0% |
| 08/16/2007 | 08/01/2029 | 2007C | 4.750% | $26,000,000 | 08/01/2017 | 100.000% | Yes | 0.000% | - | 0 | 0 | $0 | <0% |
| 08/16/2007 | 08/01/2030 | 2007C | 4.750% | $26,000,000 | 08/01/2017 | 100.000% | Yes | 0.000% | - | 0 | 0 | $0 | <0% |
| 08/16/2007 | 08/01/2031 | 2007C | 4.750% | $26,000,000 | 08/01/2017 | 100.000% | Yes | 0.000% | - | 0 | 0 | $0 | <0% |
| 08/16/2007 | 08/01/2032 | 2007C | 4.750% | $10,000,000 | 08/01/2017 | 100.000% | Yes | 0.000% | - | 0 | 0 | $0 | <0% |
| 08/16/2007 | 08/01/2028 | 2007C | 5.000% | $10,000,000 | 08/01/2017 | 100.000% | Yes | 2.718% | $271,816 | 0 | 0 | ($271,816) | <0% |
| 08/16/2007 | 08/01/2029 | 2007C | 5.000% | $10,000,000 | 08/01/2017 | 100.000% | Yes | 2.718% | $271,816 | 0 | 0 | ($271,816) | <0% |
| 08/16/2007 | 08/01/2030 | 2007C | 5.000% | $10,000,000 | 08/01/2017 | 100.000% | Yes | 2.718% | $271,816 | 0 | 0 | ($271,816) | <0% |
| 08/16/2007 | 08/01/2031 | 2007C | 5.000% | $10,000,000 | 08/01/2017 | 100.000% | Yes | 2.718% | $271,816 | 0 | 0 | ($271,816) | <0% |
| 08/16/2007 | 08/01/2032 | 2007C | 5.000% | $10,000,000 | 08/01/2017 | 100.000% | Yes | 2.718% | $271,816 | 0 | 0 | ($271,816) | <0% |
| | | | | | | | | | Total 25,258,580 | | | (25,258,580) | |

*FIG. 4B*

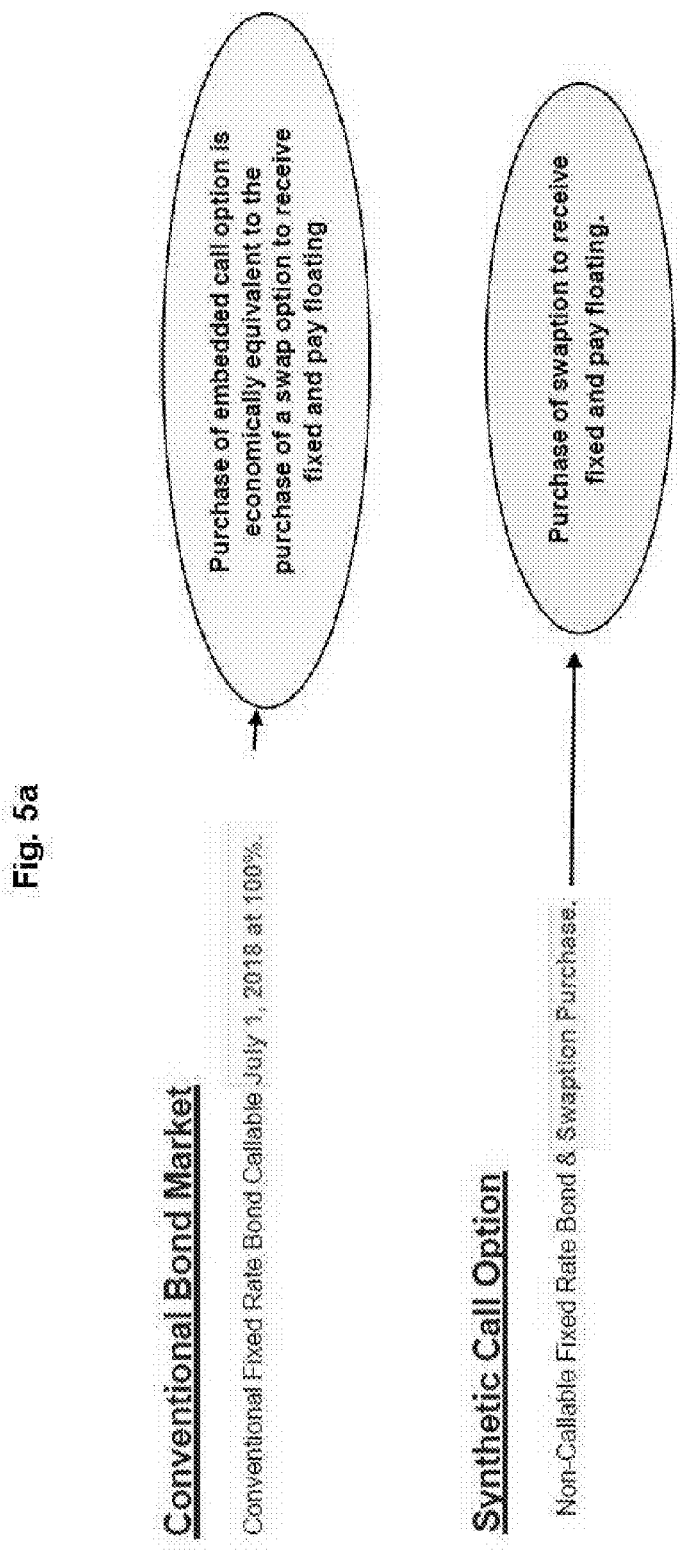

Synthetic Call Opportunity

Fig. 6

Table of Bonds Refunded by 2006B Refunding

| Series | Maturity Date | Coupon | Principal | Call Date | Call Price | Option Purchase Price at Issue (%) | Option Purchase Price at Issue ($) | Option Sale Price (%) | Option Sale Value ($) | Gain / (Loss) | IRR |
|---|---|---|---|---|---|---|---|---|---|---|---|
| Series 2005A | 03/01/2021 | 5.000% | 30,380,000 | 03/01/2015 | 100.000% | 2.375% | 721,591 | 2.880% | 874,978 | 153,387 | 12.896% |
| Series 2005A | 03/01/2022 | 5.000% | 71,355,000 | 03/01/2015 | 100.000% | 2.485% | 1,776,145 | 3.338% | 2,381,547 | 605,402 | 19.810% |
| Series 2005A | 03/01/2023 | 5.000% | 74,920,000 | 03/01/2015 | 100.000% | 3.121% | 2,338,047 | 3.777% | 2,829,497 | 491,450 | 12.672% |
| Series 2005A | 03/01/2024 | 5.000% | 78,670,000 | 03/01/2015 | 100.000% | 3.383% | 2,661,695 | 4.198% | 3,302,655 | 640,960 | 14.389% |
| Series 2005A | 03/01/2025 | 5.000% | 82,595,000 | 03/01/2015 | 100.000% | 3.469% | 2,885,384 | 4.603% | 3,821,500 | 936,116 | 19.060% |
| Series 2005C | 09/01/2022 | 5.000% | 48,570,000 | 09/01/2015 | 100.000% | 3.267% | 1,589,613 | 3.248% | 1,580,765 | (8,848) | -0.546% |
| Series 2005C | 09/01/2023 | 5.250% | 51,545,000 | 09/01/2015 | 100.000% | 5.200% | 2,680,131 | 4.849% | 2,498,673 | (181,458) | -6.770% |
| Series 2005C | 09/01/2024 | 5.000% | 54,255,000 | 09/01/2015 | 100.000% | 3.946% | 2,140,816 | 4.091% | 2,219,827 | 79,011 | 3.597% |
| Series 2005C | 09/01/2025 | 5.000% | 57,035,000 | 09/01/2015 | 100.000% | 4.293% | 2,448,234 | 4.480% | 2,559,569 | 113,335 | 4.422% |

Table of Bonds Refunded by 2006C Refunding

| Series | Maturity Date | Coupon | Principal | Call Date | Call Price | Option Purchase Price at Issue (%) | Option Purchase Price at Issue ($) | Option Sale Price (%) | Option Sale Value ($) | Gain / (Loss) | IRR |
|---|---|---|---|---|---|---|---|---|---|---|---|
| Series 2005A | 03/01/2019 | 5.000% | 2,340,000 | 03/01/2015 | 100.000% | 1.696% | 48,169 | 3.152% | 89,520 | 41,351 | 40.886% |
| Series 2005A | 03/01/2020 | 5.000% | 64,720,000 | 03/01/2015 | 100.000% | 2.077% | 1,344,221 | 3.760% | 2,433,607 | 1,089,326 | 38.891% |
| Series 2005A | 03/01/2021 | 5.000% | 37,575,000 | 03/01/2015 | 100.000% | 2.375% | 892,488 | 4.345% | 1,632,555 | 740,068 | 39.723% |
| Series 2005C | 09/01/2021 | 5.000% | 46,580,000 | 09/01/2015 | 100.000% | 2.871% | 1,337,248 | 4.294% | 1,999,942 | 662,694 | 38.968% |
| Series 2006D | 09/01/2026 | 5.000% | 16,718,000 | 09/01/2016 | 100.000% | 3.690% | 616,520 | 6.208% | 1,037,355 | 420,835 | 366.217% |

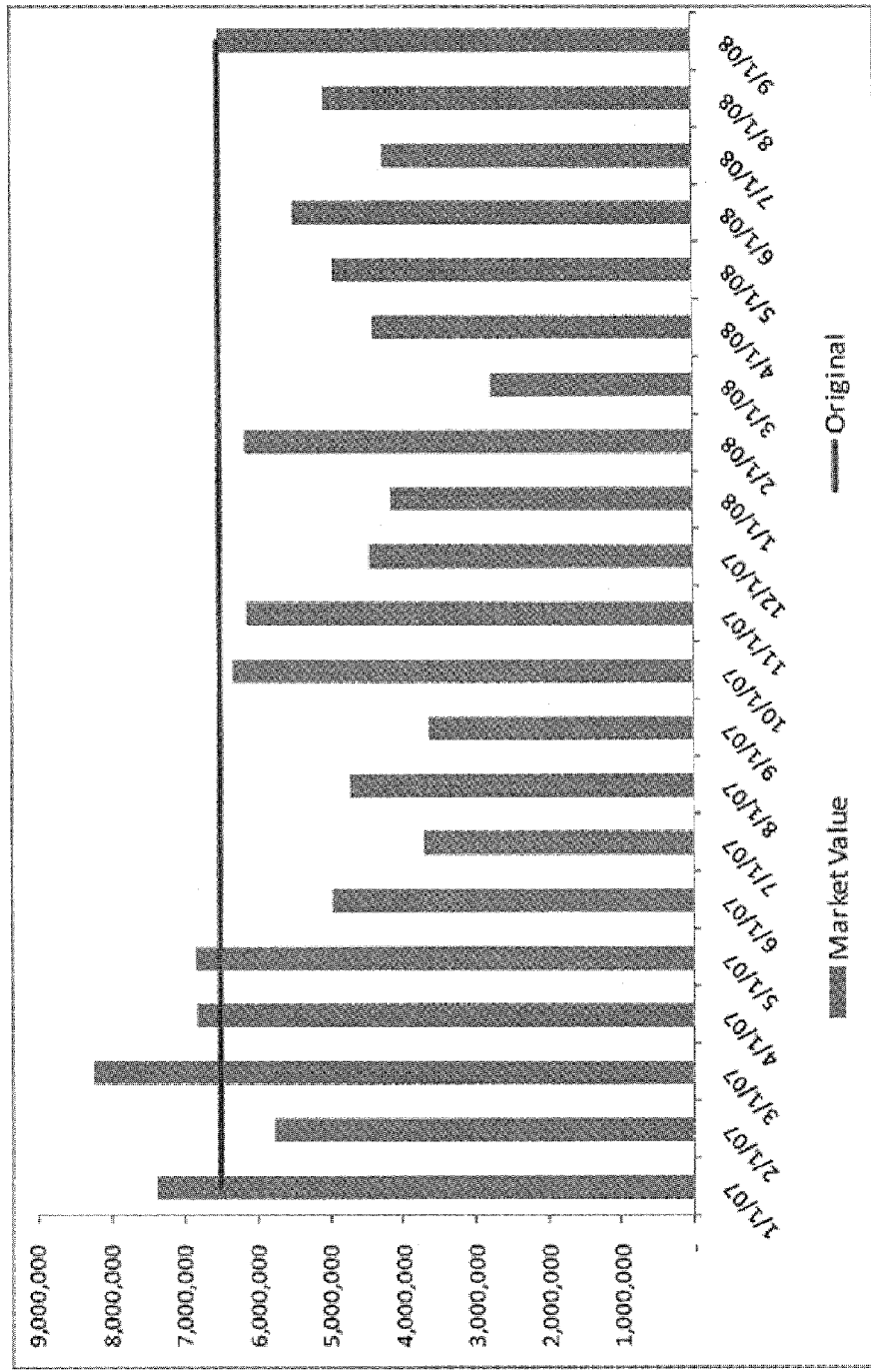

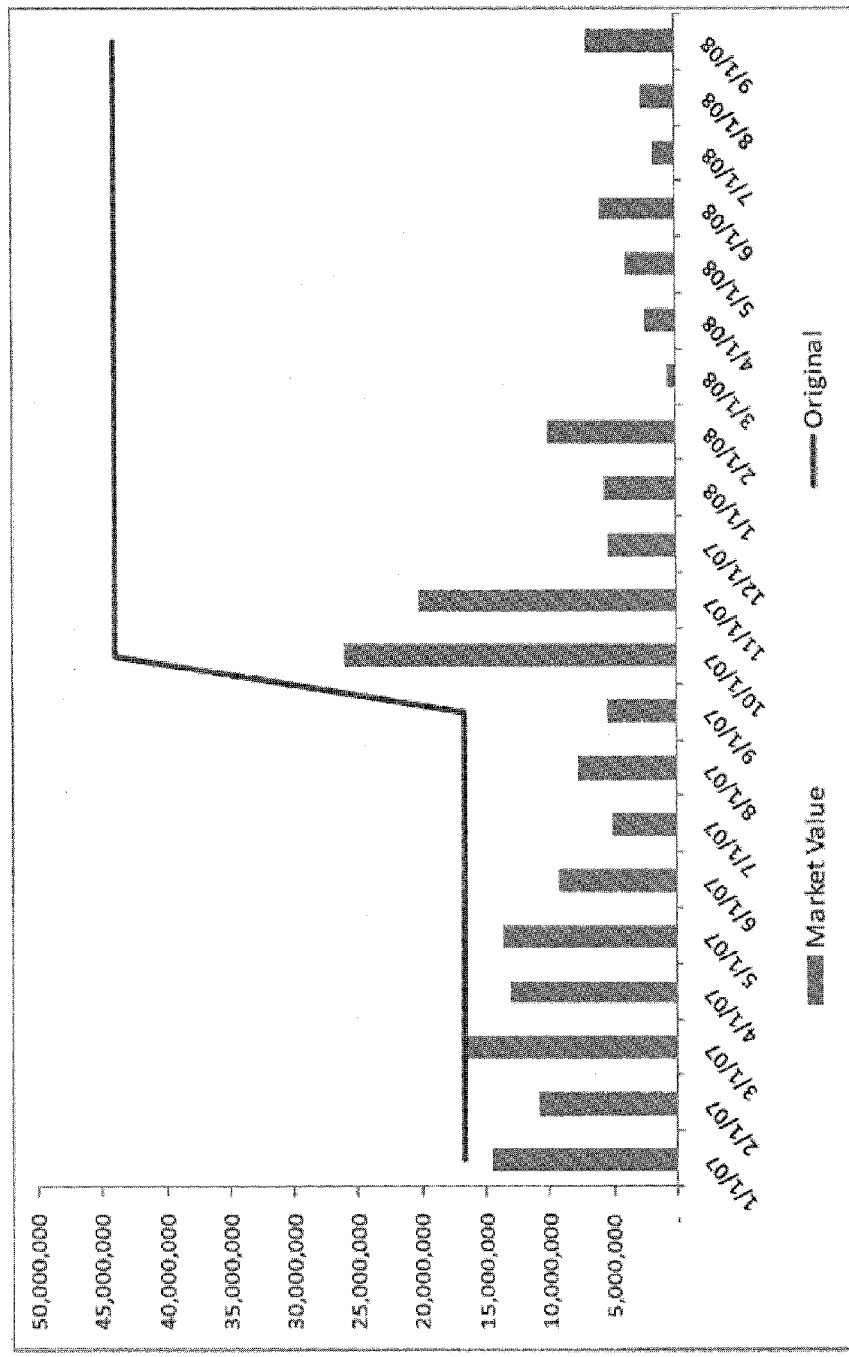
FIG. 7B: Original Option Cost Vs. Exercise Value

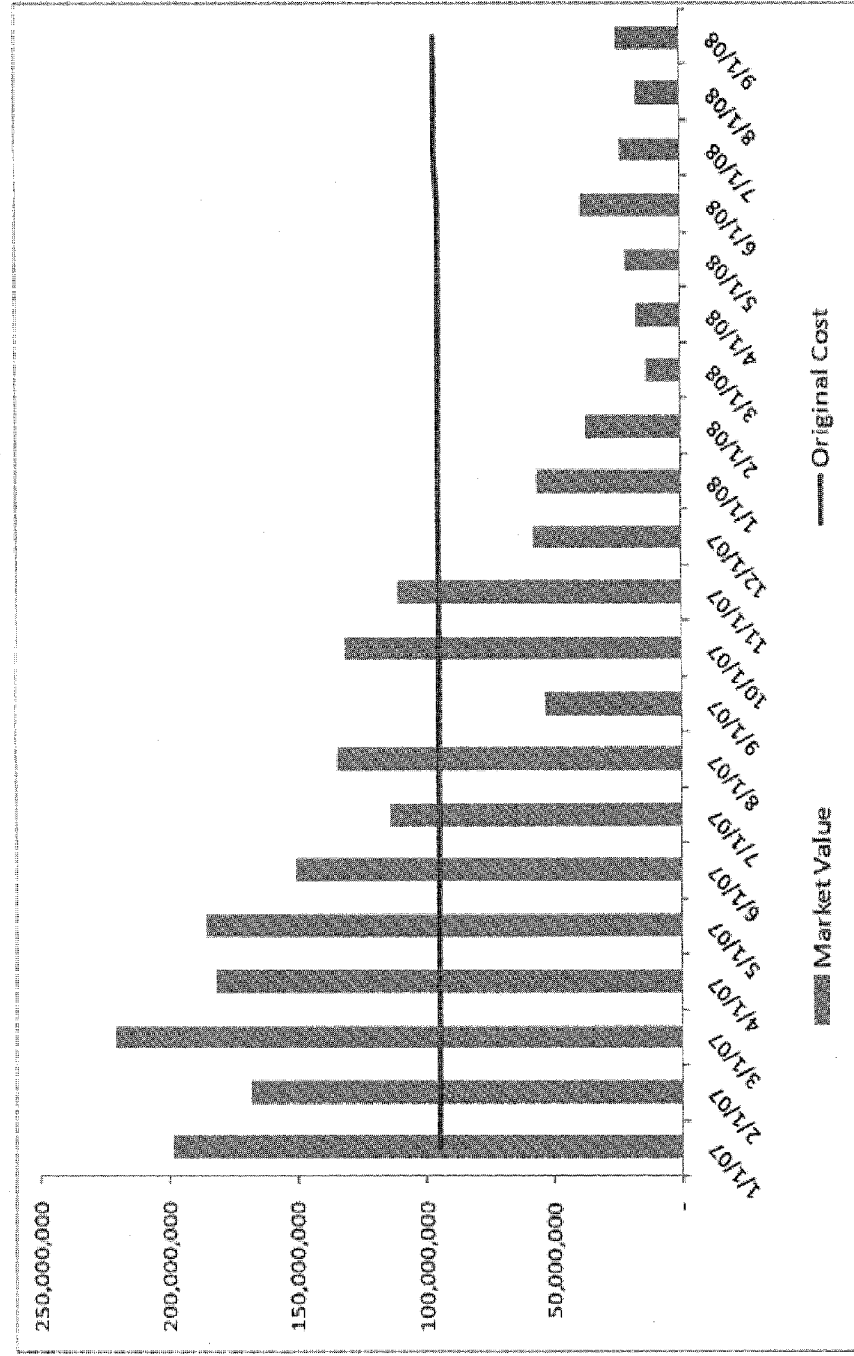

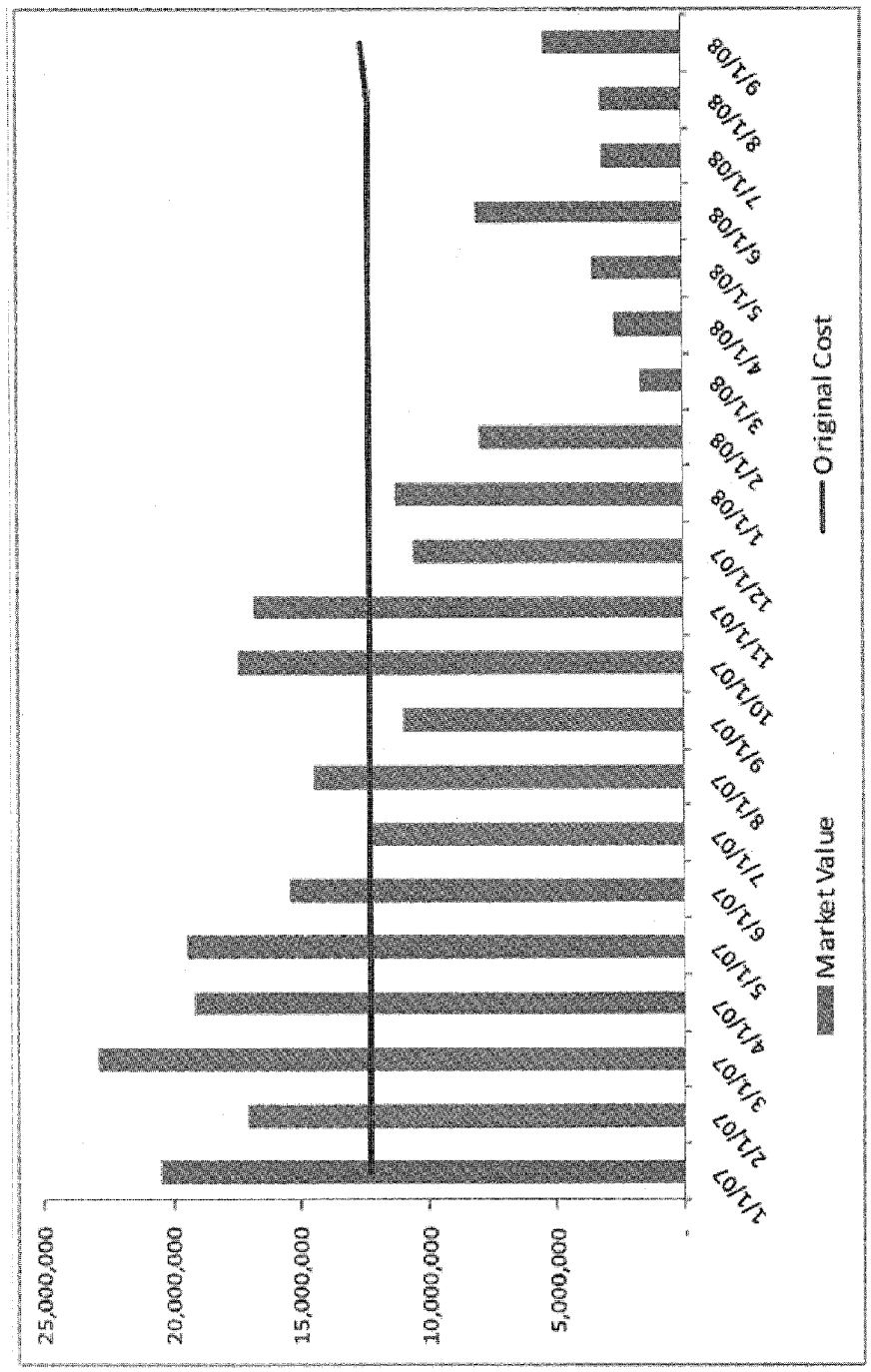

OPTION ROI

Option Value Monitor
Option Value by Maturity

*FIG. 8A*

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 08/04/1999 | 08/01/2012 | Series F | 4.900% | 1,255,000 | 08/01/2009 | 100.000% | NO | 0.665% | 8,348 | 4.566% | 57,305 | 48,958 | 22.291% |
| 08/04/1999 | 08/01/2013 | Series F | 5.000% | 13,945,000 | 08/01/2009 | 100.000% | NO | 0.805% | 112,246 | 5.839% | 814,306 | 702,060 | 22.964% |
| 08/04/1999 | 08/01/2014 | Series F | 5.000% | 4,140,000 | 08/01/2009 | 100.000% | NO | 0.941% | 38,973 | 6.421% | 265,846 | 226,874 | 22.213% |
| 08/04/1999 | 08/01/2015 | Series F | 4.750% | 13,945,000 | 08/01/2009 | 100.000% | NO | 1.066% | 148,613 | 5.463% | 761,776 | 613,163 | 18.760% |
| 08/04/1999 | 08/01/2016 | Series F | 5.000% | 340,000 | 08/01/2009 | 100.000% | NO | 1.123% | 3,818 | 6.895% | 23,442 | 19,625 | 20.937% |
| 08/04/1999 | 08/01/2017 | Series F | 5.000% | 360,000 | 08/01/2009 | 100.000% | NO | 1.158% | 4,169 | 6.656% | 23,960 | 19,792 | 20.138% |
| 08/04/1999 | 08/01/2012 | Series F | 5.250% | 37,405,000 | 08/01/2009 | 100.000% | NO | 1.167% | 436,468 | 5.542% | 2,073,048 | 1,636,580 | 17.847% |
| 08/04/1999 | 08/01/2013 | Series F | 5.250% | 6,915,000 | 08/01/2009 | 100.000% | NO | 1.365% | 94,360 | 6.752% | 466,880 | 372,521 | 18.336% |
| 08/04/1999 | 08/01/2014 | Series F | 5.250% | 18,090,000 | 08/01/2009 | 100.000% | NO | 1.491% | 269,651 | 7.538% | 1,363,703 | 1,094,052 | 18.599% |
| 08/04/1999 | 08/01/2015 | Series F | 5.000% | 9,440,000 | 08/01/2009 | 100.000% | NO | 1.085% | 102,407 | 6.774% | 639,431 | 537,024 | 21.140% |
| 04/15/2004 | 04/01/2015 | Series 2004 | 5.000% | 10,540,000 | 04/01/2014 | 100.000% | YES | 1.019% | 107,443 | 0 | 0 | (107,443) | <-.25% |
| 04/15/2004 | 04/01/2018 | Series 2004 | 4.500% | 12,200,000 | 04/01/2014 | 100.000% | YES | 1.730% | 211,054 | 0 | 0 | (211,054) | <-.25% |
| 04/15/2004 | 04/01/2019 | Series 2004 | 4.500% | 12,750,000 | 04/01/2014 | 100.000% | YES | 1.703% | 217,169 | 0 | 0 | (217,169) | <-.25% |
| 04/15/2004 | 04/01/2020 | Series 2004 | 4.500% | 12,445,000 | 04/01/2014 | 100.000% | YES | 1.752% | 218,090 | 0 | 0 | (218,090) | <-.25% |
| 04/15/2004 | 04/01/2021 | Series 2004 | 4.500% | 13,045,000 | 04/01/2014 | 100.000% | YES | 1.845% | 240,626 | 0 | 0 | (240,626) | <-.25% |
| 04/15/2004 | 04/01/2022 | Series 2004 | 4.125% | 13,675,000 | 04/01/2014 | 100.000% | YES | 0.978% | 133,805 | 0 | 0 | (133,805) | <-.25% |
| 04/15/2004 | 04/01/2023 | Series 2004 | 4.125% | 14,275,000 | 04/01/2014 | 100.000% | YES | 1.001% | 142,940 | 0 | 0 | (142,940) | <-.25% |
| 04/15/2004 | 04/01/2024 | Series 2004 | 4.500% | 15,775,000 | 04/01/2014 | 100.000% | YES | 1.053% | 166,423 | 0 | 0 | (166,423) | <-.25% |
| 12/13/2007 | 06/01/2018 | Series 2007 | 5.000% | 11,965,000 | 06/01/2017 | 100.000% | YES | 0.749% | 89,601 | 0 | 0 | (89,601) | <-.25% |
| 12/13/2007 | 06/01/2019 | Series 2007 | 5.000% | 12,565,000 | 06/01/2017 | 100.000% | YES | 1.352% | 169,892 | 0 | 0 | (169,892) | <-.25% |
| 12/13/2007 | 06/01/2020 | Series 2007 | 5.000% | 13,190,000 | 06/01/2017 | 100.000% | YES | 1.882% | 248,289 | 0 | 0 | (248,289) | <-.25% |
| 12/13/2007 | 06/01/2021 | Series 2007 | 5.000% | 13,850,000 | 06/01/2017 | 100.000% | YES | 2.295% | 317,864 | 0 | 0 | (317,864) | <-.25% |
| 12/13/2007 | 06/01/2022 | Series 2007 | 5.000% | 14,545,000 | 06/01/2017 | 100.000% | YES | 2.611% | 379,772 | 0 | 0 | (379,772) | <-.25% |
| 12/13/2007 | 06/01/2023 | Series 2007 | 5.000% | 15,270,000 | 06/01/2017 | 100.000% | YES | 2.837% | 433,154 | 0 | 0 | (433,154) | <-.25% |
| 12/13/2007 | 06/01/2024 | Series 2007 | 5.000% | 16,035,000 | 06/01/2017 | 100.000% | YES | 3.102% | 497,425 | 0 | 0 | (497,425) | <-.25% |
| 12/13/2007 | 06/01/2025 | Series 2007 | 5.000% | 16,835,000 | 06/01/2017 | 100.000% | YES | 3.268% | 550,163 | 0 | 0 | (550,163) | <-.25% |
| 12/13/2007 | 06/01/2026 | Series 2007 | 5.000% | 17,680,000 | 06/01/2017 | 100.000% | YES | 3.218% | 569,014 | 0 | 0 | (569,014) | <-.25% |
| 12/13/2007 | 06/01/2027 | Series 2007 | 5.000% | 18,560,000 | 06/01/2017 | 100.000% | YES | 3.266% | 606,151 | 0 | 0 | (606,151) | <-.25% |
| | | | | | | | | Total | 6,517,928 | | 6,489,698 | | |

FIG. 8B

OPTION ROI

Option Value Monitor
Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 10/14/2004 | 06/15/2017 | Series 2004 CT | 5.625% | 52,800,000 | 06/15/2007 | 100.000% | YES | 0.000% |  | 13.460% | 7,106,805 | 7,106,805 | Positive |
| 10/14/2004 | 06/15/2018 | Series 2004 CT | 5.625% | 51,910,000 | 06/15/2009 | 100.000% | YES | 0.213% | 110,640 | 11.180% | 5,803,432 | 5,692,792 | 120.113% |
| 10/14/2004 | 06/15/2019 | Series 2004 CT | 5.625% | 49,785,000 | 06/15/2010 | 100.000% | YES | 0.000% |  | 7.861% | 3,913,795 | 3,913,795 | Positive |
| 10/14/2004 | 06/15/2020 | Series 2004 CT | 5.500% | 50,515,000 | 06/15/2012 | 100.000% | YES | 1.170% | 590,970 | 2.403% | 1,213,681 | 622,711 | 19.230% |
| 10/14/2004 | 06/15/2021 | Series 2004 CT | 5.500% | 50,585,000 | 06/15/2012 | 100.000% | YES | 1.170% | 591,789 | 1.810% | 915,371 | 323,582 | 11.444% |
| 10/14/2004 | 06/15/2022 | Series 2004 CT | 5.500% | 49,445,000 | 06/15/2012 | 100.000% | YES | 1.170% | 578,452 | 1.483% | 733,172 | 154,720 | 6.140% |
| 10/14/2004 | 06/15/2023 | Series 2004 CT | 5.900% | 49,775,000 | 06/15/2012 | 100.000% | YES | 1.170% | 582,363 | 1.241% | 617,787 | 35,474 | < 25% |
| 10/14/2004 | 06/15/2024 | Series 2004 CT | 5.500% | 47,935,000 | 06/15/2012 | 100.000% | YES | 1.170% | 560,787 | 0.964% | 461,894 | (98,893) | 4.883% |
| 10/14/2004 | 06/15/2025 | Series 2004 CT | 5.750% | 48,310,000 | 06/15/2014 | 100.000% | YES | 2.072% | 1,000,950 | 0.002% | 1,140 | (999,810) | -115.762% |
| 10/14/2004 | 06/15/2026 | Series 2004 CI | 5.750% | 48,410,000 | 06/15/2014 | 100.000% | YES | 2.072% | 1,003,022 | 0 | 0 | (1,003,022) | < -25% |
| 10/14/2004 | 06/15/2027 | Series 2004 CT | 5.750% | 48,175,000 | 06/15/2014 | 100.000% | YES | 2.072% | 998,153 | 0 | 0 | (998,153) | < -25% |
| 10/14/2004 | 06/15/2028 | Series 2004 CT | 5.750% | 49,425,000 | 06/15/2014 | 100.000% | YES | 2.072% | 1,024,052 | 0 | 0 | (1,024,052) | < -25% |
| 10/14/2004 | 06/15/2029 | Series 2004 CT | 5.750% | 50,785,000 | 06/15/2014 | 100.000% | YES | 2.072% | 1,052,230 | 0 | 0 | (1,052,230) | < -25% |
| 10/14/2004 | 06/15/2030 | Series 2004 CT | 5.500% | 51,350,000 | 06/15/2014 | 100.000% | YES | 2.085% | 1,070,721 | 0 | 0 | (1,070,721) | < -25% |
| 10/14/2004 | 06/15/2031 | Series 2004 CT | 5.500% | 50,755,000 | 06/15/2014 | 100.000% | YES | 2.085% | 1,058,315 | 0 | 0 | (1,058,315) | < -25% |
| 10/14/2004 | 06/15/2032 | Series 2004 CT | 5.750% | 52,100,000 | 06/15/2014 | 100.000% | YES | 2.217% | 1,132,922 | 0 | 0 | (1,132,922) | < -25% |
| 10/14/2004 | 06/15/2033 | Series 2004 CT | 5.750% | 52,390,000 | 06/15/2014 | 100.000% | YES | 2.217% | 1,161,523 | 0 | 0 | (1,161,523) | < -25% |
| 10/14/2004 | 06/15/2034 | Series 2004 CT | 5.750% | 53,375,000 | 06/15/2014 | 100.000% | YES | 2.217% | 1,183,361 | 0 | 0 | (1,183,361) | < -25% |
| 06/26/2002 | 07/01/2013 | Series 2002 DHS | 5.750% | 1,100,000 | 07/01/2012 | 100.000% | YES | 0.864% | 9,505 | 0.878% | 9,653 | 147 | 0.247% |
| 06/26/2002 | 07/01/2014 | Series 2002 DHS | 5.750% | 1,080,000 | 07/01/2012 | 100.000% | YES | 1.668% | 18,016 | 2.176% | 23,499 | 5,483 | 4.318% |
| 06/26/2002 | 07/01/2015 | Series 2002 DHS | 4.600% | 1,045,000 | 07/01/2012 | 100.000% | YES | 0.384% | 4,012 | 0.302% | 3,158 | (854) | -3.812% |
| 06/26/2002 | 07/01/2016 | Series 2002 DHS | 4.625% | 815,000 | 07/01/2012 | 100.000% | YES | 0.703% | 5,731 | 0.262% | 2,136 | (3,595) | -15.248% |
| 06/26/2002 | 07/01/2017 | Series 2002 DHS | 4.750% | 745,000 | 07/01/2012 | 100.000% | YES | 0.842% | 6,273 | 0.347% | 2,586 | (3,687) | -13.752% |
| 06/26/2002 | 07/01/2018 | Series 2002 DHS | 4.750% | 665,000 | 07/01/2012 | 100.000% | YES | 0.980% | 6,514 | 0 | 0 | (6,514) | < -25% |
| 06/26/2002 | 07/01/2019 | Series 2002 DHS | 5.000% | 635,000 | 07/01/2012 | 100.000% | YES | 1.351% | 8,577 | 0.278% | 1,763 | (6,814) | -15.728% |
| 06/26/2002 | 07/01/2020 | Series 2002 DHS | 5.000% | 610,000 | 07/01/2012 | 100.000% | YES | 1.351% | 8,239 | 0 | 0 | (8,239) | < -25% |
| 06/26/2002 | 07/01/2021 | Series 2002 DHS | 5.000% | 595,000 | 07/01/2012 | 100.000% | YES | 1.351% | 8,037 | 0 | 0 | (8,037) | < -25% |
| 06/26/2002 | 07/01/2022 | Series 2002 DHS | 5.000% | 580,000 | 07/01/2012 | 100.000% | YES | 1.351% | 7,834 | 0 | 0 | (7,834) | < -25% |
| 06/26/2002 | 07/01/2023 | Series 2002 DHS | 5.200% | 580,000 | 07/01/2012 | 100.000% | YES | 1.479% | 8,579 | 0 | 0 | (8,579) | < -25% |
| 06/26/2002 | 07/01/2024 | Series 2002 DHS | 5.200% | 415,000 | 07/01/2012 | 100.000% | YES | 1.479% | 6,138 | 0 | 0 | (6,138) | < -25% |
| 06/26/2002 | 07/01/2025 | Series 2002 DHS | 5.200% | 385,000 | 07/01/2012 | 100.000% | YES | 1.479% | 5,694 | 0 | 0 | (5,694) | < -25% |
| 06/26/2002 | 07/01/2026 | Series 2002 DHS | 5.200% | 360,000 | 07/01/2012 | 100.000% | YES | 1.479% | 5,325 | 0 | 0 | (5,325) | < -25% |
| 06/26/2002 | 07/01/2027 | Series 2002 DHS | 5.200% | 360,000 | 07/01/2012 | 100.000% | YES | 1.479% | 5,325 | 0 | 0 | (5,325) | < -25% |
| 06/26/2002 | 07/01/2028 | Series 2002 DHS | 5.200% | 45,000 | 07/01/2012 | 100.000% | YES | 1.479% | 666 | 0 | 0 | (666) | < -25% |
| 06/26/2002 | 07/01/2029 | Series 2002 DHS | 5.200% | 30,000 | 07/01/2012 | 100.000% | YES | 1.479% | 444 | 0 | 0 | (444) | < -25% |
| 06/26/2002 | 07/01/2030 | Series 2002 DHS | 5.200% | 20,000 | 07/01/2012 | 100.000% | YES | 1.479% | 296 | 0 | 0 | (296) | < -25% |
| 06/26/2002 | 07/01/2031 | Series 2002 DHS | 5.200% | 20,000 | 07/01/2012 | 100.000% | YES | 1.479% | 296 | 0 | 0 | (296) | < -25% |
| 06/26/2002 | 07/01/2032 | Series 2002 DHS | 5.200% | 20,000 | 07/01/2012 | 100.000% | YES | 1.479% | 296 | 0 | 0 | (296) | < -25% |
| 12/28/1995 | 01/15/2009 | Series 1995B GL | 5.000% | 270,000 | 01/15/2006 | 102.000% | YES | 0.000% |  | 1.017% | 2,898 | 2,898 | 0 |
| 12/28/1995 | 01/15/2010 | Series 1995B GL | 5.000% | 285,000 | 01/15/2006 | 102.000% | YES | 0.000% |  | 3.043% | 9,130 | 9,130 | < -25% |
| 12/28/1995 | 01/15/2011 | Series 1995B GL | 5.000% | 300,000 | 01/15/2006 | 102.000% | YES | 0.000% |  |  |  |  | < -25% |
| 05/03/1996 | 03/15/2009 | Series 1996 LSP | 5.400% | 65,000 | 03/15/2006 | 102.000% | YES | 0.930% | 605 | 0 | 0 | (605) | 0 |
| 05/03/1996 | 03/15/2010 | Series 1996 LSP | 5.500% | 70,000 | 03/15/2006 | 102.000% | YES | 0.971% | 680 | 2.151% | 1,506 | 826 | 6.537% |

OPTION ROI

Option Value Monitor
Option Value by Maturity

*FIG. 8C*

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 05/03/1996 | 03/15/2011 | Series 1996 LSP | 5.600% | 75,000 | 03/15/2006 | 102.000% | YES | 1.015% | 761 | 4.737% | 3,553 | 2,792 | 12.855% |
| 05/03/1996 | 03/15/2012 | Series 1996 LSP | 5.625% | 80,000 | 03/15/2006 | 102.000% | YES | 1.051% | 841 | 6.660% | 5,328 | 4,487 | 15.502% |
| 05/03/1996 | 03/15/2013 | Series 1996 LSP | 5.700% | 730,000 | 03/15/2006 | 102.000% | YES | 1.201% | 8,766 | 8.643% | 63,096 | 54,330 | 16.611% |
| 05/03/1996 | 03/15/2014 | Series 1996 LSP | 5.700% | 810,000 | 03/15/2006 | 102.000% | YES | 1.201% | 9,727 | 9.970% | 80,758 | 71,031 | 17.862% |
| 05/03/1996 | 03/15/2015 | Series 1996 LSP | 5.700% | 905,000 | 03/15/2006 | 102.000% | YES | 1.201% | 10,868 | 10.932% | 98,938 | 88,070 | 18.670% |
| 05/03/1996 | 03/15/2016 | Series 1996 LSP | 5.700% | 995,000 | 03/15/2006 | 102.000% | YES | 1.201% | 11,949 | 11.672% | 116,132 | 104,183 | 19.245% |
| 05/03/1996 | 03/15/2017 | Series 1996 LSP | 5.750% | 1,100,000 | 03/15/2006 | 102.000% | YES | 1.274% | 14,016 | 12.429% | 136,719 | 122,703 | 19.276% |
| 05/03/1996 | 03/15/2018 | Series 1996 LSP | 5.750% | 1,205,000 | 03/15/2006 | 102.000% | YES | 1.274% | 15,354 | 12.518% | 150,839 | 135,485 | 19.339% |
| 05/03/1996 | 03/15/2019 | Series 1996 LSP | 5.750% | 1,325,000 | 03/15/2006 | 102.000% | YES | 1.274% | 16,883 | 12.337% | 163,467 | 146,584 | 19.211% |
| 05/03/1996 | 03/15/2020 | Series 1996 LSP | 5.750% | 1,450,000 | 03/15/2006 | 102.000% | YES | 1.274% | 18,476 | 11.865% | 172,050 | 153,573 | 18.869% |
| 05/03/1996 | 03/15/2021 | Series 1996 LSP | 5.750% | 1,585,000 | 03/15/2006 | 102.000% | YES | 1.319% | 20,909 | 11.445% | 181,409 | 160,500 | 18.248% |
| 05/03/1996 | 03/15/2022 | Series 1996 LSP | 5.750% | 1,730,000 | 03/15/2006 | 102.000% | YES | 1.319% | 22,822 | 11.280% | 195,142 | 172,320 | 18.120% |
| 04/25/2005 | 03/01/2016 | 2005 Series B LSP | 5.000% | 1,795,000 | 03/01/2015 | 100.000% | YES | 0.621% | 11,149 | 0 | 0 | (11,149) | < -.25% |
| 04/25/2005 | 03/01/2017 | 2005 Series B LSP | 5.000% | 1,885,000 | 03/01/2015 | 100.000% | YES | 1.022% | 19,264 | 0 | 0 | (19,264) | < -.25% |
| 04/25/2005 | 03/01/2018 | 2005 Series B LSP | 5.000% | 1,975,000 | 03/01/2015 | 100.000% | YES | 1.420% | 28,043 | 0 | 0 | (28,043) | < -.25% |
| 04/25/2005 | 03/01/2019 | 2005 Series B LSP | 5.000% | 2,075,000 | 03/01/2015 | 100.000% | YES | 1.832% | 38,011 | 0 | 0 | (38,011) | < -.25% |
| 04/25/2005 | 03/01/2020 | 2005 Series B LSP | 5.000% | 2,175,000 | 03/01/2015 | 100.000% | YES | 2.166% | 47,103 | 0 | 0 | (47,103) | < -.25% |
| 04/25/2005 | 03/01/2021 | 2005 Series B LSP | 5.000% | 2,285,000 | 03/01/2015 | 100.000% | YES | 2.501% | 57,152 | 0 | 0 | (57,152) | < -.25% |
| 04/25/2005 | 03/01/2022 | 2005 Series B LSP | 5.000% | 2,405,000 | 03/01/2015 | 100.000% | YES | 2.832% | 68,104 | 0 | 0 | (68,104) | < -.25% |
| 04/25/2005 | 03/01/2023 | 2005 Series B LSP | 4.500% | 2,525,000 | 03/01/2015 | 100.000% | YES | 0.625% | 15,788 | 0 | 0 | (15,788) | < -.25% |
| 04/25/2005 | 03/01/2024 | 2005 Series B LSP | 4.500% | 2,635,000 | 03/01/2015 | 100.000% | YES | 0.625% | 16,476 | 0 | 0 | (16,476) | < -.25% |
| 04/25/2005 | 03/01/2025 | 2005 Series B LSP | 5.000% | 3,920,000 | 03/01/2015 | 100.000% | YES | 3.868% | 151,643 | 0 | 0 | (151,643) | < -.25% |
| 04/25/2005 | 03/01/2026 | 2005 Series B LSP | 5.000% | 4,115,000 | 03/01/2015 | 100.000% | YES | 3.868% | 159,187 | 0 | 0 | (159,187) | < -.25% |
| 04/25/2005 | 03/01/2027 | 2005 Series B LSP | 5.000% | 4,320,000 | 03/01/2015 | 100.000% | YES | 3.868% | 167,117 | 0 | 0 | (167,117) | < -.25% |
| 08/11/2005 | 03/01/2016 | 2005 Series C LSP | 5.000% | 2,110,000 | 03/01/2015 | 100.000% | YES | 0.724% | 15,275 | 0 | 0 | (15,275) | < -.25% |
| 08/11/2005 | 03/01/2017 | 2005 Series C LSP | 5.000% | 2,090,000 | 03/01/2015 | 100.000% | YES | 1.333% | 27,858 | 0 | 0 | (27,858) | < -.25% |
| 08/11/2005 | 03/01/2018 | 2005 Series C LSP | 5.000% | 2,195,000 | 03/01/2015 | 100.000% | YES | 1.855% | 40,708 | 0 | 0 | (40,708) | < -.25% |
| 08/11/2005 | 03/01/2019 | 2005 Series C LSP | 5.000% | 2,305,000 | 03/01/2015 | 100.000% | YES | 2.287% | 52,711 | 0 | 0 | (52,711) | < -.25% |
| 08/11/2005 | 03/01/2020 | 2005 Series C LSP | 5.000% | 2,420,000 | 03/01/2015 | 100.000% | YES | 2.784% | 67,361 | 0 | 0 | (67,361) | < -.25% |
| 08/11/2005 | 03/01/2021 | 2005 Series C LSP | 5.000% | 2,545,000 | 03/01/2015 | 100.000% | YES | 3.384% | 86,125 | 0 | 0 | (86,125) | < -.25% |
| 08/11/2005 | 03/01/2022 | 2005 Series C LSP | 5.000% | 2,670,000 | 03/01/2015 | 100.000% | YES | 3.995% | 106,777 | 0 | 0 | (106,777) | < -.25% |
| 08/11/2005 | 03/01/2023 | 2005 Series C LSP | 5.000% | 2,800,000 | 03/01/2015 | 100.000% | YES | 4.596% | 128,683 | 0 | 0 | (128,683) | < -.25% |
| 08/11/2005 | 03/01/2024 | 2005 Series C LSP | 5.000% | 2,945,000 | 03/01/2015 | 100.000% | YES | 6.637% | 195,447 | 0 | 0 | (195,447) | < -.25% |
| 08/11/2005 | 03/01/2025 | 2005 Series C LSP | 5.000% | 3,090,000 | 03/01/2015 | 100.000% | YES | 6.637% | 205,070 | 0 | 0 | (205,070) | < -.25% |
| 08/11/2005 | 03/01/2026 | 2005 Series C LSP | 5.000% | 3,245,000 | 03/01/2015 | 100.000% | YES | 6.637% | 215,356 | 0 | 0 | (215,356) | < -.25% |
| 08/11/2005 | 03/01/2027 | 2005 Series C LSP | 5.000% | 3,405,000 | 03/01/2015 | 100.000% | YES | 6.637% | 225,975 | 0 | 0 | (225,975) | < -.25% |
| 04/09/2003 | 04/01/2025 | Series 2003 MR | 4.625% | 7,500,000 | 04/01/2013 | 100.000% | YES | 1.202% | 90,167 | 0 | 0 | (90,167) | < -.25% |
| 04/09/2003 | 04/01/2025 | Series 2003 MR | 5.000% | 3,045,000 | 04/01/2013 | 100.000% | YES | 2.591% | 78,882 | 0 | 0 | (78,882) | < -.25% |
| 04/09/2003 | 04/01/2026 | Series 2003 MR | 5.000% | 12,190,000 | 04/01/2013 | 100.000% | YES | 2.591% | 315,789 | 0 | 0 | (315,789) | < -.25% |
| 04/09/2003 | 04/01/2027 | Series 2003 MR | 5.000% | 12,800,000 | 04/01/2013 | 100.000% | YES | 2.591% | 331,591 | 0 | 0 | (331,591) | < -.25% |
| 04/09/2003 | 04/01/2028 | Series 2003 MR | 5.000% | 13,440,000 | 04/01/2013 | 100.000% | YES | 2.591% | 348,171 | 0 | 0 | (348,171) | < -.25% |

OPTION ROI

Option Value Monitor
Option Value by Maturity

FIG. 8D

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 08/25/2004 | 07/01/2015 | Series 2004A MVC | 3.750% | 2,695,000 | 07/01/2014 | 100.000% | YES | 0.087% | 2,349 | 0 | 0 | (2,349) | <-.25% |
| 08/25/2004 | 07/01/2016 | Series 2004A MVC | 3.875% | 1,410,000 | 07/01/2014 | 100.000% | YES | 0.093% | 1,315 | 0 | 0 | (1,315) | <-.25% |
| 08/25/2004 | 07/01/2017 | Series 2004A MVC | 4.000% | 1,730,000 | 07/01/2014 | 100.000% | YES | 0.099% | 1,716 | 0 | 0 | (1,716) | <-.25% |
| 08/25/2004 | 07/01/2022 | Series 2004A MVC | 4.375% | 815,000 | 07/01/2014 | 100.000% | YES | 0.729% | 5,945 | 0 | 0 | (5,945) | <-.25% |
| 08/25/2004 | 07/01/2023 | Series 2004A MVC | 4.500% | 1,540,000 | 07/01/2014 | 100.000% | YES | 0.753% | 11,603 | 0 | 0 | (11,603) | <-.25% |
| 08/25/2004 | 07/01/2024 | Series 2004A MVC | 4.500% | 4,180,000 | 07/01/2014 | 100.000% | YES | 0.899% | 37,596 | 0 | 0 | (37,596) | <-.25% |
| 08/25/2004 | 07/01/2027 | Series 2004A MVC | 5.000% | 44,545,000 | 07/01/2014 | 100.000% | YES | 2.157% | 961,043 | 0 | 0 | (961,043) | <-.25% |
| 08/25/2004 | 07/01/2028 | Series 2004A MVC | 5.000% | 46,775,000 | 07/01/2014 | 100.000% | YES | 1.964% | 918,581 | 0 | 0 | (918,581) | <-.25% |
| 08/25/2004 | 07/01/2029 | Series 2004A MVC | 5.000% | 49,110,000 | 07/01/2014 | 100.000% | YES | 1.964% | 964,437 | 0 | 0 | (964,437) | <-.25% |
| 08/25/2004 | 07/01/2030 | Series 2004A MVC | 4.750% | 3,910,000 | 07/01/2014 | 100.000% | YES | 1.303% | 50,954 | 0 | 0 | (50,954) | <-.25% |
| 08/25/2004 | 07/01/2032 | Series 2004A MVC | 5.250% | 57,105,000 | 07/01/2014 | 100.000% | YES | 1.132% | 646,369 | 0 | 0 | (646,369) | <-.25% |
| 08/25/2004 | 07/01/2033 | Series 2004A MVC | 5.250% | 60,100,000 | 07/01/2014 | 100.000% | YES | 1.132% | 680,270 | 0 | 0 | (680,270) | <-.25% |
| 08/25/2004 | 07/01/2034 | Series 2004A MVC | 5.000% | 63,260,000 | 07/01/2014 | 100.000% | YES | 1.972% | 1,247,368 | 0 | 0 | (1,247,368) | <-.25% |
| 08/25/2004 | 07/01/2015 | Series 2004A MVC | 5.250% | 27,135,000 | 07/01/2014 | 100.000% | YES | 0.990% | 268,769 | 0.022% | 5,960 | (262,810) | <-.25% |
| 08/25/2004 | 07/01/2016 | Series 2004A MVC | 5.250% | 29,945,000 | 07/01/2014 | 100.000% | YES | 1.741% | 521,322 | 0.405% | 121,422 | (399,899) | 22.288% |
| 08/25/2004 | 07/01/2017 | Series 2004A MVC | 5.250% | 31,255,000 | 07/01/2014 | 100.000% | YES | 2.369% | 740,439 | 0.474% | 148,035 | (592,404) | 31.776% |
| 08/25/2004 | 07/01/2022 | Series 2004A MVC | 5.000% | 33,880,000 | 07/01/2014 | 100.000% | YES | 3.004% | 1,017,892 | 0 | 0 | (1,017,892) | <-.25% |
| 08/25/2004 | 07/01/2023 | Series 2004A MVC | 5.000% | 34,885,000 | 07/01/2014 | 100.000% | YES | 2.849% | 993,738 | 0 | 0 | (993,738) | <-.25% |
| 08/25/2004 | 07/01/2030 | Series 2004A MVC | 5.250% | 47,660,000 | 07/01/2014 | 100.000% | YES | 4.925% | 2,347,095 | 0 | 0 | (2,347,095) | <-.25% |
| 08/25/2004 | 07/01/2031 | Series 2004A MVC | 5.250% | 54,255,000 | 07/01/2014 | 100.000% | YES | 4.925% | 2,671,877 | 0 | 0 | (2,671,877) | <-.25% |
| 08/15/1996 | 06/15/2009 | Series 1996C PAC | 5.300% | 2,415,000 | 06/15/2006 | 101.500% | YES | 0.921% | 22,253 | 0.162% | 3,901 | (18,353) | -12.744% |
| 08/15/1996 | 06/15/2010 | Series 1996C PAC | 5.400% | 2,540,000 | 06/15/2006 | 101.500% | YES | 0.970% | 24,632 | 3.158% | 80,207 | 55,575 | 10.013% |
| 08/15/1996 | 06/15/2011 | Series 1996C PAC | 5.400% | 2,680,000 | 06/15/2006 | 101.500% | YES | 1.009% | 27,039 | 5.182% | 138,870 | 111,831 | 14.010% |
| 08/15/1996 | 06/15/2012 | Series 1996C PAC | 5.500% | 2,825,000 | 06/15/2006 | 101.500% | YES | 1.052% | 29,709 | 7.173% | 202,635 | 172,926 | 16.535% |
| 08/15/1996 | 06/15/2013 | Series 1996C PAC | 5.500% | 2,980,000 | 06/15/2006 | 101.500% | YES | 1.084% | 32,312 | 8.639% | 257,456 | 225,145 | 17.930% |
| 08/15/1996 | 06/15/2014 | Series 1996C PAC | 5.600% | 3,145,000 | 06/15/2006 | 101.500% | YES | 1.122% | 35,287 | 10.199% | 320,770 | 285,484 | 19.115% |
| 08/15/1996 | 06/15/2015 | Series 1996C PAC | 5.000% | 3,320,000 | 06/15/2006 | 101.500% | YES | 1.098% | 36,444 | 7.439% | 246,988 | 210,544 | 16.478% |
| 08/15/1996 | 06/15/2016 | Series 1996C PAC | 5.000% | 3,485,000 | 06/15/2006 | 101.500% | YES | 1.124% | 39,154 | 7.590% | 264,501 | 225,347 | 16.450% |
| 10/16/2002 | 06/15/2013 | 2002 Series C SF | 3.500% | 21,165,000 | 06/15/2012 | 100.000% | YES | 0.089% | 18,774 | 0 | 0 | (18,774) | <-.25% |
| 10/16/2002 | 06/15/2019 | 2002 Series C SF | 4.250% | 30,275,000 | 06/15/2012 | 100.000% | YES | 1.607% | 486,529 | 0 | 0 | (486,529) | <-.25% |
| 10/16/2002 | 06/15/2021 | 2002 Series C SF | 4.250% | 30,840,000 | 06/15/2012 | 100.000% | YES | 1.515% | 467,354 | 0 | 0 | (467,354) | <-.25% |
| 10/16/2002 | 06/15/2022 | 2002 Series C SF | 4.500% | 32,150,000 | 06/15/2012 | 100.000% | YES | 1.573% | 505,820 | 0 | 0 | (505,820) | <-.25% |
| 10/16/2002 | 06/15/2023 | 2002 Series C SF | 4.750% | 36,105,000 | 06/15/2012 | 100.000% | YES | 2.574% | 929,238 | 0 | 0 | (929,238) | <-.25% |
| 10/16/2002 | 06/15/2024 | 2002 Series C SF | 4.750% | 37,820,000 | 06/15/2012 | 100.000% | YES | 2.659% | 1,005,772 | 0 | 0 | (1,005,772) | <-.25% |
| 10/16/2002 | 06/15/2025 | 2002 Series C SF | 4.750% | 39,615,000 | 06/15/2012 | 100.000% | YES | 2.659% | 1,053,507 | 0 | 0 | (1,053,507) | <-.25% |
| 10/16/2002 | 06/15/2026 | 2002 Series C SF | 4.500% | 41,495,000 | 06/15/2012 | 100.000% | YES | 1.754% | 727,666 | 0 | 0 | (727,666) | <-.25% |
| 10/16/2002 | 06/15/2027 | 2002 Series C SF | 4.500% | 43,365,000 | 06/15/2012 | 100.000% | YES | 1.754% | 760,459 | 0 | 0 | (760,459) | <-.25% |
| 08/07/2003 | 06/15/2014 | 2003 Series F SF | 5.250% | 21,665,000 | 06/15/2013 | 100.000% | YES | 0.681% | 147,513 | 0.314% | 67,979 | (79,534) | -14.613% |
| 01/23/2004 | 09/01/2014 | 2004 Series G SF | 5.000% | 21,495,000 | 09/01/2013 | 100.000% | YES | 1.169% | 251,248 | 0.084% | 17,958 | (233,289) | <-.25% |
| 01/23/2004 | 09/01/2015 | 2004 Series G SF | 5.000% | 20,695,000 | 09/01/2013 | 100.000% | YES | 2.263% | 468,344 | 0.446% | 92,363 | (375,981) | -28.561% |
| 01/23/2004 | 09/01/2022 | 2004 Series G SF | 4.250% | 31,945,000 | 09/01/2013 | 100.000% | YES | 0.990% | 316,124 | 0 | 0 | (316,124) | <-.25% |

OPTION ROI

Option Value Monitor
Option Value by Maturity

FIG. 8E

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 01/23/2004 | 09/01/2028 | 2004 Series G SF | 4.375% | 42,830,000 | 09/01/2013 | 100.000% | YES | 1.431% | 612,954 | 0 | 0 | (612,954) | <-25% |
| 01/23/2004 | 09/01/2029 | 2004 Series G SF | 4.375% | 44,745,000 | 09/01/2013 | 100.000% | YES | 1.431% | 640,360 | 0 | 0 | (640,360) | <-25% |
| 08/31/2004 | 09/01/2019 | 2004 Series I SF | 5.500% | 6,485,000 | 09/01/2014 | 100.000% | YES | 3.473% | 225,256 | 0.416% | 26,981 | (198,275) | -42.974% |
| 01/27/2005 | 12/15/2016 | 2005 Series K SF | 5.250% | 81,910,000 | 12/15/2015 | 100.000% | NO | 0.847% | 693,546 | 0 | 0 | (693,546) | <-25% |
| 01/27/2005 | 12/15/2017 | 2005 Series K SF | 4.000% | 1,266,000 | 12/15/2015 | 100.000% | NO | 0.037% | 469 | 0 | 0 | (469) | <-25% |
| 01/27/2005 | 12/15/2018 | 2005 Series K SF | 5.000% | 59,085,000 | 12/15/2015 | 100.000% | NO | 1.739% | 1,027,245 | 0 | 0 | (1,027,245) | <-25% |
| 01/27/2005 | 12/15/2017 | 2005 Series K SF | 5.250% | 62,810,000 | 12/15/2015 | 100.000% | NO | 1.589% | 998,220 | 0 | 0 | (998,220) | <-25% |
| 04/06/2005 | 03/01/2016 | 2005 Series L SF | 5.000% | 5,360,000 | 03/01/2015 | 100.000% | YES | 0.634% | 33,991 | 0 | 0 | (33,991) | <-25% |
| 04/06/2005 | 03/01/2017 | 2005 Series L SF | 5.000% | 5,630,000 | 03/01/2015 | 100.000% | YES | 1.145% | 64,463 | 0 | 0 | (64,463) | <-25% |
| 04/06/2005 | 03/01/2018 | 2005 Series L SF | 5.000% | 5,910,000 | 03/01/2015 | 100.000% | YES | 1.561% | 92,234 | 0 | 0 | (92,234) | <-25% |
| 04/06/2005 | 03/01/2019 | 2005 Series L SF | 5.000% | 6,205,000 | 03/01/2015 | 100.000% | YES | 1.880% | 116,677 | 0 | 0 | (116,677) | <-25% |
| 04/06/2005 | 03/01/2020 | 2005 Series L SF | 5.000% | 6,515,000 | 03/01/2015 | 100.000% | YES | 2.257% | 147,072 | 0 | 0 | (147,072) | <-25% |
| 04/06/2005 | 03/01/2021 | 2005 Series L SF | 5.000% | 6,840,000 | 03/01/2015 | 100.000% | YES | 2.692% | 184,121 | 0 | 0 | (184,121) | <-25% |
| 04/06/2005 | 03/01/2022 | 2005 Series L SF | 5.000% | 7,185,000 | 03/01/2015 | 100.000% | YES | 3.077% | 221,082 | 0 | 0 | (221,082) | <-25% |
| 04/06/2005 | 03/01/2023 | 2005 Series L SF | 5.000% | 7,545,000 | 03/01/2015 | 100.000% | YES | 3.609% | 272,328 | 0 | 0 | (272,328) | <-25% |
| 04/06/2005 | 03/01/2024 | 2005 Series L SF | 5.000% | 7,920,000 | 03/01/2015 | 100.000% | YES | 3.896% | 308,525 | 0 | 0 | (308,525) | <-25% |
| 04/06/2005 | 03/01/2025 | 2005 Series L SF | 5.000% | 8,315,000 | 03/01/2015 | 100.000% | YES | 4.208% | 349,862 | 0 | 0 | (349,862) | <-25% |
| 04/06/2005 | 03/01/2026 | 2005 Series L SF | 5.000% | 8,735,000 | 03/01/2015 | 100.000% | YES | 4.417% | 385,795 | 0 | 0 | (385,795) | <-25% |
| 04/06/2005 | 03/01/2027 | 2005 Series L SF | 5.000% | 9,170,000 | 03/01/2015 | 100.000% | YES | 4.748% | 435,373 | 0 | 0 | (435,373) | <-25% |
| 04/06/2005 | 03/01/2028 | 2005 Series L SF | 5.000% | 9,630,000 | 03/01/2015 | 100.000% | YES | 4.748% | 457,212 | 0 | 0 | (457,212) | <-25% |
| 04/06/2005 | 03/01/2029 | 2005 Series L SF | 5.000% | 10,110,000 | 03/01/2015 | 100.000% | YES | 4.748% | 480,002 | 0 | 0 | (480,002) | <-25% |
| 04/06/2005 | 03/01/2030 | 2005 Series L SF | 5.000% | 10,615,000 | 03/01/2015 | 100.000% | YES | 4.748% | 503,978 | 0 | 0 | (503,978) | <-25% |
| 05/23/2005 | 09/01/2016 | 2005 Series N SF | 5.250% | 22,675,000 | 09/01/2015 | 100.000% | NO | 0.942% | 213,682 | 0 | 0 | (213,682) | <-25% |
| 05/23/2005 | 09/01/2017 | 2005 Series N SF | 5.000% | 46,085,000 | 09/01/2015 | 100.000% | NO | 1.410% | 649,837 | 0 | 0 | (649,837) | <-25% |
| 05/23/2005 | 09/01/2018 | 2005 Series N SF | 5.000% | 25,740,000 | 09/01/2015 | 100.000% | NO | 1.969% | 506,914 | 0 | 0 | (506,914) | <-25% |
| 10/04/2005 | 03/01/2016 | 2005 Series O SF | 5.000% | 26,575,000 | 03/01/2015 | 100.000% | YES | 0.647% | 171,887 | 0 | 0 | (171,887) | <-25% |
| 10/04/2005 | 03/01/2017 | 2005 Series O SF | 5.000% | 27,905,000 | 03/01/2015 | 100.000% | YES | 1.182% | 329,955 | 0 | 0 | (329,955) | <-25% |
| 10/04/2005 | 03/01/2018 | 2005 Series O SF | 5.000% | 29,300,000 | 03/01/2015 | 100.000% | YES | 1.634% | 478,825 | 0 | 0 | (478,825) | <-25% |
| 10/04/2005 | 03/01/2019 | 2005 Series O SF | 5.000% | 30,765,000 | 03/01/2015 | 100.000% | YES | 2.000% | 615,372 | 0 | 0 | (615,372) | <-25% |
| 10/04/2005 | 03/01/2020 | 2005 Series O SF | 5.000% | 32,305,000 | 03/01/2015 | 100.000% | YES | 2.398% | 774,733 | 0 | 0 | (774,733) | <-25% |
| 10/04/2005 | 03/01/2021 | 2005 Series O SF | 5.250% | 33,920,000 | 03/01/2015 | 100.000% | YES | 3.934% | 1,334,347 | 0 | 0 | (1,334,347) | <-25% |
| 10/04/2005 | 03/01/2022 | 2005 Series O SF | 5.250% | 35,700,000 | 03/01/2015 | 100.000% | YES | 4.418% | 1,577,274 | 0 | 0 | (1,577,274) | <-25% |
| 10/04/2005 | 03/01/2023 | 2005 Series O SF | 5.250% | 37,575,000 | 03/01/2015 | 100.000% | YES | 4.950% | 1,859,884 | 0 | 0 | (1,859,884) | <-25% |
| 10/04/2005 | 03/01/2024 | 2005 Series O SF | 5.250% | 39,540,000 | 03/01/2015 | 100.000% | YES | 5.450% | 2,155,368 | 0 | 0 | (2,155,368) | <-25% |
| 10/04/2005 | 03/01/2025 | 2005 Series O SF | 5.250% | 41,625,000 | 03/01/2015 | 100.000% | YES | 5.919% | 2,463,949 | 0 | 0 | (2,463,949) | <-25% |
| 10/04/2005 | 03/01/2026 | 2005 Series O SF | 5.250% | 43,810,000 | 03/01/2015 | 100.000% | YES | 6.360% | 2,786,394 | 0 | 0 | (2,786,394) | <-25% |
| 10/04/2005 | 03/01/2027 | 2005 Series O SF | 5.125% | 46,110,000 | 03/01/2015 | 100.000% | YES | 5.951% | 2,744,011 | 0 | 0 | (2,744,011) | <-25% |
| 10/04/2005 | 03/01/2028 | 2005 Series O SF | 5.125% | 48,475,000 | 03/01/2015 | 100.000% | YES | 5.951% | 2,884,752 | 0 | 0 | (2,884,752) | <-25% |
| 10/04/2005 | 03/01/2029 | 2005 Series O SF | 5.125% | 50,955,000 | 03/01/2015 | 100.000% | YES | 6.602% | 3,364,295 | 0 | 0 | (3,364,295) | <-25% |
| 10/04/2005 | 03/01/2030 | 2005 Series O SF | 5.125% | 53,570,000 | 03/01/2015 | 100.000% | YES | 6.602% | 3,536,950 | 0 | 0 | (3,536,950) | <-25% |

OPTION ROI

Option Value Monitor
Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 12/15/2005 | 09/01/2016 | 2005 Series P SF | 5.250% | 6,115,000 | 09/01/2015 | 100.000% | YES | 0.644% | 39,387 | 0 | 0 | (39,387) | < -25% |
| 12/15/2005 | 09/01/2017 | 2005 Series P SF | 5.250% | 6,445,000 | 09/01/2015 | 100.000% | YES | 1.206% | 77,730 | 0 | 0 | (77,730) | < -25% |
| 12/15/2005 | 09/01/2018 | 2005 Series P SF | 5.250% | 6,790,000 | 09/01/2015 | 100.000% | YES | 1.711% | 116,151 | 0 | 0 | (116,151) | < -25% |
| 12/15/2005 | 09/01/2019 | 2005 Series P SF | 5.250% | 7,155,000 | 09/01/2015 | 100.000% | YES | 2.128% | 152,243 | 0 | 0 | (152,243) | < -25% |
| 12/15/2005 | 09/01/2020 | 2005 Series P SF | 5.250% | 7,545,000 | 09/01/2015 | 100.000% | YES | 2.508% | 189,219 | 0 | 0 | (189,219) | < -25% |
| 12/15/2005 | 09/01/2021 | 2005 Series P SF | 5.250% | 7,950,000 | 09/01/2015 | 100.000% | YES | 2.759% | 219,310 | 0 | 0 | (219,310) | < -25% |
| 12/15/2005 | 09/01/2022 | 2005 Series P SF | 5.250% | 8,380,000 | 09/01/2015 | 100.000% | YES | 3.147% | 263,715 | 0 | 0 | (263,715) | < -25% |
| 12/15/2005 | 09/01/2023 | 2005 Series P SF | 5.250% | 8,830,000 | 09/01/2015 | 100.000% | YES | 3.497% | 308,823 | 0 | 0 | (308,823) | < -25% |
| 12/15/2005 | 09/01/2024 | 2005 Series P SF | 5.250% | 9,305,000 | 09/01/2015 | 100.000% | YES | 3.918% | 364,567 | 0 | 0 | (364,567) | < -25% |
| 12/15/2005 | 09/01/2025 | 2005 Series P SF | 5.250% | 9,810,000 | 09/01/2015 | 100.000% | YES | 4.778% | 468,726 | 0 | 0 | (468,726) | < -25% |
| 12/15/2005 | 09/01/2026 | 2005 Series P SF | 5.250% | 10,335,000 | 09/01/2015 | 100.000% | YES | 4.778% | 493,811 | 0 | 0 | (493,811) | < -25% |
| 12/15/2005 | 09/01/2027 | 2005 Series P SF | 5.125% | 10,885,000 | 09/01/2015 | 100.000% | YES | 3.967% | 431,771 | 0 | 0 | (431,771) | < -25% |
| 12/15/2005 | 09/01/2028 | 2005 Series P SF | 5.125% | 11,460,000 | 09/01/2015 | 100.000% | YES | 3.967% | 454,580 | 0 | 0 | (454,580) | < -25% |
| 12/15/2005 | 09/01/2029 | 2005 Series P SF | 5.000% | 12,055,000 | 09/01/2015 | 100.000% | YES | 2.809% | 338,606 | 0 | 0 | (338,606) | < -25% |
| 12/15/2005 | 09/01/2030 | 2005 Series P SF | 5.000% | 12,675,000 | 09/01/2015 | 100.000% | YES | 2.809% | 356,021 | 0 | 0 | (356,021) | < -25% |
| 12/21/2005 | 03/01/2022 | 2005 Series Q-1 SF | 4.500% | 11,125,000 | 03/01/2018 | 100.000% | YES | 0.506% | 56,238 | 0 | 0 | (56,238) | < -25% |
| 12/21/2005 | 03/01/2022 | 2005 Series Q-2 SF | 5.000% | 11,120,000 | 03/01/2018 | 100.000% | YES | 1.422% | 158,115 | 0 | 0 | (158,115) | < -25% |
| 11/02/2006 | 09/01/2032 | 2006 Series S SF | 5.000% | 18,050,000 | 09/01/2016 | 100.000% | YES | 4.681% | 844,845 | 0 | 0 | (844,845) | < -25% |
| 11/02/2006 | 09/01/2033 | 2006 Series S SF | 5.000% | 18,975,000 | 09/01/2016 | 100.000% | YES | 4.681% | 888,140 | 0 | 0 | (888,140) | < -25% |
| 11/02/2006 | 09/01/2034 | 2006 Series S SF | 5.000% | 19,940,000 | 09/01/2016 | 100.000% | YES | 4.681% | 933,776 | 0 | 0 | (933,776) | < -25% |
| 11/02/2006 | 09/01/2035 | 2006 Series S SF | 5.000% | 20,050,000 | 09/01/2016 | 100.000% | YES | 4.681% | 938,456 | 0 | 0 | (938,456) | < -25% |
| 11/02/2006 | 09/01/2036 | 2006 Series S SF | 5.000% | 22,050,000 | 09/01/2016 | 100.000% | YES | 4.681% | 1,032,068 | 0 | 0 | (1,032,068) | < -25% |
| 10/04/2007 | 03/01/2018 | 2007 Series U SF | 5.000% | 3,400,000 | 09/01/2017 | 100.000% | YES | 0.302% | 10,272 | 0 | 0 | (10,272) | < -25% |
| 10/04/2007 | 03/01/2019 | 2007 Series U SF | 5.000% | 3,420,000 | 09/01/2017 | 100.000% | YES | 0.825% | 28,220 | 0 | 0 | (28,220) | < -25% |
| 10/04/2007 | 03/01/2020 | 2007 Series U SF | 5.000% | 3,455,000 | 09/01/2017 | 100.000% | YES | 1.245% | 43,026 | 0 | 0 | (43,026) | < -25% |
| 10/04/2007 | 03/01/2021 | 2007 Series U SF | 5.000% | 3,490,000 | 09/01/2017 | 100.000% | YES | 1.592% | 55,570 | 0 | 0 | (55,570) | < -25% |
| 10/04/2007 | 03/01/2022 | 2007 Series U SF | 5.000% | 3,540,000 | 09/01/2017 | 100.000% | YES | 1.778% | 62,945 | 0 | 0 | (62,945) | < -25% |
| 10/04/2007 | 03/01/2023 | 2007 Series U SF | 5.000% | 3,580,000 | 09/01/2017 | 100.000% | YES | 2.008% | 71,883 | 0 | 0 | (71,883) | < -25% |
| 10/04/2007 | 03/01/2024 | 2007 Series U SF | 5.000% | 3,615,000 | 09/01/2017 | 100.000% | YES | 2.301% | 83,186 | 0 | 0 | (83,186) | < -25% |
| 10/04/2007 | 03/01/2025 | 2007 Series U SF | 5.000% | 3,650,000 | 09/01/2017 | 100.000% | YES | 2.549% | 93,047 | 0 | 0 | (93,047) | < -25% |
| 10/04/2007 | 03/01/2026 | 2007 Series U SF | 5.000% | 3,670,000 | 09/01/2017 | 100.000% | YES | 2.854% | 104,731 | 0 | 0 | (104,731) | < -25% |
| 10/04/2007 | 03/01/2027 | 2007 Series U SF | 5.000% | 3,690,000 | 09/01/2017 | 100.000% | YES | 3.001% | 110,746 | 0 | 0 | (110,746) | < -25% |
| 10/04/2007 | 03/01/2028 | 2007 Series U SF | 5.000% | 3,685,000 | 09/01/2017 | 100.000% | YES | 3.790% | 139,673 | 0 | 0 | (139,673) | < -25% |
| 10/04/2007 | 03/01/2029 | 2007 Series U SF | 5.000% | 3,660,000 | 09/01/2017 | 100.000% | YES | 3.790% | 138,725 | 0 | 0 | (138,725) | < -25% |
| 10/04/2007 | 03/01/2030 | 2007 Series U SF | 5.000% | 3,620,000 | 09/01/2017 | 100.000% | YES | 3.790% | 137,209 | 0 | 0 | (137,209) | < -25% |
| 10/04/2007 | 03/01/2031 | 2007 Series U SF | 5.000% | 3,570,000 | 09/01/2017 | 100.000% | YES | 3.790% | 135,314 | 0 | 0 | (135,314) | < -25% |
| 10/04/2007 | 03/01/2032 | 2007 Series U SF | 5.000% | 3,500,000 | 09/01/2017 | 100.000% | YES | 3.790% | 132,661 | 0 | 0 | (132,661) | < -25% |
| 10/04/2007 | 03/01/2033 | 2007 Series U SF | 5.000% | 21,235,000 | 09/01/2017 | 100.000% | YES | 4.300% | 913,084 | 0 | 0 | (913,084) | < -25% |
| 10/04/2007 | 03/01/2034 | 2007 Series U SF | 5.000% | 22,325,000 | 09/01/2017 | 100.000% | YES | 4.300% | 959,953 | 0 | 0 | (959,953) | < -25% |
| 10/04/2007 | 03/01/2035 | 2007 Series U SF | 5.000% | 23,470,000 | 09/01/2017 | 100.000% | YES | 4.300% | 1,009,186 | 0 | 0 | (1,009,186) | < -25% |
| 10/04/2007 | 03/01/2036 | 2007 Series U SF | 5.000% | 24,670,000 | 09/01/2017 | 100.000% | YES | 4.300% | 1,060,785 | 0 | 0 | (1,060,785) | < -25% |

FIG. 8F

OPTION ROI

Option Value Monitor
Option Value by Maturity

*FIG. 8G*

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 10/04/2007 | 03/01/2037 | 2007 Series U SF | 5.000% | 25,935,000 | 09/01/2017 | 100.000% | YES | 4.300% | 1,115,179 | 0 | 0 | (1,115,179) | <-25% |
| 10/04/2007 | 03/01/2033 | 2007 Series U SF | 4.125% | 18,050,000 | 09/01/2017 | 100.000% | YES | 4.300% | 776,132 | 0 | 0 | (776,132) | <-25% |
| 10/04/2007 | 03/01/2034 | 2007 Series U SF | 5.000% | 18,975,000 | 09/01/2017 | 100.000% | YES | 4.300% | 815,906 | 0 | 0 | (815,906) | <-25% |
| 10/04/2007 | 03/01/2035 | 2007 Series U SF | 5.000% | 19,950,000 | 09/01/2017 | 100.000% | YES | 4.300% | 857,830 | 0 | 0 | (857,830) | <-25% |
| 10/04/2007 | 03/01/2036 | 2007 Series U SF | 5.000% | 20,975,000 | 09/01/2017 | 100.000% | YES | 4.300% | 901,904 | 0 | 0 | (901,904) | <-25% |
| 10/04/2007 | 03/01/2037 | 2007 Series U SF | 5.000% | 22,050,000 | 09/01/2017 | 100.000% | YES | 4.300% | 948,128 | 0 | 0 | (948,128) | <-25% |
| 06/03/2008 | 09/01/2019 | 2008 Series Y SF | 5.000% | 6,780,000 | 09/01/2018 | 100.000% | YES | 0.548% | 37,161 | 0 | 0 | (37,161) | <-25% |
| 06/03/2008 | 09/01/2020 | 2008 Series Y SF | 4.125% | 1,090,000 | 09/01/2018 | 100.000% | YES | 0.000% | – | 0 | 0 | 0 | <-25% |
| 06/03/2008 | 09/01/2021 | 2008 Series Y SF | 5.000% | 7,415,000 | 09/01/2018 | 100.000% | YES | 1.262% | 93,540 | 0 | 0 | (93,540) | <-25% |
| 06/03/2008 | 09/01/2022 | 2008 Series Y SF | 4.000% | 7,745,000 | 09/01/2018 | 100.000% | YES | 0.000% | 0 | 0 | 0 | 0 | <-25% |
| 06/03/2008 | 09/01/2023 | 2008 Series Y SF | 4.250% | 8,050,000 | 09/01/2018 | 100.000% | YES | 0.109% | 8,762 | 0 | 0 | (8,762) | <-25% |
| 06/03/2008 | 09/01/2024 | 2008 Series Y SF | 4.500% | 8,405,000 | 09/01/2018 | 100.000% | YES | 0.181% | 15,212 | 0 | 0 | (15,212) | <-25% |
| 06/03/2008 | 09/01/2025 | 2008 Series Y SF | 4.500% | 8,785,000 | 09/01/2018 | 100.000% | YES | 0.119% | 10,421 | 0 | 0 | (10,421) | <-25% |
| 06/03/2008 | 09/01/2026 | 2008 Series Y SF | 4.500% | 9,175,000 | 09/01/2018 | 100.000% | YES | 0.122% | 11,203 | 0 | 0 | (11,203) | <-25% |
| 06/03/2008 | 09/01/2027 | 2008 Series Y SF | 4.250% | 9,575,000 | 09/01/2018 | 100.000% | YES | 0.245% | 23,499 | 0 | 0 | (23,499) | <-25% |
| 06/03/2008 | 09/01/2028 | 2008 Series Y SF | 4.625% | 9,995,000 | 09/01/2018 | 100.000% | YES | 0.259% | 25,895 | 0 | 0 | (25,895) | <-25% |
| 06/03/2008 | 09/01/2029 | 2008 Series Y SF | 5.000% | 7,910,000 | 09/01/2018 | 100.000% | YES | 1.876% | 148,399 | 0 | 0 | (148,399) | <-25% |
| 06/03/2008 | 09/01/2030 | 2008 Series Y SF | 5.000% | 8,420,000 | 09/01/2018 | 100.000% | YES | 1.876% | 157,967 | 0 | 0 | (157,967) | <-25% |
| 06/03/2008 | 09/01/2031 | 2008 Series Y SF | 5.000% | 8,960,000 | 09/01/2018 | 100.000% | YES | 1.876% | 168,098 | 0 | 0 | (168,098) | <-25% |
| 06/03/2008 | 09/01/2032 | 2008 Series Y SF | 5.000% | 9,535,000 | 09/01/2018 | 100.000% | YES | 1.876% | 178,886 | 0 | 0 | (178,886) | <-25% |
| 06/03/2008 | 09/01/2033 | 2008 Series Y SF | 5.000% | 10,130,000 | 09/01/2018 | 100.000% | YES | 1.876% | 190,048 | 0 | 0 | (190,048) | <-25% |
| 06/03/2008 | 09/01/2029 | 2008 Series Y SF | 4.750% | 2,565,000 | 09/01/2018 | 100.000% | YES | 0.292% | 7,499 | 0 | 0 | (7,499) | <-25% |
| 06/03/2008 | 09/01/2030 | 2008 Series Y SF | 4.750% | 2,565,000 | 09/01/2018 | 100.000% | YES | 0.292% | 7,499 | 0 | 0 | (7,499) | <-25% |
| 06/03/2008 | 09/01/2031 | 2008 Series Y SF | 4.750% | 2,565,000 | 09/01/2018 | 100.000% | YES | 0.292% | 7,499 | 0 | 0 | (7,499) | <-25% |
| 06/03/2008 | 09/01/2032 | 2008 Series Y SF | 4.750% | 2,565,000 | 09/01/2018 | 100.000% | YES | 0.292% | 7,499 | 0 | 0 | (7,499) | <-25% |
| 06/03/2008 | 09/01/2033 | 2008 Series Y SF | 4.750% | 2,565,000 | 09/01/2018 | 100.000% | YES | 0.292% | 7,499 | 0 | 0 | (7,499) | <-25% |
| | | | | | | | | Total | 96,392,868 | | 24,186,861 | | |

OPTION ROI

Option Value Monitor
Option Value by Maturity

*FIG. 8H*

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 12/16/1998 | 06/15/2018 | 1998 Series A | 4.500% | 50,285,000 | 06/15/2009 | 100.000% | YES | 1.759% | 884,666 | 2.915% | 1,465,852 | 581,185 | 5.248% |
| 12/16/1998 | 06/15/2019 | 1998 Series A | 4.500% | 52,545,000 | 06/15/2009 | 100.000% | YES | 1.759% | 924,426 | 1.903% | 1,000,091 | 75,665 | 0 |
| 07/31/2003 | 06/15/2018 | 2003 Series C | 4.375% | 1,345,000 | 06/15/2013 | 100.000% | YES | 0.650% | 8,738 | 0 | 0 | (8,738) | <-25% |
| 07/31/2003 | 06/15/2024 | 2003 Series C | 4.750% | 14,365,000 | 06/15/2013 | 100.000% | YES | 1.322% | 189,920 | 0 | 0 | (189,920) | <-25% |
| 01/19/2005 | 12/15/2016 | 2005 Series B | 5.250% | 110,745,000 | 12/15/2015 | 100.000% | NO | 0.839% | 928,781 | 0 | 0 | (928,781) | <-25% |
| 01/19/2005 | 12/15/2017 | 2005 Series B | 5.250% | 83,130,000 | 12/15/2015 | 100.000% | NO | 1.517% | 1,336,754 | 0 | 0 | (1,336,754) | <-25% |
| 01/19/2005 | 12/15/2018 | 2005 Series B | 5.250% | 94,325,000 | 12/15/2015 | 100.000% | NO | 2.107% | 1,987,021 | 0 | 0 | (1,987,021) | <-25% |
| 03/30/2005 | 06/15/2020 | 2005 Series C | 5.250% | 48,480,000 | 06/15/2015 | 100.000% | YES | 2.699% | 1,308,363 | 0 | 0 | (1,308,363) | <-25% |
| 10/27/2005 | 06/15/2018 | 2005 Series D | 5.000% | 86,060,000 | 06/15/2015 | 100.000% | YES | 1.680% | 1,446,189 | 0 | 0 | (1,446,189) | <-25% |
| 10/27/2005 | 06/15/2019 | 2005 Series D | 5.000% | 155,190,000 | 06/15/2015 | 100.000% | YES | 2.036% | 3,160,264 | 0 | 0 | (3,160,264) | <-25% |
| 10/27/2005 | 06/15/2020 | 2005 Series D | 5.000% | 216,125,000 | 06/15/2015 | 100.000% | YES | 2.055% | 4,441,603 | 0 | 0 | (4,441,603) | <-25% |
| 10/27/2005 | 06/15/2016 | 2005 Series D | 4.000% | 3,255,000 | 06/15/2015 | 100.000% | YES | 0.000% |  | 0 | 0 | 0 | 0 |
| 10/27/2005 | 06/15/2017 | 2005 Series D | 4.000% | 2,365,000 | 06/15/2015 | 100.000% | YES | 0.000% |  | 0 | 0 | 0 | 0 |
| 10/27/2005 | 06/15/2018 | 2005 Series D | 4.100% | 930,000 | 06/15/2015 | 100.000% | YES | 0.097% | 904 | 0 | 0 | (904) | <-25% |
| 10/27/2005 | 06/15/2019 | 2005 Series D | 4.125% | 125,000 | 06/15/2015 | 100.000% | YES | 0.102% | 128 | 0 | 0 | (128) | <-25% |
| 10/27/2005 | 06/15/2020 | 2005 Series D | 4.200% | 1,095,000 | 06/15/2015 | 100.000% | YES | 0.108% | 1,183 | 0 | 0 | (1,183) | <-25% |
| 10/27/2005 | 06/15/2020 | 2005 Series D | 4.300% | 765,000 | 06/15/2015 | 100.000% | YES | 0.107% | 821 | 0 | 0 | (821) | <-25% |
| 09/27/2007 | 12/15/2009 | 2007 Series A | 3.600% | 15,595,000 | 08/15/2008 | 100.000% | YES | 0.000% |  | 1.106% |  | 172,424 | Positive |
| 09/27/2007 | 12/15/2010 | 2007 Series A | 3.625% | 16,170,000 | 08/15/2008 | 100.000% | YES | 0.000% |  | 1.921% |  | 310,611 | Positive |
| 09/27/2007 | 12/15/2011 | 2007 Series A | 3.750% | 16,775,000 | 08/15/2008 | 100.000% | YES | 0.000% |  | 2.396% |  | 401,861 | Positive |
| 09/27/2007 | 12/15/2012 | 2007 Series A | 3.750% | 17,420,000 | 08/15/2008 | 100.000% | YES | 0.000% |  | 2.488% |  | 433,458 | Positive |
| 09/27/2007 | 12/15/2013 | 2007 Series A | 4.000% | 18,105,000 | 08/15/2008 | 100.000% | YES | 0.000% |  | 3.483% |  | 630,574 | Positive |
| 09/27/2007 | 12/15/2014 | 2007 Series A | 4.000% | 18,845,000 | 08/15/2008 | 100.000% | YES | 0.000% |  | 3.138% |  | 591,445 | Positive |
| 09/27/2007 | 12/15/2015 | 2007 Series A | 4.000% | 19,615,000 | 08/15/2008 | 100.000% | YES | 0.000% |  | 2.646% |  | 518,968 | Positive |
| 09/27/2007 | 12/15/2016 | 2007 Series A | 4.000% | 20,415,000 | 08/15/2008 | 100.000% | YES | 0.000% |  | 1.918% |  | 391,548 | Positive |
| 09/27/2007 | 12/15/2017 | 2007 Series A | 4.000% | 21,250,000 | 08/15/2008 | 100.000% | YES | 0.000% |  | 0.891% |  | 189,392 | Positive |
| 09/27/2007 | 12/15/2018 | 2007 Series A | 4.900% | 2,105,000 | 08/15/2008 | 100.000% | YES | 0.000% |  | 3.879% |  | 81,649 | Positive |
| 09/27/2007 | 12/15/2019 | 2007 Series A | 4.500% | 2,195,000 | 08/15/2008 | 100.000% | YES | 0.000% |  | 2.740% |  | 60,147 | Positive |
| 09/27/2007 | 12/15/2020 | 2007 Series A | 4.500% | 2,295,000 | 08/15/2008 | 100.000% | YES | 0.000% |  | 1.596% |  | 36,631 | Positive |
| 09/27/2007 | 12/15/2021 | 2007 Series A | 4.500% | 2,395,000 | 08/15/2008 | 100.000% | YES | 0.000% |  | 0.751% |  | 17,997 | Positive |
| 09/27/2007 | 12/15/2022 | 2007 Series A | 4.500% | 2,495,000 | 08/15/2008 | 100.000% | YES | 0.000% |  | 0.023% |  | 569 | Positive |
| 09/27/2007 | 12/15/2018 | 2007 Series A | 4.250% | 20,400,000 | 08/15/2008 | 100.000% | YES | 0.000% |  | 1.793% |  | 365,851 | Positive |
| 09/27/2007 | 12/15/2019 | 2007 Series A | 4.250% | 20,920,000 | 08/15/2008 | 100.000% | YES | 0.000% |  | 0.515% |  | 107,723 | Positive |
| 09/27/2007 | 12/15/2020 | 2007 Series A | 4.250% | 21,830,000 | 08/15/2008 | 100.000% | YES | 0.000% |  | 0 |  | 0 | 0 |
| 09/27/2007 | 12/15/2021 | 2007 Series A | 4.250% | 22,780,000 | 08/15/2008 | 100.000% | YES | 0.000% |  | 0 |  | 0 | 0 |
| 09/27/2007 | 12/15/2022 | 2007 Series A | 4.250% | 23,780,000 | 08/15/2008 | 100.000% | YES | 0.000% |  | 0 |  | 0 | 0 |
| 09/27/2007 | 12/15/2023 | 2007 Series A | 5.000% | 40,020,000 | 08/15/2017 | 100.000% | YES | 2.642% | 1,057,265 | 0 | 0 | (1,057,265) | <-25% |
| 09/27/2007 | 12/15/2024 | 2007 Series A | 5.000% | 42,070,000 | 08/15/2017 | 100.000% | YES | 2.819% | 1,185,882 | 0 | 0 | (1,185,882) | <-25% |

OPTION ROI

Option Value Monitor
Option Value by Maturity

*FIG. 8I*

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 09/27/2007 | 12/15/2025 | 2007 Series A | 5.000% | 44,230,000 | 08/15/2017 | 100.000% | YES | 3.122% | 1,381,012 | 0 | 0 | (1,381,012) | <-25% |
| 09/27/2007 | 12/15/2026 | 2007 Series A | 5.000% | 46,500,000 | 08/15/2017 | 100.000% | YES | 3.311% | 1,539,455 | 0 | 0 | (1,539,455) | <-25% |
| 09/27/2007 | 12/15/2027 | 2007 Series A | 5.000% | 48,880,000 | 08/15/2017 | 100.000% | YES | 3.468% | 1,695,158 | 0 | 0 | (1,695,158) | <-25% |
| 09/27/2007 | 12/15/2028 | 2007 Series A | 5.000% | 51,390,000 | 08/15/2017 | 100.000% | YES | 4.325% | 2,222,476 | 0 | 0 | (2,222,476) | <-25% |
| 09/27/2007 | 12/15/2029 | 2007 Series A | 5.000% | 54,025,000 | 08/15/2017 | 100.000% | YES | 4.325% | 2,336,433 | 0 | 0 | (2,336,433) | <-25% |
| 09/27/2007 | 12/15/2030 | 2007 Series A | 5.000% | 56,795,000 | 08/15/2017 | 100.000% | YES | 4.325% | 2,456,228 | 0 | 0 | (2,456,228) | <-25% |
| 09/27/2007 | 12/15/2031 | 2007 Series A | 5.000% | 59,705,000 | 08/15/2017 | 100.000% | YES | 4.325% | 2,582,077 | 0 | 0 | (2,582,077) | <-25% |
| 09/27/2007 | 12/15/2032 | 2007 Series A | 5.000% | 62,770,000 | 08/15/2017 | 100.000% | YES | 4.325% | 2,714,630 | 0 | 0 | (2,714,630) | <-25% |
| 09/27/2007 | 12/15/2033 | 2007 Series A | 5.000% | 65,990,000 | 08/15/2017 | 100.000% | YES | 4.511% | 2,976,970 | 0 | 0 | (2,976,970) | <-25% |
| 09/27/2007 | 12/15/2034 | 2007 Series A | 5.000% | 69,370,000 | 08/15/2017 | 100.000% | YES | 4.511% | 3,129,450 | 0 | 0 | (3,129,450) | <-25% |
| 09/27/2007 | 12/15/2035 | 2007 Series A | 4.750% | 72,835,000 | 08/15/2017 | 100.000% | YES | 0.895% | 651,858 | 0 | 0 | (651,858) | <-25% |
| 09/27/2007 | 12/15/2036 | 2007 Series A | 4.750% | 76,380,000 | 08/15/2017 | 100.000% | YES | 0.895% | 683,585 | 0 | 0 | (683,585) | <-25% |
| 09/27/2007 | 12/15/2037 | 2007 Series A | 4.750% | 80,095,000 | 08/15/2017 | 100.000% | YES | 0.895% | 716,834 | 0 | 0 | (716,834) | <-25% |
| | | | | | | | | Total | 43,949,073 | | 6,776,792 | | |

OPTION ROI

Option Value Monitor
Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 12/12/2002 | 12/15/2013 | 2002 Series B BA | 5.250% | 18,380,000 | 12/15/2012 | 100.000% | NO | 0.969% | 178,095 | 0.375% | 68,998 | (109,097) | 15.805% |
| 12/12/2002 | 12/15/2014 | 2002 Series B BA | 5.250% | 17,690,000 | 12/15/2012 | 100.000% | NO | 1.784% | 315,641 | 1.076% | 190,282 | (125,359) | 8.599% |
| 12/12/2002 | 12/15/2015 | 2002 Series B BA | 5.250% | 18,695,000 | 12/15/2012 | 100.000% | NO | 2.503% | 467,899 | 1.580% | 295,301 | (172,597) | 7.835% |
| 08/08/2006 | 06/15/2017 | 2006 Series A BA | 4.250% | 2,345,000 | 06/15/2016 | 100.000% | YES | 0.164% | 3,856 | 0 | 0 | (3,856) | < 25% |
| 08/08/2006 | 06/15/2018 | 2006 Series A BA | 4.000% | 2,445,000 | 06/15/2016 | 100.000% | YES | 0.000% | 0 | 0 | 0 | 0 | 0 |
| 08/08/2006 | 06/15/2019 | 2006 Series A BA | 4.000% | 2,545,000 | 06/15/2016 | 100.000% | YES | 0.000% | 0 | 0 | 0 | 0 | 0 |
| 08/08/2006 | 06/15/2020 | 2006 Series A BA | 4.125% | 2,645,000 | 06/15/2016 | 100.000% | YES | 0.104% | 2,759 | 0 | 0 | (2,759) | <.25% |
| 08/08/2006 | 06/15/2021 | 2006 Series A BA | 4.125% | 2,755,000 | 06/15/2016 | 100.000% | YES | 0.218% | 6,014 | 0 | 0 | (6,014) | <.25% |
| 08/08/2006 | 06/15/2022 | 2006 Series A BA | 4.250% | 2,865,000 | 06/15/2016 | 100.000% | YES | 0.344% | 9,852 | 0 | 0 | (9,852) | <.25% |
| 08/08/2006 | 06/15/2023 | 2006 Series A BA | 4.250% | 2,990,000 | 06/15/2016 | 100.000% | YES | 0.357% | 10,666 | 0 | 0 | (10,666) | <.25% |
| 08/08/2006 | 06/15/2024 | 2006 Series A BA | 4.500% | 3,115,000 | 06/15/2016 | 100.000% | YES | 1.215% | 37,849 | 0 | 0 | (37,849) | <.25% |
| 08/08/2006 | 06/15/2025 | 2006 Series A BA | 4.500% | 3,255,000 | 06/15/2016 | 100.000% | YES | 1.214% | 39,528 | 0 | 0 | (39,528) | <.25% |
| 08/08/2006 | 06/15/2026 | 2006 Series A BA | 4.500% | 3,405,000 | 06/15/2016 | 100.000% | YES | 1.192% | 40,589 | 0 | 0 | (40,589) | <.25% |
| 08/08/2006 | 06/15/2027 | 2006 Series A BA | 4.500% | 3,555,000 | 06/15/2016 | 100.000% | YES | 1.288% | 45,780 | 0 | 0 | (45,780) | <.25% |
| 11/07/2007 | 06/15/2017 | 2007 Series A BA | 5.000% | 3,590,000 | 06/15/2016 | 100.000% | YES | 0.565% | 20,272 | 0 | 0 | (20,272) | <.25% |
| 11/07/2007 | 06/15/2018 | 2007 Series A BA | 5.000% | 5,785,000 | 06/15/2016 | 100.000% | YES | 0.978% | 56,581 | 0 | 0 | (56,581) | <.25% |
| 11/07/2007 | 06/15/2019 | 2007 Series A BA | 5.000% | 6,020,000 | 06/15/2016 | 100.000% | YES | 1.271% | 76,537 | 0 | 0 | (76,537) | <.25% |
| 11/07/2007 | 06/15/2020 | 2007 Series A BA | 4.500% | 6,295,000 | 06/15/2016 | 100.000% | YES | 1.526% | 96,076 | 0 | 0 | (96,076) | <.22% |
| 11/07/2007 | 06/15/2021 | 2007 Series A BA | 5.000% | 6,575,000 | 06/15/2016 | 100.000% | YES | 1.706% | 112,143 | 0 | 0 | (112,143) | <.25% |
| 11/07/2007 | 06/15/2022 | 2007 Series A BA | 5.000% | 6,870,000 | 06/15/2016 | 100.000% | YES | 1.813% | 124,669 | 0 | 0 | (124,669) | <.25% |
| 11/07/2007 | 06/15/2023 | 2007 Series A BA | 5.000% | 7,210,000 | 06/15/2016 | 100.000% | YES | 1.901% | 137,078 | 0 | 0 | (137,078) | <.25% |
| 11/07/2007 | 06/15/2024 | 2007 Series A BA | 5.000% | 7,575,000 | 06/15/2016 | 100.000% | YES | 1.937% | 146,708 | 0 | 0 | (146,708) | <.25% |
| 11/07/2007 | 06/15/2025 | 2007 Series A BA | 5.000% | 7,950,000 | 06/15/2016 | 100.000% | YES | 1.925% | 153,034 | 0 | 0 | (153,034) | <.25% |
| 11/07/2007 | 06/15/2026 | 2007 Series A BA | 5.000% | 8,355,000 | 06/15/2016 | 100.000% | YES | 1.859% | 156,192 | 0 | 0 | (156,192) | <.25% |
| 11/07/2007 | 06/15/2027 | 2007 Series A BA | 5.000% | 8,770,000 | 06/15/2016 | 100.000% | YES | 1.833% | 160,783 | 0 | 0 | (160,783) | <.25% |
| 08/14/2001 | 03/01/2012 | Series 2001A DS EFA | 4.250% | 4,855,000 | 03/01/2011 | 100.000% | YES | 0.252% | 12,244 | 0 | 0 | (12,244) | <.25% |
| 08/14/2001 | 03/01/2013 | Series 2001A DS EFA | 4.400% | 4,855,000 | 03/01/2011 | 100.000% | YES | 0.539% | 26,189 | 0.698% | 33,871 | 7,682 | 3.663% |
| 08/14/2001 | 03/01/2014 | Series 2001A DS EFA | 4.500% | 4,855,000 | 03/01/2011 | 100.000% | YES | 0.667% | 32,366 | 1.247% | 60,540 | 28,175 | 9.035% |
| 08/14/2001 | 03/01/2015 | Series 2001A DS EFA | 5.000% | 4,855,000 | 03/01/2011 | 100.000% | YES | 1.865% | 90,528 | 2.997% | 145,497 | 54,969 | 6.810% |
| 08/14/2001 | 03/01/2016 | Series 2001A DS EFA | 5.000% | 4,855,000 | 03/01/2011 | 100.000% | YES | 2.201% | 106,866 | 3.247% | 157,638 | 50,772 | 5.562% |
| 12/05/2002 | 09/01/2013 | Series 2002A PL EFA | 4.000% | 2,335,000 | 09/01/2012 | 100.000% | YES | 0.086% | 2,011 | 0 | 0 | (2,011) | <.25% |
| 12/05/2002 | 09/01/2014 | Series 2002A PL EFA | 5.000% | 2,430,000 | 09/01/2012 | 100.000% | YES | 1.259% | 30,590 | 0.810% | 19,682 | (10,908) | -7.488% |
| 12/05/2002 | 09/01/2015 | Series 2002A PL EFA | 4.200% | 2,550,000 | 09/01/2012 | 100.000% | YES | 0.485% | 12,367 | 0 | 0 | (12,367) | <.25% |
| 12/05/2002 | 09/01/2016 | Series 2002A PL EFA | 5.500% | 2,655,000 | 09/01/2012 | 100.000% | YES | 3.407% | 90,459 | 2.918% | 77,476 | (12,983) | 2.664% |
| 12/05/2002 | 09/01/2017 | Series 2002A PL EFA | 5.500% | 2,800,000 | 09/01/2012 | 100.000% | YES | 3.687% | 103,234 | 3.079% | 86,222 | (17,011) | 3.092% |
| 12/05/2002 | 09/01/2018 | Series 2002A PL EFA | 5.500% | 2,955,000 | 09/01/2012 | 100.000% | YES | 4.143% | 122,428 | 2.970% | 87,750 | (34,678) | 5.682% |
| 12/05/2002 | 09/01/2019 | Series 2002A PL EFA | 5.500% | 3,120,000 | 09/01/2012 | 100.000% | YES | 4.526% | 141,211 | 2.584% | 80,610 | (60,601) | 9.472% |
| 12/05/2002 | 09/01/2020 | Series 2002A PL EFA | 5.000% | 3,290,000 | 09/01/2012 | 100.000% | YES | 1.416% | 46,602 | 0 | 0 | (46,602) | <.25% |
| 12/05/2002 | 09/01/2021 | Series 2002A PL EFA | 5.000% | 3,455,000 | 09/01/2012 | 100.000% | YES | 1.589% | 54,899 | 0 | 0 | (54,899) | <.25% |
| 12/05/2002 | 09/01/2022 | Series 2002A PL EFA | 5.000% | 3,630,000 | 09/01/2012 | 100.000% | YES | 1.640% | 59,523 | 0 | 0 | (59,523) | < 25% |
| 11/21/2002 | 09/01/2013 | Series 2002A Cl EFA | 3.750% | 750,000 | 09/01/2012 | 100.000% | YES | 0.087% | 653 | 0 | 0 | (653) | <.25% |

OPTION ROI

Option Value Monitor
Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 11/21/2002 | 09/01/2014 | Series 2002A Cl EFA | 4.000% | 1,500,000 | 09/01/2012 | 100.000% | YES | 0.279% | 4,192 | 0 | 0 | (4,192) | <-25% |
| 11/21/2002 | 09/01/2022 | Series 2002A Cl EFA | 4.750% | 1,640,000 | 09/01/2012 | 100.000% | YES | 1.134% | 18,592 | 0 | 0 | (18,592) | <-25% |
| 10/09/2003 | 03/01/2014 | Series 2003A DS EFA | 3.875% | 365,000 | 03/01/2013 | 100.000% | YES | 0.085% | 309 | 0 | 0 | (309) | <-25% |
| 10/09/2003 | 03/01/2015 | Series 2003A DS EFA | 4.000% | 365,000 | 03/01/2013 | 100.000% | YES | 0.091% | 332 | 0 | 0 | (332) | <-25% |
| 10/09/2003 | 03/01/2016 | Series 2003A DS EFA | 4.000% | 365,000 | 03/01/2013 | 100.000% | YES | 0.290% | 1,059 | 0 | 0 | (1,059) | <-25% |
| 10/09/2003 | 03/01/2017 | Series 2003A DS EFA | 4.100% | 360,000 | 03/01/2013 | 100.000% | YES | 0.613% | 2,207 | 0 | 0 | (2,207) | <-25% |
| 10/09/2003 | 03/01/2018 | Series 2003A DS EFA | 4.200% | 350,000 | 03/01/2013 | 100.000% | YES | 0.750% | 2,624 | 0 | 0 | (2,624) | <-25% |
| 04/14/2004 | 09/01/2015 | Series 2004A EFA | 5.000% | 3,905,000 | 09/01/2014 | 100.000% | YES | 0.776% | 30,287 | 0 | 0 | (30,287) | <-25% |
| 04/14/2004 | 09/01/2016 | Series 2004A EFA | 5.000% | 4,105,000 | 09/01/2014 | 100.000% | YES | 1.294% | 53,126 | 0 | 0 | (53,126) | <-25% |
| 04/14/2004 | 09/01/2017 | Series 2004A EFA | 5.000% | 4,315,000 | 09/01/2014 | 100.000% | YES | 1.826% | 78,805 | 0 | 0 | (78,805) | <-25% |
| 04/14/2004 | 09/01/2018 | Series 2004A EFA | 5.000% | 4,535,000 | 09/01/2014 | 100.000% | YES | 2.234% | 101,320 | 0 | 0 | (101,320) | <-25% |
| 04/14/2004 | 09/01/2019 | Series 2004A EFA | 5.000% | 4,770,000 | 09/01/2014 | 100.000% | YES | 2.539% | 121,129 | 0 | 0 | (121,129) | <-25% |
| 04/14/2004 | 09/01/2020 | Series 2004A EFA | 5.000% | 5,015,000 | 09/01/2014 | 100.000% | YES | 2.787% | 139,752 | 0 | 0 | (139,752) | <-25% |
| 08/10/2005 | 09/01/2016 | Series 2005A | 5.000% | 27,195,000 | 09/15/2015 | 100.000% | NO | 0.704% | 191,528 | 0 | 0 | (191,528) | <-25% |
| 08/10/2005 | 09/01/2017 | Series 2005A | 5.000% | 28,590,000 | 09/15/2015 | 100.000% | NO | 1.324% | 378,448 | 0 | 0 | (378,448) | <-25% |
| 08/10/2005 | 09/01/2018 | Series 2005A | 5.000% | 19,770,000 | 09/15/2015 | 100.000% | NO | 1.856% | 366,921 | 0 | 0 | (366,921) | <-25% |
| 08/10/2005 | 09/01/2019 | Series 2005A | 5.000% | 20,815,000 | 09/15/2015 | 100.000% | NO | 2.353% | 489,824 | 0 | 0 | (489,824) | <-25% |
| 10/26/2006 | 09/01/2017 | Series 2006A | 4.000% | 710,000 | 09/01/2016 | 100.000% | NO | 0.000% | - | 0 | 0 | - | <-25% |
| 10/26/2006 | 09/01/2018 | Series 2006A | 4.250% | 10,990,000 | 09/01/2016 | 100.000% | NO | 0.063% | 6,931 | 0 | 0 | (6,931) | <-25% |
| 10/26/2006 | 09/01/2019 | Series 2006A | 4.250% | 11,435,000 | 09/01/2016 | 100.000% | NO | 0.000% | - | 0 | 0 | - | <-25% |
| 10/26/2006 | 09/01/2020 | Series 2006A | 4.375% | 33,750,000 | 09/01/2016 | 100.000% | NO | 0.083% | 28,142 | 0 | 0 | (28,142) | <-25% |
| 10/26/2006 | 09/01/2021 | Series 2006A | 4.500% | 40,545,000 | 09/01/2016 | 100.000% | NO | 0.407% | 165,158 | 0 | 0 | (165,158) | <-25% |
| 10/26/2006 | 09/01/2022 | Series 2006A | 4.500% | 40,775,000 | 09/01/2016 | 100.000% | NO | 0.375% | 152,810 | 0 | 0 | (152,810) | <-25% |
| 10/26/2006 | 09/01/2023 | Series 2006A | 4.500% | 5,630,000 | 09/01/2016 | 100.000% | NO | 0.271% | 15,263 | 0 | 0 | (15,263) | <-25% |
| 10/26/2006 | 09/01/2024 | Series 2006A | 4.500% | 5,890,000 | 09/01/2016 | 100.000% | NO | 0.173% | 10,173 | 0 | 0 | (10,173) | <-25% |
| 03/25/2003 | 11/01/2017 | Series 2003A GSPT | 4.000% | 1,460,000 | 11/01/2013 | 100.000% | YES | 0.429% | 6,267 | 0 | 0 | (6,267) | <-25% |
| 03/25/2003 | 11/01/2018 | Series 2003A GSPT | 4.100% | 595,000 | 11/01/2013 | 100.000% | YES | 0.562% | 3,344 | 0 | 0 | (3,344) | <-25% |
| 03/25/2003 | 11/01/2021 | Series 2003A GSPT | 4.400% | 1,270,000 | 11/01/2013 | 100.000% | YES | 0.991% | 12,588 | 0 | 0 | (12,588) | <-25% |
| 12/01/2005 | 11/01/2016 | Series 2005A GSPI | 5.800% | 23,230,000 | 11/01/2015 | 100.000% | YES | 0.505% | 117,215 | 0 | 0 | (117,215) | <-25% |
| 12/01/2005 | 11/01/2017 | Series 2005A GSPI | 5.800% | 28,325,000 | 11/01/2015 | 100.000% | YES | 1.015% | 287,514 | 0.261% | 73,997 | (213,518) | -10.3533% |
| 12/01/2005 | 11/01/2018 | Series 2005A GSPI | 5.800% | 30,015,000 | 11/01/2015 | 100.000% | YES | 1.418% | 425,734 | 0.339% | 101,677 | (324,057) | -38.9333% |
| 12/01/2005 | 11/01/2019 | Series 2005A GSPI | 5.800% | 31,805,000 | 11/01/2015 | 100.000% | YES | 1.758% | 559,224 | 0.137% | 43,430 | (515,793) | <-25% |
| 12/01/2005 | 11/01/2020 | Series 2005A GSPI | 5.800% | 33,710,000 | 11/01/2015 | 100.000% | YES | 1.999% | 673,863 | 0 | 0 | (673,863) | <-25% |
| 12/01/2005 | 11/01/2021 | Series 2005A GSPI | 5.800% | 35,720,000 | 11/01/2015 | 100.000% | YES | 2.199% | 785,365 | 0 | 0 | (785,365) | <-25% |
| 12/01/2005 | 11/01/2022 | Series 2005A GSPI | 5.800% | 37,855,000 | 11/01/2015 | 100.000% | YES | 2.301% | 871,155 | 0 | 0 | (871,155) | <-25% |
| 12/01/2005 | 11/01/2023 | Series 2005A GSPI | 5.800% | 40,120,000 | 11/01/2015 | 100.000% | YES | 2.424% | 972,578 | 0 | 0 | (972,578) | <-25% |
| 12/30/1998 | 03/01/2012 | Series 1998A SEA | 5.250% | 2,820,000 | 03/01/2009 | 100.000% | PART | 2.153% | 60,705 | 6.113% | 172,392 | 111,687 | 11.045% |

OPTION ROI

Option Value Monitor
Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 12/30/1998 | 03/01/2013 | Series 1998A SEA | 5.250% | 2,960,000 | 03/01/2009 | 100.000% | PART | 2.562% | 75,849 | 7.466% | 220,979 | 145,130 | 11.323% |
| 12/30/1998 | 03/01/2014 | Series 1998A SEA | 5.250% | 4,925,000 | 03/01/2009 | 100.000% | PART | 2.636% | 129,803 | 8.431% | 415,217 | 285,415 | 12.343% |
| 12/30/1998 | 03/01/2015 | Series 1998A SEA | 5.250% | 5,185,000 | 03/01/2009 | 100.000% | PART | 3.088% | 160,137 | 9.043% | 468,836 | 308,749 | 11.378% |
| 12/30/1998 | 03/01/2018 | Series 1998A SEA | 4.750% | 6,080,000 | 03/01/2009 | 100.000% | PART | 1.723% | 104,755 | 5.588% | 339,763 | 235,008 | 12.495% |
| 12/30/1998 | 03/01/2019 | Series 1998A SEA | 4.500% | 6,370,000 | 03/01/2009 | 100.000% | PART | 1.860% | 118,478 | 2.799% | 178,320 | 59,842 | 4.256% |
| 12/30/1998 | 03/01/2020 | Series 1998A SEA | 4.500% | 6,680,000 | 03/01/2009 | 100.000% | PART | 2.082% | 138,422 | 1.637% | 108,844 | (29,578) | -2.461% |
| 12/30/1998 | 03/01/2021 | Series 1998A SEA | 4.500% | 8,805,000 | 03/01/2009 | 100.000% | PART | 2.082% | 183,279 | 0.542% | 47,762 | (135,517) | -12.065% |
| 12/30/1998 | 03/01/2022 | Series 1998A SEA | 4.500% | 4,270,000 | 03/01/2009 | 100.000% | PART | 2.082% | 88,881 | 0 | 0 | (88,881) | < -25% |
| 12/30/1998 | 03/01/2023 | Series 1998A SEA | 4.500% | 4,465,000 | 03/01/2009 | 100.000% | PART | 2.082% | 92,940 | 0 | 0 | (92,940) | < -25% |
| 12/30/1998 | 03/01/2024 | Series 1998A SEA | 4.500% | 4,655,000 | 03/01/2009 | 100.000% | PART | 2.082% | 97,103 | 0 | 0 | (97,103) | < -25% |
| 02/16/2000 | 03/01/2013 | Series 2000A SEA | 6.000% | 3,025,000 | 03/01/2010 | 100.000% | YES | 1.147% | 34,706 | 6.688% | 202,313 | 167,607 | 21.636% |
| 02/16/2000 | 03/01/2014 | Series 2000A SEA | 6.000% | 1,510,000 | 03/01/2010 | 100.000% | YES | 1.353% | 20,436 | 8.310% | 125,479 | 105,043 | 22.308% |
| 02/16/2000 | 03/01/2015 | Series 2000A SEA | 6.000% | 2,485,000 | 03/01/2010 | 100.000% | YES | 1.372% | 34,102 | 9.530% | 236,819 | 202,717 | 23.905% |
| 02/16/2000 | 03/01/2016 | Series 2000A SEA | 5.750% | 2,650,000 | 03/01/2010 | 100.000% | YES | 0.731% | 19,366 | 9.242% | 244,913 | 225,547 | 31.758% |
| 02/16/2000 | 03/01/2017 | Series 2000A SEA | 5.750% | 2,825,000 | 03/01/2010 | 100.000% | YES | 0.861% | 24,313 | 9.725% | 274,744 | 250,431 | 30.284% |
| 02/16/2000 | 03/01/2018 | Series 2000A SEA | 5.750% | 2,950,000 | 03/01/2010 | 100.000% | YES | 0.883% | 26,133 | 9.841% | 291,286 | 265,153 | 30.105% |
| 02/16/2000 | 03/01/2019 | Series 2000A SEA | 5.500% | 3,135,000 | 03/01/2010 | 100.000% | YES | 1.109% | 34,779 | 7.932% | 248,674 | 213,895 | 24.285% |
| 02/16/2000 | 03/01/2020 | Series 2000A SEA | 5.500% | 3,310,000 | 03/01/2010 | 100.000% | YES | 1.133% | 37,519 | 7.341% | 243,313 | 205,794 | 23.016% |
| 12/03/2003 | 09/01/2014 | Series 2003A SEA | 5.000% | 500,000 | 09/01/2013 | 100.000% | NO | 0.848% | 4,241 | 0.084% | 418 | (3,823) | 0.111% |
| 12/03/2003 | 09/01/2015 | Series 2003A SEA | 5.250% | 1,445,000 | 09/01/2013 | 100.000% | NO | 1.762% | 25,459 | 0.843% | 12,189 | (13,271) | -14.821% |
| 12/03/2003 | 09/01/2016 | Series 2003A SEA | 4.000% | 1,515,000 | 09/01/2013 | 100.000% | NO | 0.195% | 2,962 | 0 | 0 | (2,962) | < -25% |
| 12/03/2003 | 09/01/2017 | Series 2003A SEA | 4.000% | 1,575,000 | 09/01/2013 | 100.000% | NO | 0.308% | 4,864 | 0 | 0 | (4,844) | < -25% |
| 12/03/2003 | 09/01/2018 | Series 2003A SEA | 4.125% | 1,645,000 | 09/01/2013 | 100.000% | NO | 0.430% | 7,066 | 0 | 0 | (7,066) | < -25% |
| 12/03/2003 | 09/01/2019 | Series 2003A SEA | 4.500% | 1,715,000 | 09/01/2013 | 100.000% | NO | 1.143% | 19,601 | 0 | 0 | (19,601) | < -25% |
| 12/03/2003 | 09/01/2020 | Series 2003A SEA | 4.500% | 1,795,000 | 09/01/2013 | 100.000% | NO | 1.143% | 20,516 | 0 | 0 | (20,516) | < -25% |
| 12/03/2003 | 09/01/2021 | Series 2003A SEA | 4.500% | 1,875,000 | 09/01/2013 | 100.000% | NO | 1.143% | 21,430 | 0 | 0 | (21,430) | < -25% |
| 12/03/2003 | 09/01/2022 | Series 2003A SEA | 4.500% | 1,960,000 | 09/01/2013 | 100.000% | NO | 1.143% | 22,402 | 0 | 0 | (22,402) | < -25% |
| 12/03/2003 | 09/01/2023 | Series 2003A SEA | 4.500% | 2,055,000 | 09/01/2013 | 100.000% | NO | 1.143% | 23,487 | 0 | 0 | (23,487) | < -25% |
| 12/03/2003 | 09/01/2014 | Series 2003A SEA | 3.750% | 880,000 | 09/01/2013 | 100.000% | NO | 0.087% | 763 | 0 | 0 | (763) | < -25% |
| 12/20/2005 | 03/01/2017 | Series 2005A SEA | 5.000% | 2,005,000 | 03/01/2016 | 100.000% | YES | 0.535% | 10,732 | 0 | 0 | (10,732) | < -25% |
| 12/20/2005 | 03/01/2018 | Series 2005A SEA | 4.000% | 2,105,000 | 03/01/2016 | 100.000% | YES | 0.000% | | 0 | 0 | 0 | 0 |
| 12/20/2005 | 03/01/2019 | Series 2005A SEA | 4.000% | 2,190,000 | 03/01/2016 | 100.000% | YES | 0.000% | | 0 | 0 | 0 | 0 |
| 12/20/2005 | 03/01/2020 | Series 2005A SEA | 4.200% | 2,280,000 | 03/01/2016 | 100.000% | YES | 0.000% | | 0 | 0 | 0 | 0 |
| 12/20/2005 | 03/01/2021 | Series 2005A SEA | 4.250% | 2,375,000 | 03/01/2016 | 100.000% | YES | 0.108% | 2,569 | 0 | 0 | (2,569) | < -25% |
| 12/20/2005 | 03/01/2022 | Series 2005A SEA | 4.250% | 2,475,000 | 03/01/2016 | 100.000% | YES | 0.224% | 5,549 | 0 | 0 | (5,549) | < -25% |
| 12/20/2005 | 03/01/2023 | Series 2005A SEA | 4.375% | 2,580,000 | 03/01/2016 | 100.000% | YES | 0.351% | 9,064 | 0 | 0 | (9,064) | < -25% |
| 12/20/2005 | 03/01/2024 | Series 2005A SEA | 4.375% | 2,695,000 | 03/01/2016 | 100.000% | YES | 0.483% | 13,020 | 0 | 0 | (13,020) | < -25% |
| 12/20/2005 | 03/01/2025 | Series 2005A SEA | 5.000% | 2,810,000 | 03/01/2016 | 100.000% | YES | 3.151% | 88,531 | 0 | 0 | (88,531) | < -25% |
| 12/20/2005 | 03/01/2026 | Series 2005A SEA | 5.000% | 2,950,000 | 03/01/2016 | 100.000% | YES | 3.420% | 100,896 | 0 | 0 | (100,896) | < -25% |
| 04/27/2007 | 03/01/2018 | Series 2007A SEA | 4.000% | 1,295,000 | 03/01/2017 | 100.000% | YES | 0.000% | | | 0 | 0 | 0 |
| 04/27/2007 | 03/01/2019 | Series 2007A SEA | 4.000% | 1,350,000 | 03/01/2017 | 100.000% | YES | 0.000% | | | 0 | 0 | 0 |
| 04/27/2007 | 03/01/2020 | Series 2007A SEA | 4.000% | 1,400,000 | 03/01/2017 | 100.000% | YES | 0.000% | | | 0 | 0 | 0 |

FIG. 8L

OPTION ROI

Option Value Monitor
Option Value by Maturity

| Delivery Date | Maturity Date | Series | Coupon | Principal | Next Call Date | Next Call Price | Advance Refundable | Option Price at Issue (%) | Option Price at Issue ($) | Option Exercise Value Currently (%) | Option Exercise Value Currently ($) | Gain / (Loss) | IRR |
|---|---|---|---|---|---|---|---|---|---|---|---|---|---|
| 04/27/2007 | 03/01/2021 | Series 2007A SEA | 4.000% | 1,455,000 | 03/01/2017 | 100.000% | YES | 0.000% | - | 0 | 0 | 0 | 0 |
| 04/27/2007 | 03/01/2022 | Series 2007A SEA | 4.000% | 1,515,000 | 03/01/2017 | 100.000% | YES | 0.000% | - | 0 | 0 | 0 | 0 |
| 04/27/2007 | 03/01/2023 | Series 2007A SEA | 4.250% | 1,575,000 | 03/01/2017 | 100.000% | YES | 0.000% | - | 0 | 0 | 0 | 0 |
| 04/27/2007 | 03/01/2024 | Series 2007A SEA | 4.250% | 1,645,000 | 03/01/2017 | 100.000% | YES | 0.000% | - | 0 | 0 | 0 | 0 |
| 09/11/2008 | 09/01/2019 | Series 2008B SEA | 4.000% | 13,895,000 | 09/01/2018 | 100.000% | NO | 0.086% | 11,971 | 0 | 0 | (11,971) | <-25% |
| 09/11/2008 | 09/01/2020 | Series 2008B SEA | 4.250% | 3,525,000 | 09/01/2018 | 100.000% | NO | 0.184% | 6,482 | 0 | 0 | (6,482) | <-25% |
| 09/11/2008 | 09/01/2021 | Series 2008B SEA | 4.250% | 8,845,000 | 09/01/2018 | 100.000% | NO | 0.192% | 17,024 | 0 | 0 | (17,024) | <-25% |
| 09/11/2008 | 09/01/2022 | Series 2008B SEA | 4.500% | 8,870,000 | 09/01/2018 | 100.000% | NO | 0.306% | 27,154 | 0 | 0 | (27,154) | <-25% |
| 09/11/2008 | 09/01/2023 | Series 2008B SEA | 4.500% | 8,885,000 | 09/01/2018 | 100.000% | NO | 0.319% | 28,329 | 0 | 0 | (28,329) | <-25% |
| 09/11/2008 | 09/01/2024 | Series 2008B SEA | 4.500% | 29,810,000 | 09/01/2018 | 100.000% | NO | 0.441% | 131,393 | 0 | 0 | (131,393) | <-25% |
| | | | | | | | | Total | 12,491,742 | | 5,355,281 | | |

| Series | Maturity | Coupon | Par Amount | Call Date | Call Price | Option Price at Issue (%) | Option Price at Issue ($) | Option Exercise Value Currently (%) | Option Exercise Value Currently ($) | Gain / (Loss) | ROI |
|---|---|---|---|---|---|---|---|---|---|---|---|
| 2003 Series C | 06/15/2018 | 4.375% | 1,345,000 | 06/15/2013 | 100.00 | 0.758% | 10,201 | 9.604% | 129,175 | 118,974 | 23.56% |
| Input | Input | Input | Input | Input | Input | Output | Output | Output | Output | Output | Output |

| Series | Maturity | Coupon | Par Amount | Call Date | Call Price | Refunding Yield | Refunding Escrow Yield | Refunding Coupon | Refunding Call Date | PV Savings $ |
|---|---|---|---|---|---|---|---|---|---|---|
| 2003 Series C | 06/15/2018 | 4.375% | 1,345,000 | 06/15/2013 | 100.00 | 1.84% | 0.180% | 5.00% | 6/15/2018 | 129,175 |
| Input | Input | Input | Input | Input | Input | Input | Input | Input | Input | UDF |

| Original Callable Yield | Sale Date | Years | MMD | NC MMD | Original NC Difference |
|---|---|---|---|---|---|
| 4.420% | 7/31/2003 | 15.00 | 4.46% | 4.39% | -0.07% |
| Input | Input | =ROUND(DAYS360(Sale Date,Maturity Date)/360,0) | Database Lookup | Database Lookup | =MMD- NC MMD |

| Calculated NC Yield | Original Price | Calculated NC Price | Option Price at Issue |
|---|---|---|---|
| 4.35% | 99.51 | 100.27 | 0.758 |
| = Original NC Difference + Original Yield | MS Excel Price Function | MS Excel Price Function | =Calculated NC Price - Original Price |

| Option Price at Issue (%) | Option Price at Issue ($) | Option Exercise Value Currently (%) | Option Exercise Value Currently ($) | Gain / (Loss) | ROI |
|---|---|---|---|---|---|
| 0.758% | 10,201 | 9.604% | 129,175 | 118,974 | 23.56% |
| = Option Price at Issue / 100 | = Option Price at Issue * Par Amount | = PV Savings / Par Amount | = PV Savings | = Option Value Currently - Option Price at Issue | UDF |

METHODS AND SYSTEMS FOR ANALYSIS, TRACKING AND MODIFICATIONS OF CALL OPTIONS ON DEBT ISSUANCES

RELATED APPLICATIONS

This application claims the priority of provisional application Ser. No. 61/497,277, filed Jun. 15, 2011, entitled "METHODS AND SYSTEMS FOR ANALYSIS, TRACKING, AND MODIFICATIONS OF CALL OPTIONS ON MUNICIPAL BONDS," which is incorporated herein by reference in its entirety for all purposes.

TECHNICAL FIELD

In some embodiments, the instant invention relates to methods and systems for purchasing call options on debt issuances. In some embodiments, the instant invention relates to computer methods and computer systems for the purchase of call options on municipal bonds.

BACKGROUND

Debt issuance call options are generally not "free"; they have a quantifiable cost separate and apart from the dollar price cost of the underlying bond being issued. Differently structured options have different costs, and different options have different likelihoods of being exercised over their life; as such, differently structured options can serve different purposes for issuers. These options can be consciously purchased, used and structured by issuers to achieve specific purposes.

SUMMARY OF INVENTION

In one embodiment, the present invention is a computer-implemented method that includes receiving on a computer system, a price of a debt issuance, wherein the price of the debt issuance includes a cost for purchase of an embedded call option.

In an embodiment, the present invention further includes calculating on a computer system, an actual cost of the purchase of the embedded call option; and comparing on a computer system, the cost calculation of the call option to a rule based system of an alternative option type and a corresponding cost of the alternative option type.

In an embodiment, the present invention further includes determining on a computer system, based on the comparing step, the type of option to be embedded with the debt issuance.

In some embodiments, the alternate option type includes at least one of a call option, a swaption, an interest rate option, a currency option, a commodity option, and a yield curve option. In some embodiments, the debt issuance is a municipal bond.

In other embodiments, the rule based system further includes a structure of the alternate option type and a corresponding cost of the structure of the option type.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIG. 1 illustrates certain features of some embodiments of the present invention.

FIGS. 2a-2k illustrate certain features of some further embodiments of the present invention.

FIGS. 3a-3b illustrate certain features of some further embodiments of the present invention.

FIGS. 4a-4b illustrate certain features of some further embodiments of the present invention.

FIGS. 5a-5b illustrates certain features of some further embodiments of the present invention.

FIG. 6 illustrates certain features of some further embodiments of the present invention.

FIGS. 7a-7f illustrate certain features of some further embodiments of the present invention.

FIGS. 8a-8m illustrate yet certain features of some further embodiments of the present invention.

FIG. 9 illustrates yet certain features of some further embodiments of the present invention.

Figure 2A:
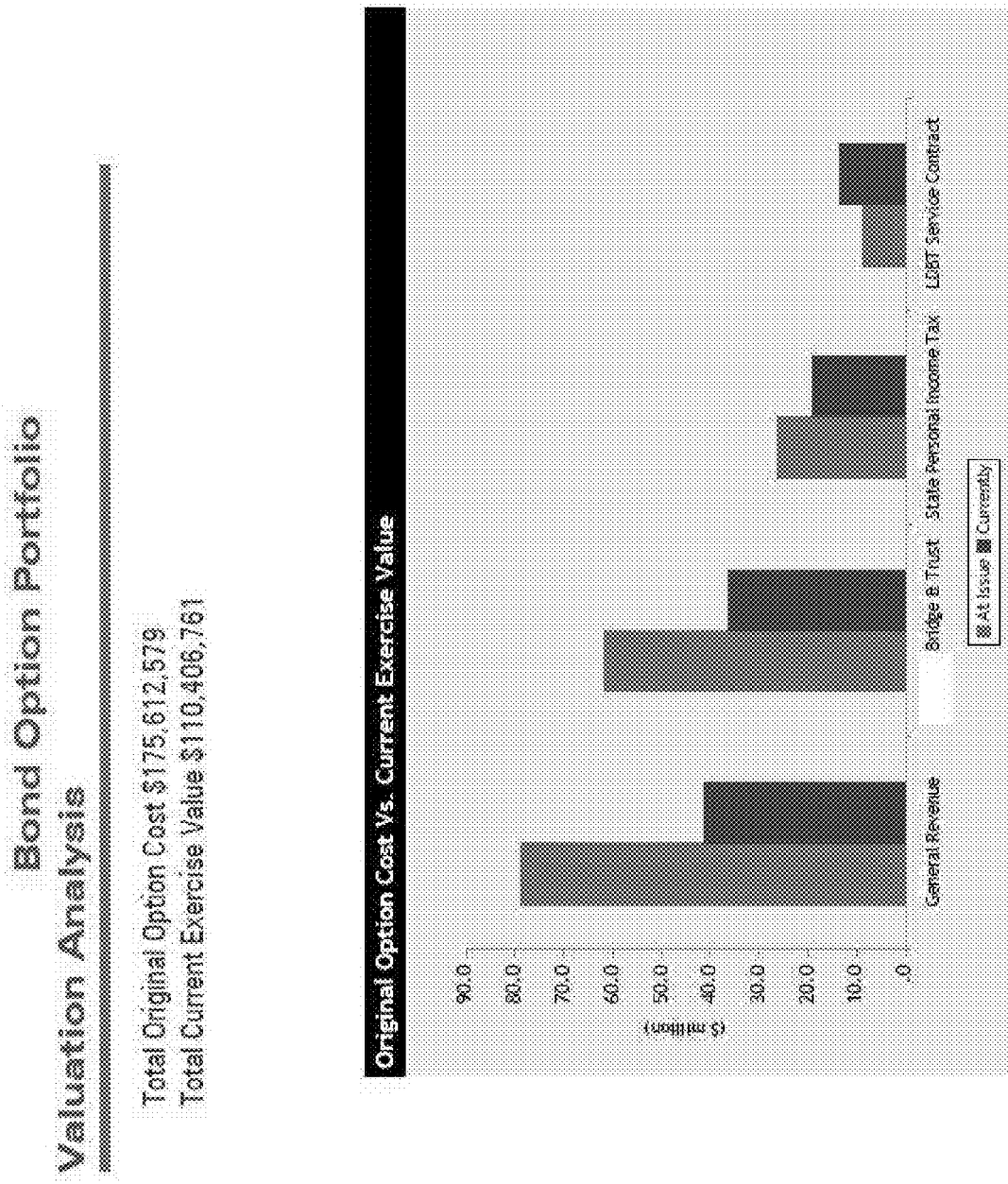

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, the term "municipal bond" as used herein refers to a negotiable certificate that acknowledges the indebtedness of the bond issuer to the holder issued by a city or other local government, or their agencies.

In some embodiments, the term "call option" as used herein refers to a financial contract between two parties, the buyer and the seller. The buyer of the call option has the right, but not the obligation to buy an agreed quantity of a particular commodity or financial instrument from the seller of the call option at a certain time for a certain price.

In some embodiments, the term "hedging position" as used herein refers to an investment position intended to offset potential losses that may be incurred by a companion investment.

In some embodiments, the term "callable bonds" as used herein refers to a type of bond that allows the issuer of the bond to retain the privilege of redeeming the bond at some point before the bond reaches its date of maturity.

In some embodiments, the term "year par call" as used herein refers to the date at which an issuer can redeem part or all of a security prior to maturity.

In some embodiments, the term "swaptions" as used herein refers to an option granting its owner the right but not the obligation to enter into an underlying swap. In some embodiments, the term "swap" as used herein refers to a derivative in which counterparties exchange cash flows of one party's financial instrument for those of the other party's financial instrument.

In some embodiments, the term "make-whole call" as used herein refers to a type of call provision on a bond allowing the borrower to pay off remaining debt early.

In some embodiments, the term "noncallable" as used herein refers to a financial security that cannot be redeemed early by the issuer.

In some embodiments, the term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. In some embodiments, the term "data" as used to represent pre-determined information in one physical non-transient form shall be deemed to encompass any and all representations of corresponding information in a different physical form or forms.

In some embodiments, the term "presentation data" as used herein means data to be presented to a person in any perceptible form, including but not limited to, visual form and aural form. Examples of presentation data include data displayed on a visual presentation device, such as a PDA, a smart phone, a monitor, and data printed on paper.

In some embodiments, the term "presentation device" as used herein means a device or devices capable of presenting data to a person in any perceptible form.

In some embodiments, the term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a list or in any other suitable form.

In some embodiments, the term "image dataset" as used herein means a database suitable for use as presentation data or for use in producing presentation data.

In some embodiments, the term "auxiliary image feature" as used herein means one or more of the color, brightness, shading, shape or texture of an image.

In some embodiments, the term "network" as used herein includes both networks and internetworks of all kinds, including the Internet, and is not limited to any particular network or inter-network. For example, "network" includes those that are implemented using wired links, wireless links or any combination of wired and wireless links.

In some embodiments, the terms "first", "second", "primary" and "secondary" are used to distinguish one element, set, data, object, step, process, activity or thing from another, and are not used to designate relative position or arrangement in time, unless otherwise stated explicitly.

In some embodiments, the terms "coupled", "coupled to", "coupled with," "connected", and "connected with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communication relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

In some embodiments, the terms "communicate," "communicating" and "communication" as used herein include both conveying data from a source to a destination, and delivering data to a communication medium, system, channel, network, device, wire, cable, fiber, circuit and/or link to be conveyed to a destination. The term "communications" as used herein includes one or more of a communication medium, system, channel, network, device, wire, cable, fiber, circuit and link.

In some embodiments, the term "processor" as used herein means processing devices, apparatus, programs, circuits, components, systems and subsystems, whether implemented in hardware, software or both, and whether or not programmable. In some embodiments, the term "processor" as used herein includes, but is not limited to one or more computers, hardwired circuits, neural networks, signal modifying devices and systems, devices and machines for controlling systems, central processing units, programmable devices and systems, field programmable gate arrays, application specific integrated circuits, systems on a chip, systems comprised of discrete elements and/or circuits, state machines, virtual machines, data processors, processing facilities and combinations of any of the foregoing.

In some embodiments, the term "data processing system" as used herein means a system implemented at least in part by hardware and comprising a data input device, a data output device and a processor coupled with the data input device to receive data therefrom and coupled with the output device to provide processed data thereto.

In some embodiments, the terms "obtain", "obtained" and "obtaining", as used with respect to a processor or data processing system mean (a) producing data by processing data, (b) retrieving data from storage, or (c) requesting and receiving data from a further data processing system.

In some embodiments, the terms "storage" and "data storage" as used herein mean one or more data storage devices, apparatus, programs, circuits, components, systems, subsystems, locations and storage media serving to retain data, whether on a temporary or permanent basis, and to provide such retained data.

The present invention relates to debt issuances that include, but are not limited to, municipal bonds. Any reference to municipal or municipal bond is not limiting and may include other types of debt issuances. A municipal issuer's purchase of a call option on a debt issuance has a discrete, quantifiable cost. In one embodiment, a municipal bond issuer can incorporate an option purchase analysis element into its debt policy to help focus awareness on the cost and appropriate usage of call options. In one embodiment, elements of such a policy are described below.

Call Option Purchase Decisions

Debt issuance call options are generally not "free"; they have a quantifiable cost separate and apart from the dollar price cost of the underlying bond being issued. Differently structured options have different costs, and different options have different likelihoods of being exercised over their life; as such, differently structured options can serve different purposes for issuers and may be consciously purchased, used and structured by issuers to achieve specific purposes. In some embodiments, a municipal issuer can consider establishing a discrete component of its debt policy that sets forth its reasons or purposes for purchasing options in conjunction with its bond offerings in the new issue marketplace, and seek to define the type and/or characteristics of such option that best suits its purposes as well as the option cost it is willing to pay to achieve such goals. In some embodiments, although an issuer might execute its option strategies in conjunction with its debt issuance new issuances, it can develop an option management strategy and framework that is maintained independently of its bond offering activities.

In one embodiment, non-limiting, recommended rule based system for developing a strategic option management framework are described in the following paragraphs.

Rule Based System

Issuers may view their option purchases on a standalone basis and evaluate their overall optionality portfolio on a standalone basis;

Issuers may attempt to look at their combined overall liability (debt) and asset (investment) portfolio characteristics when making optionality purchase decisions on the debt/bond side of the balance sheet;

Issuers may seek to use option purchases as a tool in an overall strategy to "immunize" their overall combined asset/liability portfolio against changes in market interest rates. In another embodiment, an issuer can use option purchases as a tool for managing the impact that various econometric measures or economic activity are expected to have on the issuer's overall revenues or asset/liability portfolio and structure option purchases in a manner to generate offsetting benefits/risks accordingly;

Although new issue structuring and optionality purchases are closely tied elements of a debt issuance offering, an issuer may seek to the best extent possible to undertake an independent decision-making process with respect to option purchases at time of a bond offering, and may seek to make conscious and deliberate decisions regarding option purchases in conjunction with its bond offering process; and/or Issuers may implement the rule based system to determine what portfolio management purposes or goals are being satisfied with the purchase of an option and whether the price and structure of the option being purchased meet the identified goals.

Market-Specific Guidelines

In some embodiments, when an issuer has established its rule based system for option management, the issuer can determine the type, structure and cost of the options available in the marketplace at time of marketing its debt issuances and make its option purchase decisions in a manner consistent with the non-limiting, recommended General Guidelines identified above. In some embodiments, specific steps involved in this process may include one or more of the following:

Determine the specific reason/goals for purchasing the option consistent with its rule based system. In some embodiments, these rule based system may include, but are not limited to, the following:

Creation of Hedging Positions—Determine whether or how the purchase of the option satisfies the hedging need of the issuer consistent with General Guideline #3 from above;

Creation of Value Positions—Confirm that the issuer believes that the price of the option represents a significant value (intrinsic or otherwise) at the time of purchase. In this case the issuer should also determine that the expenditures of capital budget moneys to purchase such "value" positions is consistent with the issuer's overall debt management or capital expenditure policies; and/or Conformance With Market Realities—Determine that call options may realistically be purchased during periods where the municipal new issue market strongly prefers to purchase callable bonds at time of issuance, or that there is a significantly deeper or wider market for callable bonds, and/or that the issuer is unable to sell non-callable debt in the size, structure and maturities it is seeking to market bonds. The municipal new issue marketplace may include limitations on the amount and structure of noncallable debt that can be issued at reasonable prices and/or on the amount and structure of "unconventional" options (i.e. short call or par-coupon call options) that can be purchased at cost effective prices.

Seek ways to modify/tailor option structures (i.e. an 8 year par call versus a 10 year par call) so as to enhance the value of the option relative to its portfolio management goals from above and/or take advantage of relative value opportunities.

Compare the market-based cost of the call option with conventional hypothetical option valuation methodologies such as binomial tree to compare hypothetical option cost with actual option cost.

Develop the ability/methodology to use swaptions and other types of interest rate option products that are more actively and transparently traded as tools for assessing the value and relative value of the bond options being considered for purchase and/or as proxies or purchase alternatives to call options purchased in the municipal bond new issue market.

Seek ways to incorporate other types options (i.e. currency, commodity, and yield curve options, etc.) into its bond option component if these types of options are consistent with the issuer's General Guidelines and can be incorporated in a cost effective manner Additionally, in some embodiments, an issuer can evaluate at option purchases by issuers across its entire portfolio (i.e. by the Massachusetts Water Pollution Abatement Trust (MW-PAT) and the Massachusetts School Building Authority (MSBA) in addition to General Obligation (GO)), and seek to opportunistically manage its option portfolio and purchases on a holistic portfolio-wide basis in the most cost effective possible overall manner.

In one embodiment, strategic considerations for analyzing the cost of a call option include, but is not limited to, consideration of the cost of call option versus non-call or make-whole call; evaluation whether paying for interest rate optionality (versus at-market redemption option) is a necessary "capital" expenditure; and consideration of the purchase of the call in cash market with a resale and gain in.

The table shown in FIG. 1 is a non-limiting example of the call option cost analysis described above.

In one embodiment, a non-limiting example valuation analysis is shown in FIGS. 2A and 2B and the tables shown in FIGS. 2C to 2K. Another, non-limiting example of evaluating an option value is shown on FIG. 3A and the table shown on FIG. 3B. The table on FIG. 3B shows the internal rate of return (IRR) of the option purchase. Yet another non-limiting example of evaluating an option value is shown on FIG. 4A and table shown on FIG. 4B. The table on FIG. 4B shows the IRR of the option purchase.

Figure 5B:
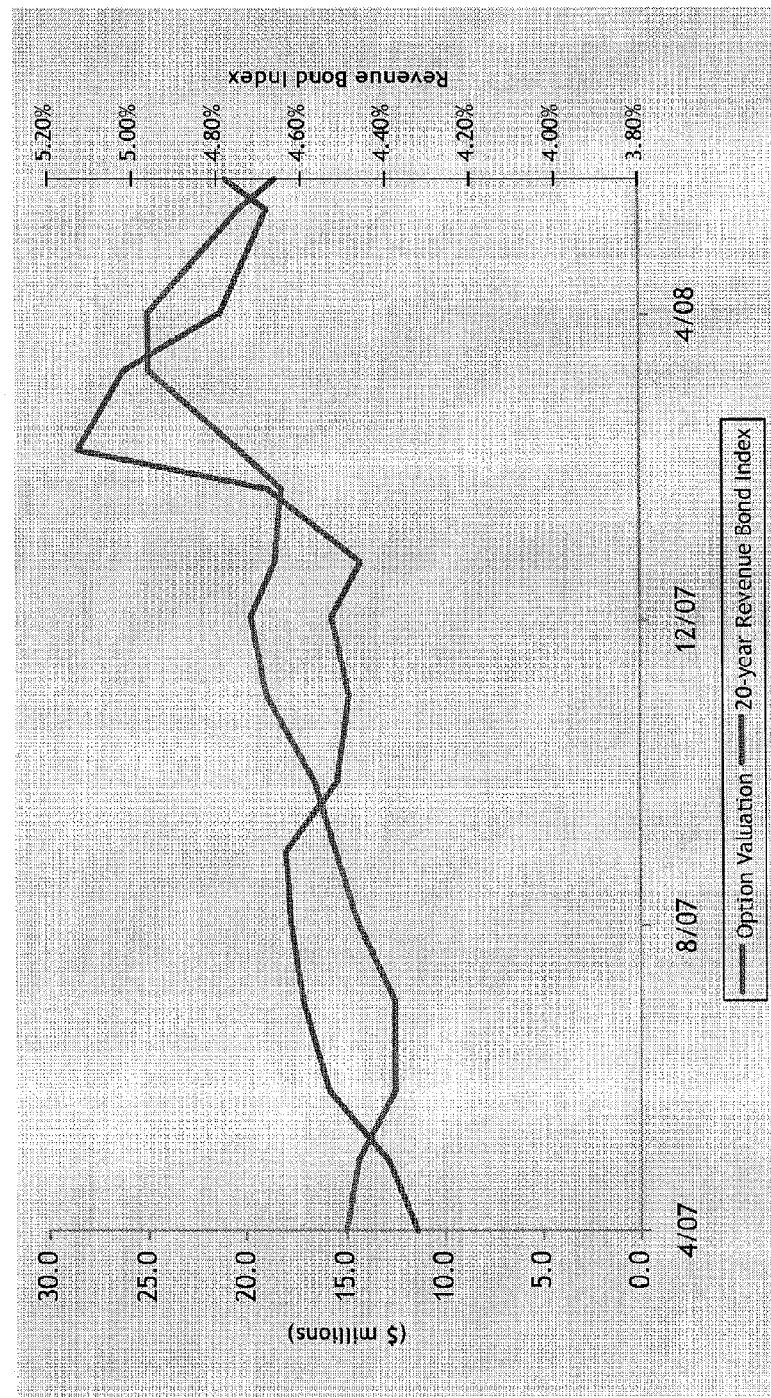
Figure 7E:
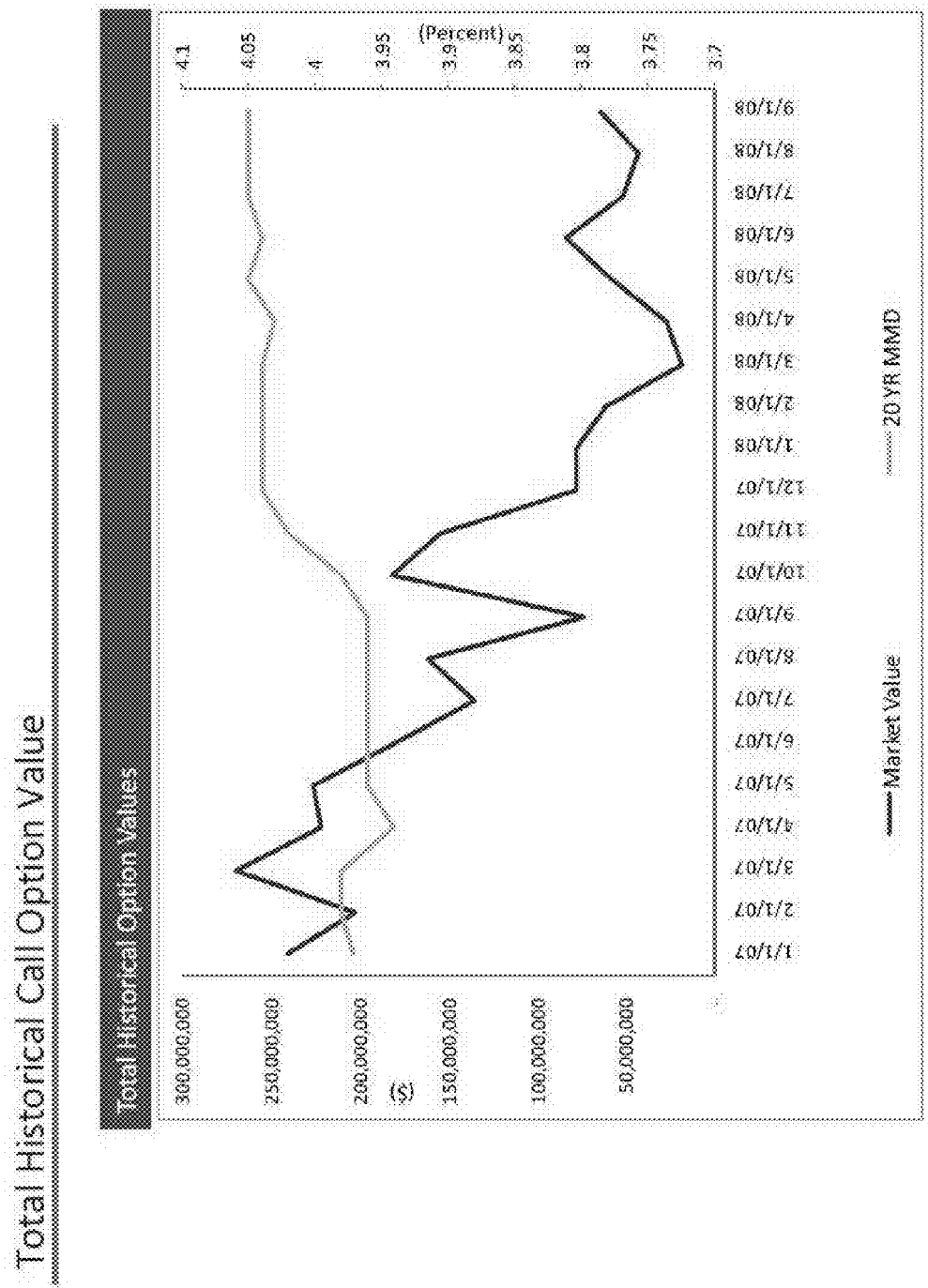
Figure 7F:
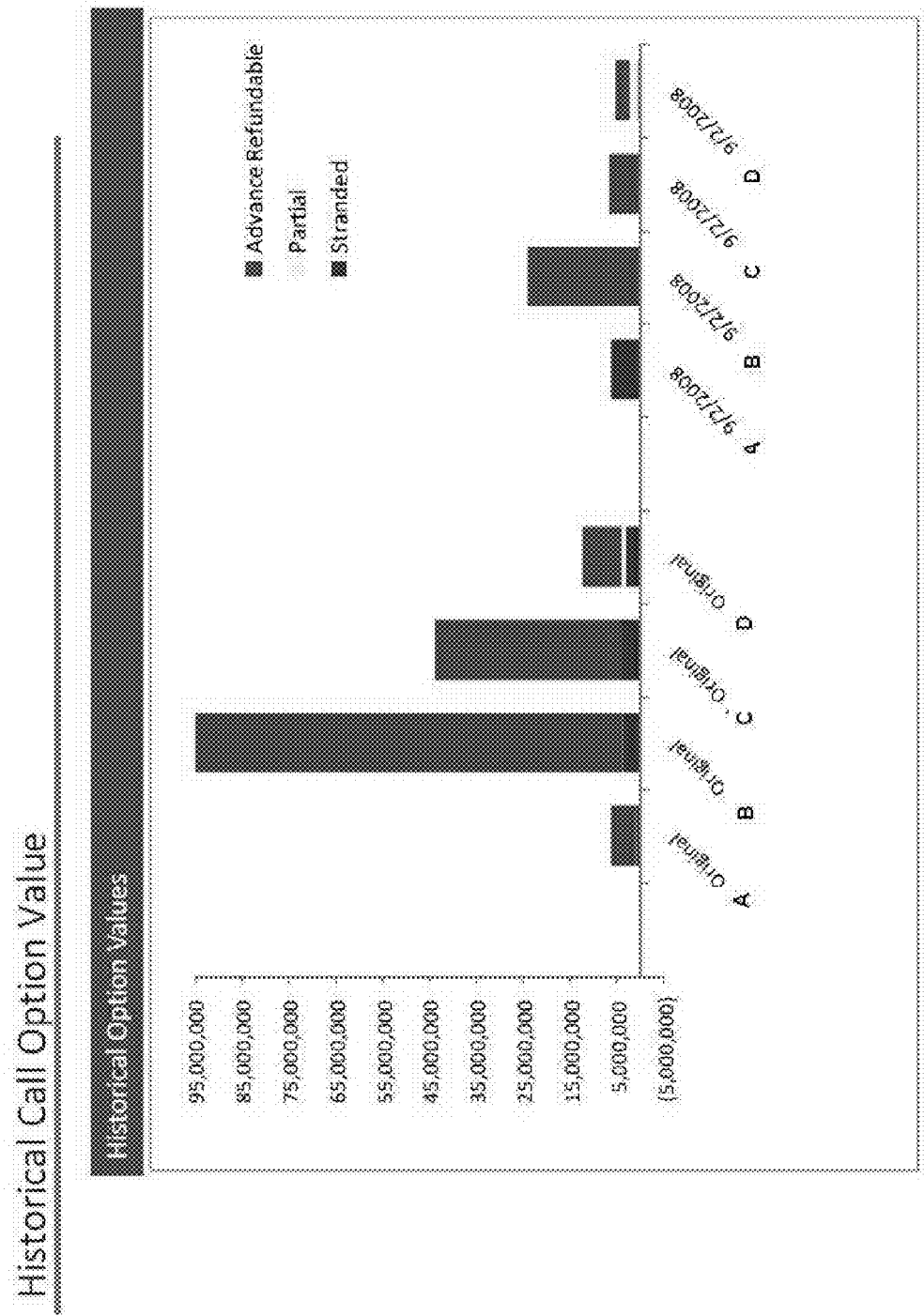

In yet another, non-limiting example, a synthetic call option product that uses derivative applications may be used to simulate the economics of callable bonds. Historically, bond transactions have been structured to include the purchase of call options. Call options are "embedded" into the bond structure, effectively purchased directly from the bond investor, and are instrumental in allowing the issuer to take advantage of changes in future interest rate markets. Synthetic call options are designed to incorporate derivative applications. In an embodiment, the comparison between the synthetic call option product and the conventional bond market is shown in FIG. 5A. As shown in the figure, a conventional fixed rate bond call Jul. 1, 2018 at 100% corresponds to a the purchase of an embedded sell option which is economically equivalent to the purchase of a swap option to receive fixed and pay floating. Also shown in the figure is non-callable fixed rate bond and swaption purchase which corresponds with the purchase of a swaption to receive fixed and pay floating. FIG. 5B shows the historical call option valuation for a Series 2007 Term Bond 1.

In some embodiments, the synthetic call option position may be controlled independently of bond position. In some embodiments, the synthetic call option can be "exercised" at any time by selling in the open market. In an embodiment, the synthetic call option position can be liquidated at any time at market without restrictions and thus does not require implementation of a cumbersome advance refunding to unlock option savings.

In some embodiments, the synthetic call option position provides an ability to customize couponing, term, size and exercise date. In other embodiments, the synthetic call option may be structured as an "at the money" option versus the more expensive "in the money" option position found on embedded bond option. In an embodiment, the Issuer risks less capital in purchasing its option position. In some embodiments, the bonds may have a make-whole call for preservation of an restructuring option.

In yet another embodiment, the option position may be controlled independently of bond position. In an embodiment, the synthetic call option can be "exercised" at any time by selling in the open market. In an embodiment, the option position can be liquidated at any time at market without restrictions. In some embodiments, this option provides the ability to customize couponing, term, size and exercise date. In some embodiments, the option position may be structured as an "at the money" option versus the more expensive "in the money" option position found on embedded bond option. In some embodiments, the issuer risks less capital in purchasing its option position. In some embodiments, the bonds can have make-whole call for preservation of restructuring option.

Bond call options are frequently purchased by municipal bond issuers with only minimal analysis of the independent cost of the embedded option. The issuer generally evaluates only the aggregate price for the bond and the embedded option combined. In one embodiment, the independent cost of the option can be separately calculated by valuing the price of the bond with the call option stripped off (i.e. a non callable bond) and comparing this price with the price paid by the investor for the callable bond with the embedded option. In one embodiment, a system that includes, but is not limited to, calculation of the prices paid by issuers over time for their call option purchases. In an embodiment, the system also includes calculation and monitoring of the "market value" of the option positions over time. "Market value" is measured as the present value savings from a hypothetical refunding of the underlying bond with non callable debt. When an issuer undertakes a refunding with non callable bonds, it is effectively "re-selling" this option in the market. In an embodiment, municipal issuers may compare this "realized value" of option sales upon a refunding to a benchmark sale hurdle price (i.e. 3% savings). In some embodiments, the system creates an additional metric for gauging the viability both of owning options and re-selling options by calculating and monitoring the Return on Investment ("ROI") of option purchases and re-sale.

In a non-limiting example, two recent advance refunding transactions (the 2006B and the 2006C Refundings) have been analyzed to determine the ROI of the option investments. In the example, certain assumptions for the refunding calculations to arrive at present value savings per maturity have been incorporated. The tables shown in FIG. 6 show the initial price paid for the options and compares that price with the value realized for the option upon refunding.

In the non-limiting example shown in the tables shown in FIG. 6 and described above, although the 2006B refunding produced present value savings close to or in excess of 3%, there were several maturities of the 2005C where ROI's were marginal or negative due to the high initial cost of the option. In some embodiments, option values and IRRs may be closely monitored for market opportunities such as the 2006C refunding produced and as a check on a conventional one dimensional present value savings refunding test. In some embodiments, short term gains after 30-40 basis point (bps) market changes that produce high IRR's may be considered for refundings. In other embodiments, the overall options strategy and policy may be guided potentially based on the answers to one or more of the following questions:

Are there alternative methods of achieving redemption flexibility other than purchasing interest rate optionality (i.e. make-whole calls)?;

Is the purchase of interest rate optionality an effective or appropriate usage of capital program funds?;

If a systematic purchase of interest rate option positions is the goal, should the issuer adopt a rule based system?

What are the alternative methods for purchasing interest rate optionality and are those methods more suitable?

As stated above, bond call options are frequently purchased by municipal bond issuers with minimal analysis of the independent cost of the embedded option. The issuer generally evaluates only the aggregate price for the bond and the embedded option combined. In one embodiment, the independent cost of the option can be separately calculated by valuing the price of the bond with the call option stripped off (i.e. a non callable bond) and comparing this price with the price paid by the investor for the callable bond with the embedded option. In one embodiment, a system that includes, but is not limited to, calculation of the prices paid by issuers over time for their call option purchases. In an embodiment, the system also includes calculation and monitoring of the "market value" of the option positions over time. "Market value" is measured as the present value savings from a hypothetical refunding of the underlying bond with non callable debt. When an issuer undertakes a refunding with non callable bonds, it is effectively "re-selling" this option in the market. In an embodiment, municipal issuers may compare this "realized value" of option sales upon a refunding to a benchmark sale hurdle price (i.e. 3% savings). In some embodiments, the system creates an additional metric for gauging the viability both of owning options and re-selling options by calculating and monitoring the Return on Investment ("ROI") of option purchases and re-sale.

In a non-limiting example, the value of historical call options has been analyzed. The results of the analysis is shown on FIGS. 7A-7F. Option values and IRRs may be monitored closely for market opportunities. Short term gains after 30 to 40 bps market changes that produce high IRR's may be considered for refundings. Similar to the example above, the overall options strategy and policy may be guided potentially based on the answers to one or more of the following questions:

Are there alternative methods of achieving redemption flexibility other than purchasing interest rate optionality (i.e. make-whole calls)?;

Is the purchase of interest rate optionality an effective or appropriate usage of capital program funds?;

If a systematic purchase of interest rate option positions is the goal, should the issuer adopt a rule based system?

What are the alternative methods for purchasing interest rate optionality and are those methods more suitable?

In other non-limiting examples, evaluations of the ROIs associated with various Series options are shown in the tables shown in FIGS. 8A-8M.

In non-limiting examples of the present invention, the rule based system is exemplified. Specifically, examples of the underlying ROI calculations associated with the present invention are provided. These non-limiting examples include a description of the process of an embodiment of the present invention. Data include with these example is presented in the tables shown in FIG. 9.

In an example, each refunding candidate includes a series description, the maturity date of the associated bonds, the coupon rate, the par amount, the call date and the call price. Based on the information and additional information from one or more remote databases, the data results are calculated which may include, but is not limited to the Option Price at Issue, the Option Value currently, the gain/losses between these two values and the ROI. For the ROI, an interest rate is calculated that discounts the Option Exercise Value Currently to the Option Price at Issue at the time of issuance. In this example, the interest rate is calculated based on a user-defined function to be used in a spreadsheet program such as MS Excel® or equivalent. In this example, the calculation iterates until the correct rate is calculated.

In this example, the Option Value Currently is first calculated. The value is calculated as the net present value savings of refunding the refunding candidate today. Based on the user inputs, the present invention incorporates the current market yield for new refunding bonds, the escrow reinvestment rate, the coupon for the new refunding bonds, and the call date or final maturity for the refunding bonds. In this example, from these inputs and based on an initial description of the bonds, the net present value refunding savings can be calculated via a user-defined function to be used in a spreadsheet program such as MS Excel®. The first half of the gain/loss calculation is completed based on this calculation.

For the second half of the gain/loss calculation, the historical index information and pricing information related to the candidates is evaluated. From the inputs, the number of 30/360 years between the Sale Date and the Maturity Date of bonds is calculated. Based on the number of years calculated, the equivalent Municipal Market Data (MMD) index rate for that maturity and its Non-Callable MMD index rate for that day are used to calculate the difference in yield prevailing in the market that day for issuance of non-callable bonds compared with callable bonds. Alternate index rates other than the MMD index rate may be used. In some embodiments, the index rates will be based on an internal database of historical market prices.

In this example, based on the original yield input and the Original NC Difference, the Calculated NC Yield can be calculated. With both the original yield and the Calculated NC Yield, the Original Price and the Calculated NC Price can be calculated based on, for example, the PRICE function in a spreadsheet program such as MS Excel®. By subtracting the Original Price from the Calculated NC Price, the Option Price at Issue can be calculated. The example shown on FIG. 9 is based on a $100 bond.

Next, the Option Price at Issue can be subtracted from the Option Price Currently to calculate the Gain/(Loss). In some embodiments, if either the Option Price at Issue or the Option Value Currently is less than zero, the model will replace these values with zero. The MS Excel® or equivalent User-Defined Function may then calculate the rate required to discount the Option Exercise Value Currently (as of today) to the Option Price at Issue (as of the delivery date of the bonds). This value is the rate of return on investment for going long municipal bond call option.

By looking back to market conditions from the sale date of refunding candidates and calculating an original option price based on the differential between the callable and non-callable MMD curves, the original call option price can then be calculated. Based on the original option price, the percentage return on investment for the candidate can then be calculated.

The User-Defined Functions referenced above are discussed in further detail below:

Non-limiting example of User-Defined Function 1: ROI( )—this function has three inputs: PresentCashflow, FutureCashflow and Periods. The function may begin with an initial guess of an interest rate 50% then calculates the future value (named GuessResult1) based on the initial rate assumption and number of periods. The function then performs this calculation again with a second guess of an interest rate of 100% for a future value identified as GuessResult2. With both GuessResult1 and GuessResult2, the model uses the following formula to calculate a third guess: Guess3=Guess2+(Guess1−Guess2)/(GuessResult1−GuessResult2)*(TargetValue−GuessResult2). The Target Value is the FutureValue input. This process continues until the "guess" is, within a degree of accuracy, correct. Additional information related to an example of the User-Defined Function 1 is shown below.

Function ROI (PresentCashflow As Double, FutureCashFlow As Double, Periods As Integer)
    Application.Volatile
    Dim Guess1 As Double
    Dim Guess2 As Double
    Dim Guess3 As Double
    Dim Guess4 As Double
    Dim Guess5 As Double

```
Dim Guess6 As Double
Dim Guess7 As Double
Dim Guess8 As Double
Dim Guess9 As Double
Dim Guess10 As Double
Dim Guess11 As Double
Dim Guess12 As Double
Dim Guess13 As Double
Dim Guess14 As Double
Dim Guess15 As Double
Dim Guess16 As Double
Dim Guess17 As Double
Dim Guess18 As Double
Dim Guess19 As Double
Dim Guess20 As Double
Dim Guess21 As Double
Dim Guess22 As Double
Dim Guess23 As Double
Dim Guess24 As Double
Dim Guess25 As Double
Dim Guess26 As Double
Dim Guess27 As Double
Dim Guess28 As Double
Dim Guess29 As Double
Dim Guess30 As Double
Dim Guess31 As Double
Dim Guess32 As Double
Dim Guess33 As Double
Dim Guess34 As Double
Dim Guess35 As Double
Dim Guess36 As Double
Dim Guess37 As Double
Dim GuessResult1 As Double
Dim GuessResult2 As Double
Dim GuessResult3 As Double
Dim GuessResult4 As Double
Dim GuessResult5 As Double
Dim GuessResult6 As Double
Dim GuessResult7 As Double
Dim GuessResult8 As Double
Dim GuessResult9 As Double
Dim GuessResult10 As Double
Dim GuessResult11 As Double
Dim GuessResult12 As Double
Dim GuessResult13 As Double
Dim GuessResult14 As Double
Dim GuessResult15 As Double
Dim GuessResult16 As Double
Dim GuessResult17 As Double
Dim GuessResult18 As Double
Dim GuessResult19 As Double
Dim GuessResult20 As Double
Dim GuessResult21 As Double
Dim GuessResult22 As Double
Dim GuessResult23 As Double
Dim GuessResult24 As Double
Dim GuessResult25 As Double
Dim GuessResult26 As Double
Dim GuessResult27 As Double
Dim GuessResult28 As Double
Dim GuessResult29 As Double
Dim GuessResult30 As Double
Dim GuessResult31 As Double
Dim GuessResult32 As Double
Dim GuessResult33 As Double
Dim GuessResult34 As Double
Dim GuessResult35 As Double
Dim GuessResult36 As Double
Dim GuessResult37 As Double
Dim CashPayment As Double
Dim Column As Long
Dim Target As Double
Dim Yield As Double
Dim TargetValue As Double
TargetValue=FutureCashFlow
CashPayment=PresentCashflow
Yield=0
Guess1=0
Guess2=0
Guess3=0
Guess4=0
Guess5=0
Guess6=0
Guess7=0
Guess8=0
Guess9=0
Guess10=0
Guess11=0
Guess12=0
Guess13=0
Guess14=0
Guess15=0
Guess16=0
Guess17=0
Guess18=0
Guess19=0
Guess20=0
Guess21=0
Guess22=0
Guess23=0
Guess24=0
Guess25=0
Guess26=0
Guess27=0
Guess28=0
Guess29=0
Guess30=0
Guess31=0
Guess32=0
Guess33=0
Guess34=0
Guess35=0
GuessResult1=0
GuessResult2=0
GuessResult3=0
GuessResult4=0
GuessResult5=0
GuessResult6=0
GuessResult7=0
GuessResult8=0
GuessResult9=0
GuessResult10=0
GuessResult11=0
GuessResult12=0
GuessResult13=0
GuessResult14=0
GuessResult15=0
GuessResult16=0
GuessResult17=0
GuessResult18=0
GuessResult19=0
GuessResult20=0
GuessResult21=0
GuessResult22=0
```

```
GuessResult23=0
GuessResult24=0
GuessResult25=0
GuessResult26=0
GuessResult27=0
GuessResult28=0
GuessResult29=0
GuessResult30=0
GuessResult31=0
GuessResult32=0
GuessResult33=0
GuessResult34=0
On Error Resume Next
'Run 1st and Second Guesses
'Load Values
Guess1=0.5
'Calculate Present Values
GuessResult1=(CashPayment*((1+Guess1/2)^ Periods))
'Load Values
Guess2=1
'Calculate Present Values
GuessResult2=(CashPayment*((1+Guess2/2)^ Periods))
'Iterations
Guess3=Guess2+(Guess1-Guess2)/(GuessResult1-
    GuessResult2)*(TargetValue-GuessResult2)
GuessResult3=(CashPayment*((1+Guess3/2) ^ Periods))
If Guess3=Guess2 Then
    Yield=Guess3
    ROI=Yield
    Exit Function
Else
    Guess4=Guess3+(Guess2-Guess3)/(GuessResult2-
        GuessResult3)*(TargetValue-GuessResult3)
    'Calculate Present Values
    GuessResult4=(CashPayment*((1+Guess4/2)^ Periods))
End If
If Abs(GuessResult4-TargetValue)<0.001 Then
    Yield=Guess4
    ROI=Yield
    Exit Function
Else
    Guess5=Guess4+(Guess3-Guess4)/(GuessResult3-
        GuessResult4)*(TargetValue-GuessResult4)
    GuessResult5=(CashPayment*((1+Guess5/2)^ Periods))
End If
If Abs(GuessResult5-TargetValue)<0.001 Then
    Yield=Guess5
    ROI=Yield
    Exit Function
Else
    Guess6=Guess5+(Guess4-Guess5)/(GuessResult4-
        GuessResult5)*(TargetValue-GuessResult5)
    GuessResult6=(CashPayment*((1+Guess6/2) ^ Periods))
End If
If Abs(GuessResult6-TargetValue)<0.001 Then
    Yield=Guess6
    ROI=Yield
    Exit Function
Else
    Guess7=Guess6+(Guess5-Guess6)/(GuessResult5-
        GuessResult6)*(TargetValue-GuessResult6)
    GuessResult7=(CashPayment*((1+Guess7/2)^ Periods))
End If
If Abs(GuessResult7-TargetValue)<0.001 Then
    Yield=Guess7
    ROI=Yield
    Exit Function
Else
    Guess8=Guess7+(Guess6-Guess7)/(GuessResult6-
        GuessResult7)*(TargetValue-GuessResult7)
    GuessResult8=(CashPayment*((1+Guess8/2)^ Periods))
End If
If Abs(GuessResult8-TargetValue)<0.001 Then
    Yield=Guess8
    ROI=Yield
    Exit Function
Else
    Guess9=Guess8+(Guess7-Guess8)/(GuessResult7-
        GuessResult8)*(TargetValue-GuessResult8)
    GuessResult9=(CashPayment*((1+Guess9/2)^ Periods))
End If
If Abs(GuessResult9-TargetValue)<0.001 Then
    Yield=Guess9
    ROI=Yield
    Exit Function
Else
    Guess10=Guess9+(Guess8-Guess9)/(GuessResult8-
        GuessResult9)*(TargetValue-GuessResult9)
    GuessResult10=(CashPayment*((1+Guess 10/2) ^ Periods))
End If
If Abs(GuessResult10-TargetValue)<0.001 Then
    Yield=Guess10
    ROI=Yield
    Exit Function
Else
    Guess1=Guess10+(Guess9-Guess10)/(GuessResult9-
        GuessResult10)*(TargetValue-GuessResult10)
    GuessResult11=(CashPayment*((1+Guess 11/2)^ Periods))
End If
If Abs(GuessResult11-TargetValue)<0.001 Then
    Yield=Guess11
    ROI=Yield
    Exit Function
Else
    Guess12=Guess11+(Guess10-Guess11)/(GuessResult10-GuessResult11)*(TargetValue-GuessResult10)
    GuessResult12=(CashPayment*((1+Guess 12/2)^Periods))
End If
If Abs(GuessResult12-TargetValue)<0.001 Then
    Yield=Guess12
    ROI=Yield
    Exit Function
Else
    Guess13=Guess12+(Guess11-Guess12)/(GuessResult11-GuessResult12)*(TargetValue-GuessResult11)
    GuessResult13=(CashPayment*((1+Guess 13/2)^Periods))
End If
```

```
If Abs(GuessResult13-TargetValue)<0.001 Then
    Yield=Guess13
    ROI=Yield
    Exit Function
Else
    Guess14=Guess13+(Guess12-Guess13)/(GuessResult12-GuessResult13)*(TargetValue-GuessResult12)
    GuessResult14=(CashPayment*((1+Guess 14/2)^Periods))
End If
If Abs(GuessResult14-TargetValue)<0.001 Then
    Yield=Guess14
    ROI=Yield
    Exit Function
Else
    Guess15=Guess14+(Guess13-Guess14)/(GuessResult13-GuessResult14)*(TargetValue-GuessResult13)
    GuessResult15=(CashPayment*((1+Guess15/2)^Periods))
End If
If Abs(GuessResult15-TargetValue)<0.001 Then
    Yield=Guess15
    ROI=Yield
    Exit Function
Else
    Guess16=Guess15+(Guess14-Guess15)/(GuessResult14-GuessResult15)*(TargetValue-GuessResult14)
    GuessResult16=(CashPayment*((1+Guess 16/2)^Periods))
End If
If Abs(GuessResult16-TargetValue)<0.001 Then
    Yield=Guess16
    ROI=Yield
    Exit Function
Else
    Guess17=Guess16+(Guess15-Guess16)/(GuessResult15-GuessResult16)*(TargetValue-GuessResult15)
    GuessResult17=(CashPayment*((1+Guess 17/2)^Periods))
End If
If Abs(GuessResult17-TargetValue)<0.001 Then
    Yield=Guess17
    ROI=Yield
    Exit Function
Else
    Guess18=Guess17+(Guess16-Guess17)/(GuessResult16-GuessResult17)*(TargetValue-GuessResult16)
    GuessResult18=(CashPayment*((1+Guess18/2)^Periods))
End If
If Abs(GuessResult18-TargetValue)<0.001 Then
    Yield=Guess18
    ROI=Yield
    Exit Function
Else
    Guess19=Guess18+(Guess17-Guess18)/(GuessResult17-GuessResult18)*(TargetValue-GuessResult17)
    GuessResult19=(CashPayment*((1+Guess19/2)^Periods))
End If
If Abs(GuessResult19-TargetValue)<0.001 Then
    Yield=Guess19
    ROI=Yield
    Exit Function
Else
    Guess20=Guess19+(Guess18-Guess19)/(GuessResult18-GuessResult19)*(TargetValue-GuessResult18)
    GuessResult20=(CashPayment*((1+Guess20/2)^Periods))
End If
If Abs(GuessResult20-TargetValue)<0.001 Then
    Yield=Guess20
    ROI=Yield
    Exit Function
Else
    Guess21=Guess20+(Guess19-Guess20)/(GuessResult19-GuessResult20)*(TargetValue-GuessResult19)
    GuessResult21=(CashPayment*((1+Guess21/2)^Periods))
End If
If Abs(GuessResult21-TargetValue)<0.001 Then
    Yield=Guess21
    ROI=Yield
    Exit Function
Else
    Guess22=Guess21+(Guess20-Guess21)/(GuessResult20-GuessResult21)*(TargetValue-GuessResult20)
    GuessResult22=(CashPayment*((1+Guess22/2)^Periods))
End If
If Abs(GuessResult22-TargetValue)<0.01 Then
    Yield=Guess22
    ROI=Yield
    Exit Function
Else
    Guess23=Guess22+(Guess21-Guess22)/(GuessResult21-GuessResult22)*(TargetValue-GuessResult21)
    GuessResult23=(CashPayment*((1+Guess23/2)^Periods))
End If
If Abs(GuessResult23-TargetValue)<0.001 Then
    Yield=Guess23
    ROI=Yield
    Exit Function
Else
    Guess24=Guess23+(Guess22-Guess23)/(GuessResult22-GuessResult23)*(TargetValue-GuessResult22)
    GuessResult24=(CashPayment*((1+Guess24/2)^Periods))
End If
If Abs(GuessResult24-TargetValue)<0.001 Then
    Yield=Guess24
    ROI=Yield
    Exit Function
Else
    Guess25=Guess24+(Guess23-Guess24)/(GuessResult23-GuessResult24)*(TargetValue-GuessResult23)
    GuessResult25=(CashPayment*((1+Guess25/2)^Periods))
End If
```

```
If Abs(GuessResult25-TargetValue)<0.001 Then
    Yield=Guess25
    ROI=Yield
    Exit Function
Else
    Guess26=Guess25+(Guess24-Guess25)/(GuessRe-
        sult24-GuessResult25)*(TargetValue-GuessRe-
        sult24)
    GuessResult26=(CashPayment*((1+Guess26/2) ^ Peri-
        ods))
End If
If Abs(GuessResult26-TargetValue)<0.001 Then
    Yield=Guess26
    ROI=Yield
    Exit Function
Else
    Guess27=Guess26+(Guess25-Guess26)/(GuessRe-
        sult25-GuessResult26)*(TargetValue-GuessRe-
        sult25)
    GuessResult27=(CashPayment*((1+Guess27/2) ^ Peri-
        ods))
End If
If Abs(GuessResult27-TargetValue)<0.001 Then
    Yield=Guess27
    ROI=Yield
    Exit Function
Else
    Guess28=Guess27+(Guess26-Guess27)/(GuessRe-
        sult26-GuessResult27)*(TargetValue-GuessRe-
        sult26)
    GuessResult28=(CashPayment*((1+Guess28/2) ^ Peri-
        ods))
End If
If Abs(GuessResult28-TargetValue)<0.001 Then
    Yield=Guess28
    ROI=Yield
    Exit Function
Else
    Guess29=Guess28+(Guess27-Guess28)/(GuessRe-
        sult27-GuessResult28)*(TargetValue-GuessRe-
        sult27)
    GuessResult29=(CashPayment*((1+Guess29/2) ^ Peri-
        ods))
End If
If Abs(GuessResult29-TargetValue)<5000 Then
    Yield=Guess29
    ROI=Yield
    Exit Function
Else
    Guess30=Guess29+(Guess28-Guess29)/(GuessRe-
        sult28-GuessResult29)*(TargetValue-GuessRe-
        sult28)
    GuessResult30=(CashPayment*((1+Guess30/2) ^ Peri-
        ods))
End If
If Abs(GuessResult30-TargetValue)<5000 Then
    Yield=Guess30
    ROI=Yield
    Exit Function
Else
    Guess31=Guess30+(Guess29-Guess30)/(GuessRe-
        sult29-GuessResult30)*(TargetValue-GuessRe-
        sult29)
    GuessResult31=(CashPayment*((1+Guess31/2) ^ Peri-
        ods))
End If
If Abs(GuessResult31-TargetValue)<5000 Then
    Yield=Guess31
    ROI=Yield
    Exit Function
Else
    Guess32=Guess31+(Guess30-Guess31)/(GuessRe-
        sult30-GuessResult31)*(TargetValue-GuessRe-
        sult30)
    GuessResult32=(CashPayment*((1+Guess32/2) ^ Peri-
        ods))
End If
If Abs(GuessResult32-TargetValue)<5000 Then
    Yield=Guess32
    ROI=Yield
    Exit Function
Else
    Guess33=Guess32+(Guess31-Guess32)/(GuessRe-
        sult31-GuessResult32)*(TargetValue-GuessRe-
        sult31)
    GuessResult33=(CashPayment*((1+Guess33/2) ^ Peri-
        ods))
End If
If Abs(GuessResult33-TargetValue)<5000 Then
    Yield=Guess33
    ROI=Yield
    Exit Function
Else
    Guess34=Guess33+(Guess32-Guess33)/(GuessRe-
        sult32-GuessResult33)*(TargetValue-GuessRe-
        sult32)
    GuessResult34=(CashPayment*((1+Guess34/2) ^ Peri-
        ods))
End If
If Abs(GuessResult34-TargetValue)<5000 Then
    Yield=Guess34
    ROI=Yield
    Exit Function
Else
    Yield=">-120.0%"
    ROI=Yield
    Exit Function
End If
On Error GoTo 0
End Function
```

Non-limiting example of User-Defined Function 2: SavingsByMat( )—This function may include up to twelve inputs: Settlement Date, Maturity Date, Call Date, Call Price, Par Amount, Coupon, Cost of Issuance, Refunding Yield, Refunding Coupon, Escrow Yield, Refunding Call Date and Refunding Last Maturity. Based on the Settlement Date, Call Date, Coupon and Escrow Yield, the function creates an escrow requirement table to calculate the necessary escrow deposit. Using the Settlement Date, Maturity Date and Coupon a refunded debt service schedule is then created. Then based on the cost of issuance input and the necessary escrow deposit along with the Refunding Yield, Refunding Coupon, Refunding Call Date and Refunding Last Maturity, the refunding bonds are sized. Once the refunding bonds are sized, the new refunding debt service schedule is calculated which is then compared with the refunded debt service schedule. These two schedules are then netted from each other and present valued to the settlement date for the present value savings. Additional information related to an example of the User-Defined Function 2 is shown below.

Public Function SavingsByMat(Settlement As Date, Maturity As Date, CallDate As Date, Coupon As Double, CallPrice As Double, ParAmount As Double, EscrowYield

```
As Double, CostofIssuance As Double, RefundingYield As
    Double, RefundingCoupon As Double, RefundingCallDate
    As Date, RefundingLastMaturity As Date)
    Dim Table( ) As Variant
    Dim Table2( ) As Variant
    Dim EscrowTable( ) As Variant
    Dim NPeriods As Integer
    Dim NPeriods2 As Integer
    Dim EscrowNPeriods As Integer
    Dim FirstDate As Date
    Dim FirstDate2 As Date
    Dim CurrentDate As Date
    Dim CurrentDate2 As Date
    Dim EscrowCurrentDate As Date
    Dim EscrowCost As Double
    Dim COI As Double
    Dim ProceedsNeeded As Double
    Dim RefundingBondPrice As Double
    Dim RefundingPar As Double
    Dim PVOld As Double
    Dim PVNew As Double
    RefundingLastMaturity=Application.WorksheetFunc-
        tion.Min(DateSerial(Year(Maturity), Month(Refundin-
        gLastMaturity),   Day(RefundingLastMaturity)),
        RefundingLastMaturity)
    'Determine Number of Periods
    If    Application.WorksheetFunction.EDate(DateSerial
        (Year(Settlement), Month(Maturity), Day(Maturity)),
        −6)<Settlement Then
        If DateSerial(Year(Settlement), Month(Maturity), Day
            (Maturity))<Settlement Then
            If Application.WorksheetFunction.EDate(DateSerial
                (Year(Settlement), Month(Maturity), Day(Matu-
                rity)), 6)<Settlement Then
                FirstDate=Application.WorksheetFunction.EDate
                    (DateSerial(Year(Settlement),    Month(Matu-
                    rity), Day(Maturity)), 12)
            Else
                FirstDate=Application.WorksheetFunction.EDate
                    (DateSerial(Year(Settlement),    Month(Matu-
                    rity), Day(Maturity)), 6)
            End If
        Else
            FirstDate=DateSerial(Year(Settlement), Month(Ma-
                turity), Day(Maturity))
        End If
    Else
        FirstDate=Application.WorksheetFunction.EDate(Da-
            teSerial(Year(Settlement), Month(Maturity), Day
            (Maturity)), −6)
    End If
    NPeriods=1
    CurrentDate=FirstDate
    Do Until CurrentDate=Maturity
        NPeriods=NPeriods+1
        CurrentDate=Application.WorksheetFunction.EDate
            (CurrentDate, 6)
    Loop
    'Determine Number of Periods
    If    Application.WorksheetFunction.EDate(DateSerial
        (Year(Settlement),    Month(RefundingLastMaturity),
        Day(RefundingLastMaturity)), −6)<Settlement Then
        If DateSerial(Year(Settlement), Month(RefundingLast-
            Maturity),   Day(RefundingLastMaturity))<Settle-
            ment Then
            If Application.WorksheetFunction.EDate(DateSerial
                (Year(Settlement),    Month(RefundingLastMatu-
                rity), Day(RefundingLastMaturity)), 6)<Settle-
                ment Then
                FirstDate2=Application.WorksheetFunction.
                    EDate(DateSerial(Year(Settlement),    Month
                    (RefundingLastMaturity), Day(RefundingLast-
                    Maturity)), 12)
            Else
                FirstDate2=Application.WorksheetFunction.
                    EDate(DateSerial(Year(Settlement),    Month
                    (RefundingLastMaturity), Day(RefundingLast-
                    Maturity)), 6)
            End If
        Else
            FirstDate2=DateSerial(Year(Settlement), Month(Re-
                fundingLastMaturity),  Day(RefundingLastMatu-
                rity))
        End If
    Else
        FirstDate2=Application.WorksheetFunction.EDate
            (DateSerial(Year(Settlement),    Month(Refundin-
            gLastMaturity), Day(RefundingLastMaturity)), −6)
    End If
    NPeriods2=1
    CurrentDate2=FirstDate2
    Do Until CurrentDate2=RefundingLastMaturity
        NPeriods2=NPeriods2+1
        CurrentDate2=Application.WorksheetFunction.EDate
            (CurrentDate2, 6)
    Loop
    If RefundingLastMaturity>RefundingCallDate Then
        If RefundingCoupon>RefundingYield Then
            RefundingBondPrice=Application.WorksheetFunc-
                tion.Price(Settlement, RefundingCallDate, Refund-
                ingCoupon, RefundingYield, 100, 2)
        ElseIf RefundingCoupon=RefundingYield Then
            RefundingBondPrice=100
        Else
            RefundingBondPrice=Application.WorksheetFunc-
                tion.Price(Settlement,    RefundingLastMaturity,
                RefundingCoupon, RefundingYield, 100, 2)
        End If
    Else
        RefundingBondPrice=Application.WorksheetFunc-
            tion.Price(Settlement,    RefundingLastMaturity,
            RefundingCoupon, RefundingYield, 100, 2)
    End If
    If CallDate<FirstDate Then
        EscrowCost=(((Application.WorksheetFunction.
            Days360(Application.WorksheetFunction.EDate
            (FirstDate,    −6),    CallDate)/180)*(ParAmount*
            Coupon/2))+(ParAmount*CallPrice/100))/(1+Es-
            crowYield)
    Else
        EscrowNPeriods=1
        EscrowCurrentDate=FirstDate
        Do Until EscrowCurrentDate=CallDate
            EscrowNPeriods=EscrowNPeriods+1
            EscrowCurrentDate=Application.WorksheetFunc-
                tion.EDate(EscrowCurrentDate, 6)
        Loop
        ReDim EscrowTable(1 To EscrowNPeriods+1, 1 To 6)
        For X=1 To UBound(EscrowTable)
            If X=1 Then
                EscrowTable(X, 1)=Settlement
```

```
        ElseIf X=2 Then
            EscrowTable(X, 1)=FirstDate
        Else
            EscrowTable(X, 1)=Application.WorksheetFunc-
                tion.EDate(EscrowTable(X-1, 1), 6)
        End If
    Next X
    For X=1 To UBound(EscrowTable)
        EscrowTable(X, 2)=Application.WorksheetFunc-
            tion.Days360(EscrowTable(1, 1), EscrowTable(X,
            1))/180
    Next X
    For X=2 To UBound(EscrowTable)
        If X=(EscrowNPeriods+1) Then
            EscrowTable(X, 3)=ParAmount
        Else
            EscrowTable(X, 3)=0
        End If
    Next X
    For X=2 To UBound(EscrowTable)
        EscrowTable(X, 4)=ParAmount*Coupon/2
    Next X
    For X=2 To UBound(EscrowTable)
        If X=(EscrowNPeriods+1) Then
            EscrowTable(X, 5)=EscrowTable(X, 3)+Es-
                crowTable(X, 4)+(ParAmount*((CallPrice/
                100)-1))
        Else
            EscrowTable(X, 5)=EscrowTable(X, 3)+Es-
                crowTable(X, 4)
        End If
    Next X
    For X=2 To UBound(EscrowTable)
        EscrowTable(X, 6)=EscrowTable(X, 5)*((1+(Es-
            crowYield/2))^-EscrowTable(X, 2))
    Next X
    For X=2 To UBound(EscrowTable)
        EscrowCost=EscrowCost+EscrowTable(X, 6)
    Next X
End If
COI=((EscrowCost/(RefundingBondPrice/100))/(1-
    CostofIssuance))-(EscrowCost/(RefundingBondPrice/
    100))
ProceedsNeeded=EscrowCost+COI
RefundingPar=ProceedsNeeded/(RefundingBondPrice/
    100)
ReDim Table(1 To NPeriods+1, 1 To 6)
ReDim Table2(1 To NPeriods2+1, 1 To 6)
For X=1 To UBound(Table)
    If X=1 Then
        Table(X, 1)=Settlement
    ElseIf X=2 Then
        Table(X, 1)=FirstDate
    Else
        Table(X, 1)=Application.WorksheetFunction.EDate
            (Table(X-1, 1), 6)
    End If
Next X
For X=1 To UBound(Table)
    Table(X, 2)=Application.WorksheetFunction.Days360
        (Table(1, 1), Table(X, 1))/180
Next X
For X=2 To UBound(Table)
    If X=(NPeriods+1) Then
        Table(X, 3)=ParAmount
    Else
        Table(X, 3)=0
    End If
Next X
For X=2 To UBound(Table)
    Table(X, 4)=ParAmount*Coupon/2
Next X
For X=2 To UBound(Table)
    Table(X, 5)=Table(X, 3)+Table(X, 4)
Next X
For X=2 To UBound(Table)
    Table(X, 6)=Table(X, 5)*((1+(RefundingYield/2))^-
        Table(X, 2))
Next X
For X=2 To UBound(Table)
    PVOld=PVOld+Table(X, 6)
Next X
For X=1 To UBound(Table2)
    If X=1 Then
        Table2(X, 1)=Settlement
    ElseIf X=2 Then
        Table2(X, 1)=FirstDate2
    Else
        Table2(X, 1)=Application.WorksheetFunc-
            tion.EDate(Table2(X-1, 1), 6)
    End If
Next X
For X=1 To UBound(Table2)
    Table2(X, 2)=Application.WorksheetFunction.
        Days360(Table2(1, 1), Table2(X, 1))/180
Next X
For X=2 To UBound(Table2)
    If CDate(Table2(X, 1))=RefundingLastMaturity Then
        Table2(X, 3)=RefundingPar
    Else
        Table2(X, 3)=0
    End If
Next X
For X=2 To UBound(Table2)
    If X=2 Then
        Table2(X, 4)=RefundingPar*(RefundingCoupon/2)*
            Table2(2, 2)
    ElseIf Table2(X, 1)=RefundingLastMaturity Then
        Table2(X, 4)=(RefundingPar*RefundingCoupon/2)
    ElseIf Table2(X, 1)<RefundingLastMaturity Then
        Table2(X, 4)=RefundingPar*(RefundingCoupon/2)
    Else
        Table(X, 4)=0
    End If
Next X
For X=2 To UBound(Table2)
    Table2(X, 5)=Table2(X, 4)+Table2(X, 3)
Next X
For X=2 To UBound(Table2)
    Table2(X, 6)=Table2(X, 5)*((1+(RefundingYield/2))^-
        Table2(X, 2))
Next X
For X=2 To UBound(Table2)
    PVNew=PVNew+Table2(X, 6)
Next X
SavingsByMat=PVOld-PVNew
End Function
```

Examples of Illustrative Operating Environments

Figure 10:
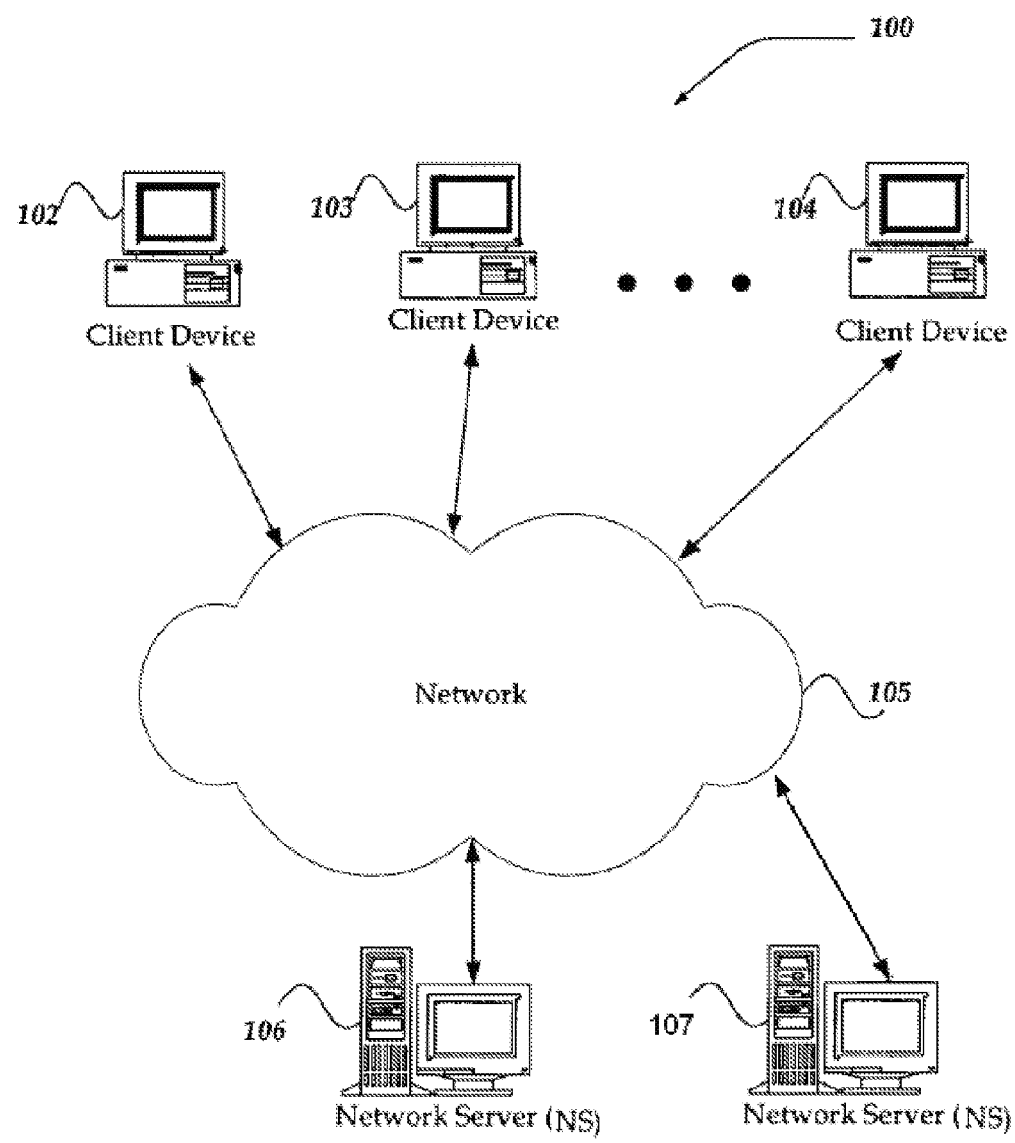
FIG. 10 illustrates yet certain features of some further embodiments of the present invention.

Examples of FIG. 10

FIG. 10 illustrates one embodiment of an environment in which the present invention may operate. However, not all of these components may be required to practice the invention, and variations in the arrangement and type of the components may be made without departing from the spirit or scope of the invention. In some embodiments, the instant invention can host a large number of persons and concurrent transactions. In other embodiments, the instant invention can be based on a scalable computer and network architecture that incorporates varies strategies for assessing the data, caching, searching, and database connection pooling. An example of the scalable architecture is an architecture that is capable of operating multiple servers.

In embodiments, persons' computer devices 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, persons' computer devices 102-104 are any device that is capable of connecting using a wired or wireless communication medium such as a PDA, POCKET PC, wearable computer, and any other device that is equipped to communicate over a wired and/or wireless communication medium.

In some embodiments, each person computer device within client devices 102-104 can include a browser application that is configured to receive and to send web pages, and the like. In embodiments, the browser application is configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, persons' computer devices 102-104 can be programmed in either Java or .Net.

In some embodiments, persons' computer devices 102-104 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 105 is configured to couple one computing device to another computing device to enable them to communicate. In embodiments, network 105 is enabled to employ any form of computer readable media for communicating information from one electronic device to another. Also, in embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 105 includes any communication method by which information may travel between client devices 102-104, and servers 106 and 107.

Figure 11:
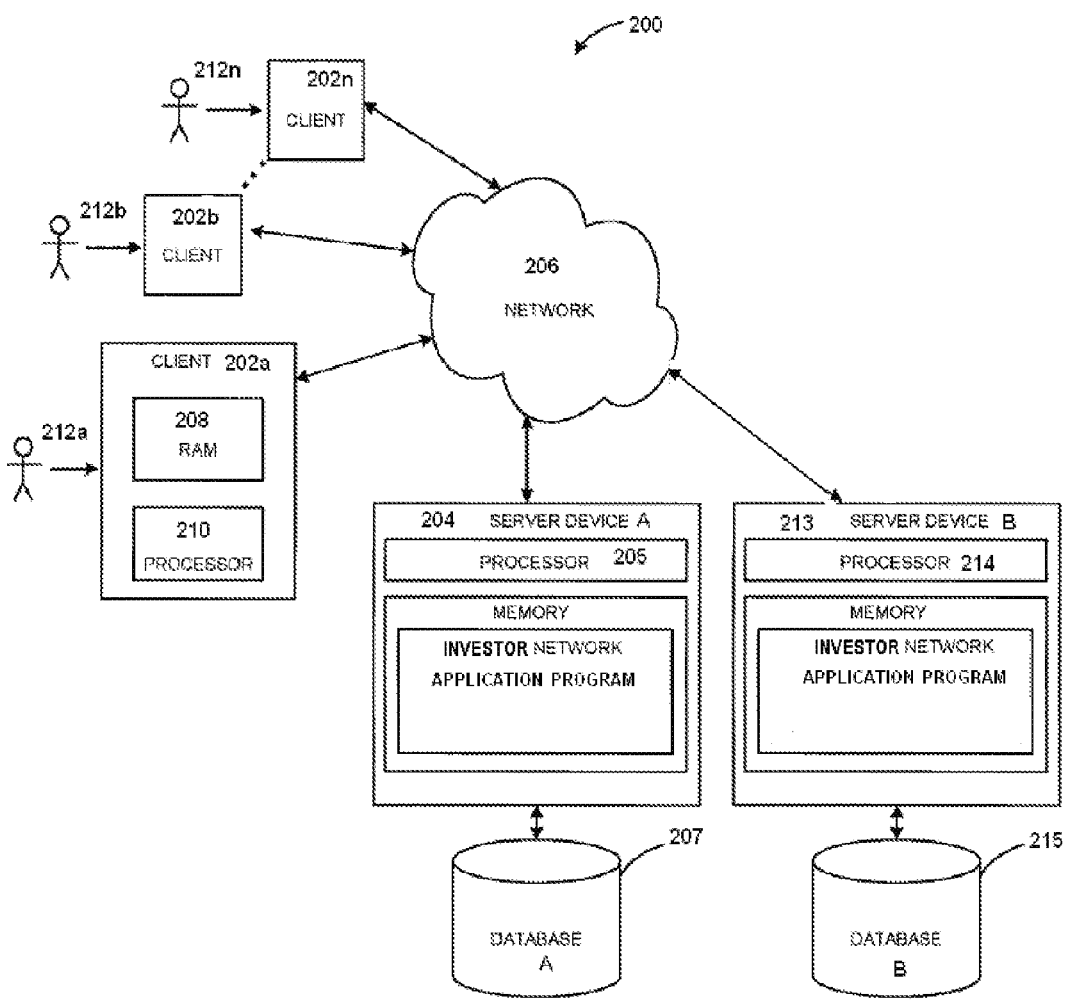
FIG. 11 illustrates yet certain features of some further embodiments of the present invention.

Examples of FIG. 11

FIG. 11 shows the computer and network architecture of some embodiments of the instant invention. The persons' computer devices 202a, 202b thru 202n shown, each comprises a computer-readable medium, such as a random access memory (RAM) 208 coupled to a processor 210. The processor 210 executes computer-executable program instructions stored in memory 208. Such processors comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 210 of client 202a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

The persons' computer devices 202a-n can also comprise a number of external or internal devices such as a mouse, a CD-ROM, DVD, a keyboard, a display, or other input or output devices. Examples of persons' computer devices 202a-n are personal computers, digital assistants, personal digital assistants, cellular phones, mobile phones, smart phones, pagers, digital tablets, laptop computers, Internet appliances, and other processor-based devices. In general, a person device 202a are be any type of processor-based platform that is connected to a network 206 and that interacts with one or more application programs. The persons' computer devices 202a-n operate on any operating system capable of supporting a browser or browser-enabled application, such as Microsoft™, Windows™, or Linux. The persons' computer devices 202a-n shown include, for example, personal computers executing a browser application program such as Microsoft Corporation's Internet Explorer™, Apple Computer, Inc.'s Safari™, Mozilla Firefox, and Opera.

Through the persons' computer devices 202a-n, persons 212a-n of the instant invention can communicate over the network 206 with a centralized computer system, and/or each other, and/or with other systems and devices coupled to the network 206. As shown in FIG. 3, server devices 204 and 213 are also coupled to the network 206.

In some embodiments, the instant invention can utilize NFC technology to obtain/transmit information. In some embodiments, NFC can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less. In some embodiment, NFC can operates at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable device within close proximity of each other.

In some embodiments, NFC tags can contain data and be read-only or rewriteable. In some embodiment, NFC tags can be custom-encoded. In some embodiments, NFC tags and/or NFC-enabled device (e.g., smart phones with NFC capabilities) can securely store personal data such as debit and credit card information, loyalty program data, PINs and networking contacts, and/or other information. NFC tags can be encoded to pass a Uniform Resource Locator (URL) and a processor of the NFC-enabled device can automatically direct a browser application thereof to the URL without prompting for permission to proceed to the designated location.

In some embodiments, lottery data may also be communicated using any wireless means of communication, such as 4G, 3G, GSM, GPRS, WiFi, WiMax, and other remote local or remote wireless communication using information obtained via the interfacing of a wireless NFC enabled mobile device to another NFC enabled device or a NFC tag. In some embodiments, the term "wireless communications" includes communications conducted at ISO 14443 and ISO 18092 interfaces. In some embodiments, the communications between person's NFC-enabled smart device and lottery provided equipment (e.g., terminals, POS, POE, Hosts) is performed, for example, in accordance with the ISO 14443A/B standard and/or the ISO 18092 standard.

In some embodiments, player's NFC-enabled smart device and/or lottery provided equipment (e.g., terminals, POS, POE, Hosts) can include one or more additional transceivers (e.g., radio, Bluetooth, and/or WiFi transceivers) and associated antennas, and enabled to communicate with each other by way of one or more mobile and/or wireless protocols. In some embodiments, NFC tags can include one or more integrated circuits.

In some embodiments, person's NFC-enabled smart device may include a cellular transceiver coupled to the processor and receiving a cellular network timing signal. In some embodiments, person's NFC-enabled smart device may further include a satellite positioning receiver coupled to the processor and receiving a satellite positioning system timing signal, and the processor may accordingly be configured to synchronize the internal timing signal to the satellite positioning system timing signal as the external timing signal. In some embodiments, the processor of person's NFC-enabled smart device may be configured to synchronize the internal timing signal to the common external system timing signal via the NFC circuit.

While a number of embodiments of the present invention have been described, it is understood that these embodiments are illustrative only, and not restrictive, and that many modifications may become apparent to those of ordinary skill in the art.

What is claimed is:

1. A computer-implemented method, comprising:
   receiving, by a specifically programmed computer system, first data, regarding:
   1) at least one first callable municipal debt issuance of at least one first municipal debt issuer in an amount of at least 10 million in a particular currency, and
   2) at least one first embedded call option for the at least one first callable municipal debt issuance, wherein the at least one first municipal debt issuer purchased the at least one first embedded call option;
   calculating, by the specifically programmed computer system, a first actual cost of the at least one first embedded call option at a first purchase date based, at least in part, on a first difference between a first price of at least one first non-callable municipal debt issuance and a second price paid by at least one investor for the at least one first callable municipal debt issuance;
   calculating, by the specifically programmed computer system, a first current market value of the at least one first embedded call option based, at least in part, on a present value savings from a hypothetical refunding of the at least one first callable municipal debt issuance with the at least one first non-callable municipal debt issuance;
   calculating, by the specifically programmed computer system, a first return on investment for the at least one first embedded call option based, at least in part, on:
   1) the calculating the first actual cost of the purchased at least one first embedded call option at the first purchase date, and
   2) the calculating the first current market value of the at least one first embedded call option;
   receiving, by the specifically programmed computer system, a second data regarding a plurality of refunding candidate options;
   calculating, by the specifically programmed computer system, a second return on investment for each refunding candidate option from the plurality of refunding candidate options, based, at least in part, on a plurality of iterative calculations with a present cash flow, a future cash flow, and a predetermined maturity period of each refunding candidate option;
   calculating, by the specifically programmed computer system, a projected refunding savings yielded from substituting the at least one first embedded call option with each refunding candidate option from the plurality of refunding candidate options;
   comparing, by the specifically programmed computer system, the first return on investment for the at least one first embedded call option to:
   1) the second return on investment for each refunding candidate option from the plurality of refunding candidate options and
   2) the projected refunding savings; and
   selecting, by the specifically programmed computer system, based on the comparing step, a particular refunding candidate option from the plurality of refunding candidate options to substitute the at least one first embedded call option.

2. The computer-implemented method of claim 1, wherein the plurality of refunding candidate options comprise options of at least one of the following types:
   i) call option,
   ii) swaption,
   iii) interest rate option,
   iv) currency option,
   v) commodity option, and
   vi) yield curve option.

3. The computer-implemented method of claim 1, wherein the first purchase date is a first issue date of the at least one first callable municipal debt issuance.

4. The computer-implemented method of claim 1, wherein the method further comprises:

tracking, over a predetermined period of time, by the specifically programmed computer system, the first current market value and first return on investment of the at least one first embedded call option; and tracking, over the predetermined period of time, by the specifically programmed computer system, the second return on investment for each refunding candidate option from the plurality of refunding candidate options.

5. A computer system, comprising:

at least one specialized computer machine, comprising:

a non-volatile memory having at least one region for storing particular computer executable program code; and at least one processor for executing the particular program code stored in the memory, wherein the particular program code is specifically configures so that the at least one specialized computer machine is configured to perform at least the following operations:

receiving first data, regarding:
1) at least one first callable municipal debt issuance of at least one first municipal debt issuer in an amount of at least 10 million in a particular currency, and
2) at least one first embedded call option for the at least one first callable municipal debt issuance, wherein the at least one first municipal debt issuer purchased the at least one first embedded call option;

calculating a first actual cost of the at least one first embedded call option at a first purchase date based, at least in part, on a first difference between a first price of at least one first non-callable municipal debt issuance and a second price paid by at least one investor for the at least one first callable municipal debt issuance;

calculating a first current market value of the at least one first embedded call option based, at least in part, on a present value savings from a hypothetical refunding of the at least one first callable municipal debt issuance with the at least one first non-callable municipal debt issuance;

calculating a first return on investment for the at least one first embedded call option based, at least in part, on:
1) the calculating the first actual cost of the purchased at least one first embedded call option at the first purchase date, and
2) the calculating the first current market value of the at least one first embedded call option;

receiving a second data regarding a plurality of refunding candidate options;

calculating a second return on investment for each refunding candidate option from the plurality of refunding candidate options, based, at least in part, on a plurality of iterative calculations with a present cash flow, a future cash flow, and a predetermined maturity period of each refunding candidate option;

calculating a projected refunding savings yielded from substituting the at least one first embedded call option with each refunding candidate option from the plurality of refunding candidate options;

comparing the first return on investment for the at least one first embedded call option to:
1) the second return on investment for each refunding candidate option from the plurality of refunding candidate options and
2) the projected refunding savings; and selecting, based on the comparing step, a particular refunding candidate option from the plurality of refunding candidate options to substitute the at least one first embedded call option.

6. The computer system of claim 5, wherein the plurality of refunding candidate options comprise options of at least one of the following types:
i) call option,
ii) swaption,
iii) interest rate option,
iv) currency option,
v) commodity option, and
vi) yield curve option.

7. The computer system of claim 5, wherein the first purchase date is a first issue date of the at least one first callable municipal debt issuance.

8. The computer system of claim 5, wherein the at least one specialized computer machine is further configured to perform at least the following operations:

tracking, over a predetermined period of time, the first current market value and first return on investment of the at least one first embedded call option; and tracking, over the predetermined period of time, the second return on investment for each refunding candidate option from the plurality of refunding candidate options.

* * * * *